(12) United States Patent
Addala et al.

(10) Patent No.: US 9,269,075 B2
(45) Date of Patent: Feb. 23, 2016

(54) DISTRIBUTED ORDER ORCHESTRATION SYSTEM FOR ADJUSTING LONG RUNNING ORDER MANAGEMENT FULFILLMENT PROCESSES WITH DELTA ATTRIBUTES

(75) Inventors: Raju Addala, Fremont, CA (US); Alok Singh, Fremont, CA (US); Sumeet Rijhsinghani, Fremont, CA (US); Leah Reed, Newburyport, MA (US); Kolanupaka Suman, Hyderabad (IN); Lavanya Siliveri, Hyderabad (IN); Khanderao Kand, San Jose, CA (US); Clemens Utschig, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1000 days.

(21) Appl. No.: 12/718,569

(22) Filed: Mar. 5, 2010

(65) Prior Publication Data

US 2011/0218924 A1 Sep. 8, 2011

(51) Int. Cl.
*G06Q 10/10* (2012.01)

(52) U.S. Cl.
CPC .................................... *G06Q 10/103* (2013.01)

(58) Field of Classification Search
USPC ......................................................... 705/1.1
See application file for complete search history.

(56) References Cited

U.S. PATENT DOCUMENTS

| | | | |
|---|---|---|---|
| 4,044,337 A * | 8/1977 | Hicks et al. ...................... | 714/19 |
| 4,855,190 A | 8/1989 | Bezner | |
| 5,201,010 A * | 4/1993 | Deaton et al. ................. | 382/139 |
| 5,440,726 A | 8/1995 | Fuchs et al. | |
| 5,630,047 A | 5/1997 | Wang | |
| 5,761,499 A | 6/1998 | Sonderegger | |
| 5,768,586 A | 6/1998 | Zweben et al. | |
| 5,987,423 A | 11/1999 | Arnold et al. | |
| 5,996,088 A | 11/1999 | Frank et al. | |
| 6,053,948 A | 4/2000 | Vaidyanathan et al. | |
| 6,055,573 A * | 4/2000 | Gardenswartz et al. ...... | 709/224 |
| 6,341,287 B1 | 1/2002 | Sziklai et al. | |
| 6,374,264 B1 | 4/2002 | Bohannon et al. | |
| 6,539,386 B1 * | 3/2003 | Athavale et al. | |
| 6,567,783 B1 | 5/2003 | Notani et al. | |
| 6,601,233 B1 | 7/2003 | Underwood | |
| 6,678,882 B1 * | 1/2004 | Hurley et al. ................. | 717/121 |
| 6,698,018 B1 | 2/2004 | Zimniewicz et al. | |
| 6,876,977 B1 * | 4/2005 | Marks ........................ | 705/26.62 |
| 6,915,294 B1 | 7/2005 | Singh et al. | |
| 6,934,687 B1 * | 8/2005 | Papierniak et al. .......... | 705/7.34 |
| 7,003,476 B1 * | 2/2006 | Samra et al. ................. | 705/7.28 |
| 7,031,787 B2 | 4/2006 | Kalthoff et al. | |

(Continued)

OTHER PUBLICATIONS

Oracle Data Sheet, Oracle Order Management, Copyright 2009 Oracle; pp. 1-5.
Raju Addala, et al., U.S. Appl. No. 12/718,468, filed Mar. 5, 2010.
Raju Addala, et al., U.S. Appl. No. 12/718,647, filed Mar. 5, 2010.
Raju Addala, et al., U.S. Appl. No. 12/697,756, filed Feb. 1, 2010.
Raju Addala, et al., U.S. Appl. No. 12/718,501, filed Mar. 5, 2010.
Raju Addala, et al., U.S. Appl. No. 12/718,536, filed Mar. 5, 2010.

(Continued)

*Primary Examiner* — Mark A Fleischer
(74) *Attorney, Agent, or Firm* — Miles & Stockbridge P.C.

(57) ABSTRACT

A computer-readable medium, computer-implemented method, and system are provided. In one embodiment, one or more attributes as delta attributes are defined, and a new order object is determined which references an original order object. The original order object referenced by the new order object is determined and the new order object is compared with the original order object to determine one or more delta attributes. The one or more delta attributes are then stored.

17 Claims, 53 Drawing Sheets

(56) References Cited

U.S. PATENT DOCUMENTS

| | | | |
|---|---|---|---|
| 7,096,189 B1 * | 8/2006 | Srinivasan | 705/7.25 |
| 7,107,340 B2 | 9/2006 | Chkodrov et al. | |
| 7,139,841 B1 | 11/2006 | Somasundaram et al. | |
| 7,356,482 B2 | 4/2008 | Frankland et al. | |
| 7,379,903 B2 | 5/2008 | Caballero et al. | |
| 7,403,904 B2 * | 7/2008 | Abe et al. | 705/7.29 |
| 7,441,187 B2 | 10/2008 | Meadows | |
| 7,467,375 B2 | 12/2008 | Tondreau et al. | |
| 7,469,219 B2 | 12/2008 | Goldberg | |
| 7,472,374 B1 | 12/2008 | Dillman et al. | |
| 7,546,257 B2 | 6/2009 | Hoffman et al. | |
| 7,567,975 B2 | 7/2009 | Yalamanchi | |
| 7,574,483 B1 | 8/2009 | Alger et al. | |
| 7,590,680 B2 | 9/2009 | Fernando et al. | |
| 7,627,867 B2 | 12/2009 | Banks | |
| 7,657,534 B2 | 2/2010 | Kirkgaard | |
| 7,664,750 B2 | 2/2010 | Frees et al. | |
| 7,680,752 B1 | 3/2010 | Clune, III et al. | |
| 7,680,782 B2 | 3/2010 | Chen et al. | |
| 7,707,200 B2 * | 4/2010 | Jain et al. | 707/705 |
| 7,797,598 B1 | 9/2010 | Secatch | |
| 7,873,611 B2 | 1/2011 | Ebersole | |
| 7,987,163 B2 | 7/2011 | Keshavarz-Nia et al. | |
| 8,028,276 B1 | 9/2011 | Bessonov | |
| 8,112,317 B1 | 2/2012 | Ballaro et al. | |
| 8,141,125 B2 | 3/2012 | Maes | |
| 8,271,609 B2 | 9/2012 | Addala et al. | |
| 8,402,064 B2 | 3/2013 | Addala et al. | |
| 8,458,312 B2 | 6/2013 | Raghunathan et al. | |
| 8,627,271 B2 | 1/2014 | Reed et al. | |
| 2002/0026339 A1 | 2/2002 | Frankland et al. | |
| 2002/0042751 A1 | 4/2002 | Sarno | |
| 2002/0042755 A1 | 4/2002 | Kumar et al. | |
| 2002/0178014 A1 | 11/2002 | Alexander | |
| 2002/0178074 A1 | 11/2002 | Bloom | |
| 2003/0078933 A1 | 4/2003 | Gara et al. | |
| 2003/0078944 A1 | 4/2003 | Yamauchi et al. | |
| 2003/0144852 A1 | 7/2003 | Eckert | |
| 2003/0172007 A1 | 9/2003 | Helmolt et al. | |
| 2003/0182145 A1 | 9/2003 | Kalthoff et al. | |
| 2004/0024784 A1 | 2/2004 | Spall et al. | |
| 2004/0064351 A1 | 4/2004 | Mikurak | |
| 2004/0068526 A1 | 4/2004 | Singh | |
| 2004/0088196 A1 | 5/2004 | Childress et al. | |
| 2004/0111336 A1 | 6/2004 | Argust et al. | |
| 2004/0139176 A1 | 7/2004 | Farrell et al. | |
| 2004/0181425 A1 | 9/2004 | Schwerin-Wenzel et al. | |
| 2004/0181771 A1 | 9/2004 | Anonsen et al. | |
| 2004/0181775 A1 | 9/2004 | Anonsen et al. | |
| 2004/0215526 A1 * | 10/2004 | Luo et al. | 705/26 |
| 2004/0236607 A1 | 11/2004 | Kost | |
| 2004/0243485 A1 * | 12/2004 | Borenstein et al. | 705/27 |
| 2004/0267689 A1 | 12/2004 | Gavlak et al. | |
| 2005/0027732 A1 | 2/2005 | Kalima | |
| 2005/0044197 A1 | 2/2005 | Lai | |
| 2005/0075941 A1 | 4/2005 | Jetter et al. | |
| 2005/0096959 A1 | 5/2005 | Kumar et al. | |
| 2005/0102192 A1 | 5/2005 | Gerrits et al. | |
| 2005/0113098 A1 | 5/2005 | Cankaya et al. | |
| 2005/0182768 A1 | 8/2005 | Waldorf et al. | |
| 2005/0216573 A1 | 9/2005 | Gutjahr | |
| 2005/0240756 A1 | 10/2005 | Mayer | |
| 2005/0289013 A1 | 12/2005 | Goldberg | |
| 2006/0026319 A1 | 2/2006 | Rothman et al. | |
| 2006/0178918 A1 | 8/2006 | Mikurak | |
| 2006/0224613 A1 | 10/2006 | Bermender et al. | |
| 2006/0235733 A1 | 10/2006 | Marks | |
| 2006/0265272 A1 | 11/2006 | Bosa et al. | |
| 2006/0277024 A1 | 12/2006 | Kloppmann et al. | |
| 2007/0016608 A1 | 1/2007 | Mullins | |
| 2007/0088596 A1 | 4/2007 | Berkelhamer | |
| 2007/0121850 A1 * | 5/2007 | Klos et al. | 379/114.28 |
| 2007/0192124 A1 | 8/2007 | Anderson et al. | |
| 2007/0203803 A1 | 8/2007 | Stone et al. | |
| 2007/0233287 A1 | 10/2007 | Sheshagiri et al. | |
| 2007/0256050 A1 | 11/2007 | Behnia et al. | |
| 2007/0260575 A1 | 11/2007 | Robinson et al. | |
| 2007/0288412 A1 | 12/2007 | Linehan | |
| 2008/0016471 A1 | 1/2008 | Park | |
| 2008/0033700 A1 | 2/2008 | Kano et al. | |
| 2008/0040245 A1 | 2/2008 | Wadawadigi et al. | |
| 2008/0043639 A1 | 2/2008 | Song | |
| 2008/0046868 A1 | 2/2008 | Tsantilis | |
| 2008/0071561 A1 | 3/2008 | Holcombe | |
| 2008/0098108 A1 | 4/2008 | Yu | |
| 2008/0098378 A1 | 4/2008 | Kilbane et al. | |
| 2008/0127044 A1 | 5/2008 | Barros | |
| 2008/0147517 A1 | 6/2008 | Martinez et al. | |
| 2008/0163164 A1 | 7/2008 | Chowdhary et al. | |
| 2008/0229307 A1 | 9/2008 | Maeda et al. | |
| 2008/0235324 A1 | 9/2008 | Abernethy et al. | |
| 2008/0256133 A1 | 10/2008 | Frankland et al. | |
| 2008/0281833 A1 | 11/2008 | Cain et al. | |
| 2008/0301419 A1 | 12/2008 | Barros et al. | |
| 2008/0307255 A1 | 12/2008 | Chen et al. | |
| 2008/0320486 A1 | 12/2008 | Bose et al. | |
| 2009/0070783 A1 | 3/2009 | Schmidt et al. | |
| 2009/0083632 A1 | 3/2009 | Brosh et al. | |
| 2009/0089078 A1 | 4/2009 | Bursey | |
| 2009/0089776 A1 | 4/2009 | Sonkin et al. | |
| 2009/0150887 A1 | 6/2009 | Sanghvi et al. | |
| 2009/0171819 A1 | 7/2009 | Von Der Emde et al. | |
| 2009/0172689 A1 | 7/2009 | Bobak et al. | |
| 2009/0192884 A1 | 7/2009 | Lo | |
| 2009/0210268 A1 | 8/2009 | Fan et al. | |
| 2009/0216874 A1 | 8/2009 | Thain et al. | |
| 2009/0222395 A1 | 9/2009 | Light et al. | |
| 2009/0228546 A1 | 9/2009 | Yendluri | |
| 2009/0319685 A1 | 12/2009 | Martin | |
| 2010/0070331 A1 | 3/2010 | Koegler et al. | |
| 2010/0110933 A1 | 5/2010 | Wilcock et al. | |
| 2010/0121740 A1 | 5/2010 | Reed et al. | |
| 2010/0138017 A1 | 6/2010 | Vrba et al. | |
| 2011/0055815 A1 | 3/2011 | Squillace | |
| 2011/0125553 A1 | 5/2011 | Mazzoleni et al. | |
| 2011/0167105 A1 | 7/2011 | Ramakrishnan et al. | |
| 2011/0184969 A1 | 7/2011 | Idicula et al. | |

OTHER PUBLICATIONS

Raju Addala, et al., U.S. Appl. No. 12/718,625, filed Mar. 5, 2010.
Raju Addala, et al., U.S. Appl. No. 12/718,520, filed Mar. 5, 2010.
Raju Addala, et al., U.S. Appl. No. 12/718,475, filed Mar. 5, 2010.
Raju Addala, et al., U.S. Appl. No. 12/718,585, filed Mar. 5, 2010.
Raju Addala, et al., U.S. Appl. No. 12/718,383, filed Mar. 5, 2010.
"Oracle Communications Order and Service Management™ Version 6.3", Administration Guide, First Edition, Sep. 2007.
Lienhard et al., Workflow and Business Rules: a Common Approach, BPTrends, Sep. 2005, ivyTeam-SORECOGroup, Switzerland.
Xiaoyu Zhang and Denis Gračanin, "Service-Oriented-Architecture based Framework for Multi-User Virtual Environments", Proceedings of the 2008 Winter Simulation Conference, pp. 1-9.
Oracle®, "Oracle Fusion Middleware Developer's Guide for Oracle SOA Suite", 11g Release 1 (11.1.1) Part No. E10224-01, Chapter 31, pp. 1-25, http://download.oracle.com/docs/cd/E12839_01/integration.1111/e10224/bam_data_objects.htm.
Oracle®, "Oracle Fusion Middleware Fusion Developer's Guide for Oracle Application Development Framework", 11g Release 1 (11.1.1) Part No. B31974-03, Chapter 41, pp. 1-6, http://download.oracle.comldocs/cd/E12839_01/web.1111/b31974/adv_ads.htm.
Sterling Commerce, "Sterling Distributed Order Mangement", pp. 1-2.
Oracle®, "Oracle it Service Management Suite Overview", pp. 1-3, http://www.oracle.com/technetwork/oem/grid-control/overview/twp-oracle-it-serv-mgmt-feature-ove-133400.pdf.
Gregor Hohpe and Bobby Woolf, "Enterprise Integration Patterns; Publish-Subscribe Channel", http://www.eaipatterns.com/PublishSubscribeChannel.html.
Gregor Hohpe and Bobby Woolf, "Enterprise Integration Patterns; Point-to-Point Channel", http://www.eaipatterns.com/Point-ToPointChannel.html.

(56) References Cited

OTHER PUBLICATIONS

Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.

Gregor Hohpe, "Programming Without a Call Stack—Event-driven Architectures", pp. 1-10, http://www.eaipatterns.com/docs/EDA.pdf.

"Orchestrating Web Services: The Case for a BPEL Server", by Dave Shaffer and Brian Dayton, An Oracle White Paper, Jun. 2004, Oracle Corporation.

Stephen McIlvenna et al., "Synthesis of Orchestrators from Service Choreographies", Faculty of Science and Technology, Institute of Computer Science, University of Tartu, Estonia, 2009.

ConceptWave Software Inc., "Order Management", Jul. 26, 2004.

Joan Lawson et al., "Orchestrating into End-to-End Processes", Oracle International Corporation, Mastering SOA, Part 3, Feb. 2007.

Bimal Mehta et al., "BizTalk Server 2000 Business Process Orchestration", Microsoft Corporation, 2001, Bulletin of the EEE Computer Society Technical Committee on Data Engineering, 2001.

BizTalk Orchestration: A Technology for Orchestrating Business Interactions White Paper, Microsoft Corporation, Jun. 5, 2000.

Gael Blondelle et al., "How to Choose Your Process Orchestration Technology", EBM Websourcing, Petals link, Version 1.0, Dec. 2009.

Nuno F. Rodrigues et al., "On the Discovery of Business Processes Orchestration Patterns", University of do Minho, Portugal, 2004.

Ulaga, Wolfgang, et al., Value-Based Differentiation in Business Relationships: Journal of Marketing, vol. 70, Jan. 2006, pp. 119-136.

Order Orchestration and Management with Tapestry, CGI Group Inc., 2009.

Validating Orchestration of Web Services with BPEL and Aggregate Signatures, by Carlo Blundo et al., Sixth European Conference on Web Services, 2008 IEEE Computer Society.

\* cited by examiner

Fig. 14

| Step | Rollback Checkpoint | Compensation Service | Compensation Sequence | Delta: Runtime |
|------|---------------------|----------------------|-----------------------|----------------|
| T1 |    | CancelT1 | 5 |      |
| T2 | C1 | CancelT2 | 6 |      |
| T3 |    | CancelT3 | 7 |      |
| T4 | C2 | Cancel4  | 8 |      |
| T5 |    | Cancel5  | 4 |      |
| T6 | C3 | Cancel6  | 3 | TRUE |
| T7 |    | Cancel7  | 2 |      |
| T8 | C4 | Cancel8  | 1 | TRUE |

DISTRIBUTED ORDER ORCHESTRATION SYSTEM FOR ADJUSTING LONG RUNNING ORDER MANAGEMENT FULFILLMENT PROCESSES WITH DELTA ATTRIBUTES

FIELD

One embodiment is directed to a computer system generally, and more particularly to a computer system for the orchestration of business processes.

BACKGROUND

Order management systems are computer software and/or hardware system implemented by a number of industries to facilitate order entry and processing. Companies, such as catalog companies and those utilizing electronic commerce, use order management systems to receive, process and fulfill customer orders. An order management system makes possible the entering of an order via a website shopping care or data entry system. The system typically captures customer proprietary information and/or account level information for each order. Credit verification or payment processing may then be performed to check for available funds and validate the transaction. Valid orders are processed for warehouse fulfillment, including, picking, packing and shipping of the ordered goods or services.

Business processes are typically modeled by business architects/analysts. A business process may model message exchanges with different systems in a web services environment. The business architects/analysts then provide an information technology ("IT") designer with the model. The IT designer uses an orchestration language, such as business process execution language ("BPEL"), to code the business process. BPEL processes are typically created in a BPEL editor and a deployed BPEL process is invoked. Because the IT designer and business architects/analysts generally have different skill sets (i.e., the business architects/analysts are familiar with the business process being modeled and the IT designer is familiar with the orchestration language but not the business process), the resulting BPEL process developed by the IT designer may not work as the business architects/analysts imagined. Accordingly, there may be a wide divide between the originally conceived business process model and the implemented model.

Furthermore, BPEL processes are long running (very often active beyond six months), and in almost all cases, they interact with multiple external systems. The interactions with multiple systems are separated by both time (i.e., the interactions are asynchronous) and space (i.e., each interaction is associated with a particular step in the business process flow). Since processing is done by various components that are asynchronous, distributed and self-focused (i.e., loosely coupled), a system that implements deployed BPEL processes cannot employ traditional transaction processing concepts (i.e., "ACID": Atomic; Consistency; Isolation; and Durability) that involve a commit transaction or a rollback transaction. The system cannot commit or rollback the interactions because the external fulfillment systems may have already committed parts of a transaction. In simple terms, a well defined transaction boundary for the fulfillment systems does not exist.

For example, consider a business scenario when an order is submitted to a system for fulfillment, and the order is in the middle of processing. When the system receives a request to modify the order, a system administrator must perform significant manual work to make the proper adjustments to the ongoing fulfillment process in order to reflect the modifications in the order. Further compounding the problem, if the administrator is slow to respond to a change request, in that lag time, the fulfillment processes can continue to process based on the original order. This further processing may also need to be changed, or undone, once the administrator finally is able to modify the order.

Furthermore, change requests on long running orders typically require adjustment only on parts of the order. However, there is currently no way to selectively adjust a portion of an order in an efficient and automatic manner.

SUMMARY

One embodiment is directed to a computer-readable medium having instructions stored thereon that, when executed by a processor, cause the processor to determine one or more delta attributes in a distributed order orchestration system. The instructions include defining one or more attributes as delta attributes, and determining a new order object which references an original order object. The instructions further include determining the original order object referenced by the new order object and comparing the new order object with the original order object to determine one or more delta attributes. The instructions further include storing the one or more delta attributes.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 14 illustrates a user interface of a distributed order orchestration system according to another embodiment.

FIG. 45 illustrates an example of selecting a rollback checkpoint based on delta according to one embodiment.

DETAILED DESCRIPTION

Distributed Order Orchestration Framework

One embodiment is directed to a distributed order orchestration system ("DOO"). Distributed order orchestration provides a flexible, configurable infrastructure that can be easily customized to be consistent with an enterprise's business practices and existing order fulfillment system architecture. Decomposition is the conversion of data received from one or more order capture modules into an internal canonical format in order to process the data. In one example embodiment, the distributed order orchestration system includes a capture layer for capturing customer orders across multiple channels, a decomposition layer to help determine the orchestration process, an orchestration layer for executing and orchestrating order line processing, a task layer services for performing task related logic, an external interface layer for interfacing with external systems, a fulfillment layer, a global order promising layer to provide a user interface for scheduling and sourcing. The distributed order orchestration system may further include a fulfillment workbench layer that interfaces with the other layers of the system and manages sources, tasks and assignments. The various layers of the distributed order orchestration system described above combine to provide a complete order management solution at reduced implementation and maintenance costs. However, in an alternative embodiment, the capture layer is not part of the distributed order orchestration system. In this alternative embodiment, an order capture layer is part of a separate system, and a connector service is utilized as a bridge between the distributed order orchestration system and the capture layer.

Figure 1:
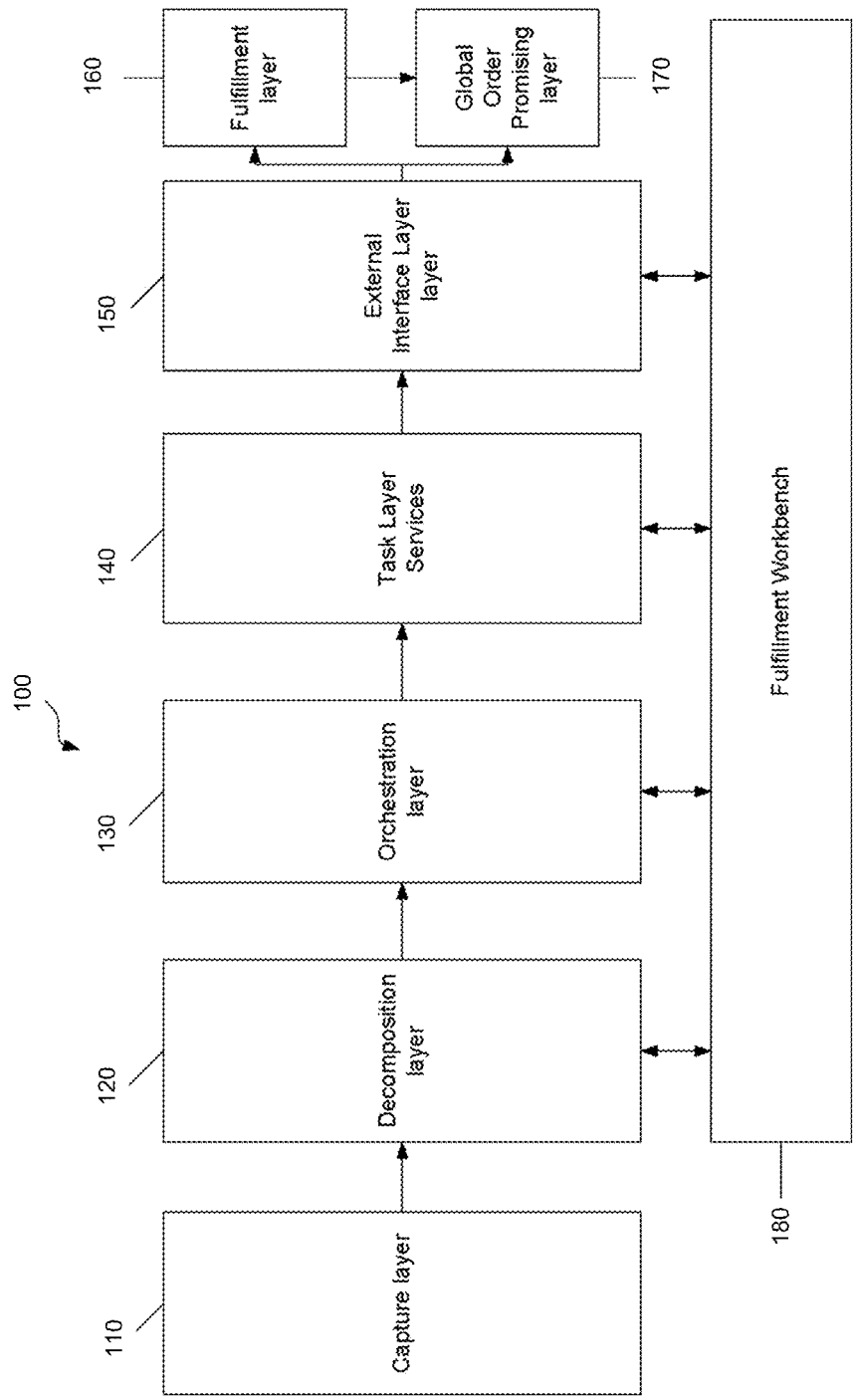
FIG. 1 illustrates an example of a distributed order orchestration system according to one embodiment.

FIG. 1 illustrates an example of a distributed order orchestration system 100 according to one embodiment. In the embodiment, distributed order orchestration system 100 includes a capture layer 110 that can receive and capture information related to customer orders for goods and/or services across multiple channels. The order may be received via a graphical user interface, such as that of a website shopping cart, or can be received via any data entry system. The capture layer 110 captures and forwards the order information to a decomposition layer 120. However, in an alternative embodiment, the capture layer 110 is separate from distributed order orchestration system 100. In this alternative embodiment, a connector service is utilized as a bridge between distributed order orchestration system 100 and capture layer 110.

Order Capture systems capture the order with any necessary functional attributes that are needed to process the order, such as pricing, validation, eligibility, etc. The sales order is fed to decomposition layer 120 in a Source Order object. The source order object is generated from a sales order object submitted by different capture systems. The source order object is in a generic format that is fed into the decomposition layer 120.

Decomposition layer 120 receives the order information and breaks the received order into individual purchase orders to be sent to fulfillment systems and supply-side partners for execution. Decomposition layer 120 may include a decomposition rules workbench for setting up rules, rule sets, and transformation processes for the order capture layer 110 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 120, there may be a business rule that says that a laptop must have a power cord and the plug on the power cord must match the country to which the laptop is shipped. So when decomposition module 120 is complete, the order has two lines, one with the laptop and one for the appropriate power cord. Thus, the order has been decomposed into multiple items that need to be fulfilled.

Also, decomposition layer 120 may take the received order and translate it to the order format and order content required by the other layers of the distributed order orchestration system 100, such as the fulfillment layer 160. Because capture layer 110 is capable of receiving orders in any format for compatibility purposes across different types of systems, decomposition layer 120 may need to translate the order into a format that is compatible with and can be recognized by all the other layers and/or processes of the distributed order orchestration system 100. Additionally, decomposition layer 120 may provide a process launch capability to assign and launch orchestration processes for an order based on appropriate decomposition rules. For example, different orchestration processes are assigned based on parameters in the order. For example, a company may give special treatment to certain customers in terms of speed of fulfillment or shipping. For example, Gold customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects (EBO's). They are based on the canonical data model. This approach allows the DOO to be agnostic of participating applications and be independent of source or target applications. The model eliminates the need to map data from different applications directly to each other.

Distributed order orchestration system 100, as illustrated in FIG. 1, further includes an orchestration layer 130. Orchestration layer 130 provides individual orchestration processes to manage order and/or service line items. For example, orchestration layer 130 may provide business process management functionality to support planning of steps within a process, including step duration and calculation or recalculation of completion dates. Orchestration layer 130 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 130 may also provide for jeopardy management in order to check a promised delivery date of an order against current estimated date for completion, map to user defined thresholds, and handle or escalate conditions. Orchestration layer may further provide a process for change orders, including a support process rollback to accommodate for change order automation and modify in-flight orchestration processes for orders changed in order capture stage. Further, a projected order completion date may be provided by instantiating the orchestration process. Orchestration layer 130 also provides a mechanism for updating an order status automatically or upon user request.

One embodiment provides a tool that provides a high degree of abstraction for business process modeling in an order fulfillment business process. Business processes may be modeled by users, such as business analysts, and do not need any coding from an IT designer to have the business process executed. Users are provided the flexibility to define business processes in a central place configured to enter and capture all information required for orchestration and fulfilling an order. An example of such a central place can be a web-based administration user interface. Likewise, an example of all information required for orchestration and order fulfillment may be information required for process planning, core orchestration, and change management. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process (also identified as an orchestration process), which is assembled and executed at run-time. In one embodiment, "runtime" can be defined as the time when an order is received for processing. Metadata is assembled in a data runtime table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

Further details on orchestration are described below in more detail.

Distributed order orchestration system 100 may further include a task layer services 140 to provide encapsulated services used to control processing logic for each orchestration process stage. In particular, task layer services 140 may provide task-specific business logic to wrap logic around a certain request such that the system 100 knows what logical tasks are associated with a particular request. The steps that need to be performed in the executable process from orchestration may require tasks to be performed. For example, task layer services 140 can provide and control processing logic for scheduling a shipment, requesting a shipment, updating install base, creating an activity, etc. The output of task layer services 140 is a standard goods and/or service request(s) which may be provided to other layers of the system 100, such as external interface layer 150 or fulfillment layer 160. In addition, task layer services 140 may receive input that can be used to update the processing logic or status.

Task layer services 140 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 150. Task layer services 140 transforms and sends the message to the external system layer.

Distributed order orchestration system 100 also includes an external interface layer 150 to translate standard request(s) and route the request(s) to external systems for processing. More specifically, external interface layer 150 may receive the standard goods and/or services request(s) output by the task layer services 140 and provide a single layer transform of the request(s) if needed to match the format of fulfillment systems. The transformation performed by external interface layer maps the data to the content and format required by the integrated fulfillment systems. Transformation by decomposition layer 120 converts the data to the internal format used by system 100. External interface layer 150 may map the data structure from task layer services 140 to the external format. External interface layer 150 provides flexible routing so that request(s) are routed to specific fulfillment systems based on business rules. For example, if more than one shipping system is available for fulfillment, business rules will determine to which shipping system an individual shipping request will be sent. External interface layer 150 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 150.

Distributed order orchestration system 100 may further include a global order promising layer 170 that provides an interface, such as a graphical user interface, for scheduling and sourcing orders. In particular, in one embodiment, global order promising layer 170 includes a sourcing broker that determines the best source for products and services associated with the order based upon a customer profile, order and supplier definitions, etc. Also, global order promising layer 170 provides for real-time reserve and un-reserve of inventory and inventory check across distributed internal systems. The interface of global order promising layer 170 allows for the viewing of availability and sourcing information so that a user can view the availability of and manually change the source from which an order for a good or service is being fulfilled. However, in an alternative embodiment, the global order promising layer 170 is separate from distributed order orchestration system 100. In this alternative embodiment, a connector service is utilized as a bridge between distributed order orchestration system 100 and global order promising layer 170.

A fulfillment workbench 180 may also be provided as a user interface for order fulfillment administrators, users and supervisors to monitor and manage the flow of orders through the system 100. In an embodiment, fulfillment workbench 180 provides users, such as supervisors, with a mechanism to monitor order fulfillment tasks, including allowing supervisors to monitor activity load and to produce reports. Fulfillment workbench 180 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within the fulfillment workbench 180 to provide reports and dashboards to enable order managers to view orders for each system and analyze performance. The fulfillment workbench may make use of graphical representations (e.g. graphs and charts) to clearly convey system status/order information to users. Because DOO system 100 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 180 allows users to make mass order information changes related to fulfillment including making single line or mass line changes to fulfillment information (e.g., dates, etc.). Fulfillment workbench 180 may further allow for the monitoring of orchestration processes, such as reviewing the status of orchestration processes including overall process progress, as well as status of individual tasks and corresponding fulfillment lines and people lines. Fulfillment workbench 180, in one embodiment, includes mechanisms for maintaining order fulfillment processing and allows an order processing user to control a process associated with an order including pause, edit, cancel, etc.

In some embodiments, fulfillment workbench 180 also provides functionality for order and task assignment. For example, fulfillment workbench 180 may use an assignment engine to assign orders and activities to the appropriate fulfillment resource. Fulfillment workbench 180 may include a mechanism for batch re-assignment of orders thereby allowing a supervisor to re-source a set of orders from one fulfillment system to another. Fulfillment workbench 180 also provides for the assignment of fill rate and backorder rules that can automatically determine how to handle shortage situations. A universal in-box may be included within fulfillment workbench 180 in order to allow users to view activities assigned to them and respond to the task.

Fulfillment workbench 180 allows a user to view orders being processed in different layers of system 100. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 100 may also include a fulfillment layer 160. In one embodiment, fulfillment layer 160 may be an interface to external fulfillment systems, and can be used to communicate order information and fulfillment requirements to a supplier or source of the goods and/or services associated with an order.

Certain embodiments of distributed order orchestration system 100 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when making a purchase order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Figure 2:
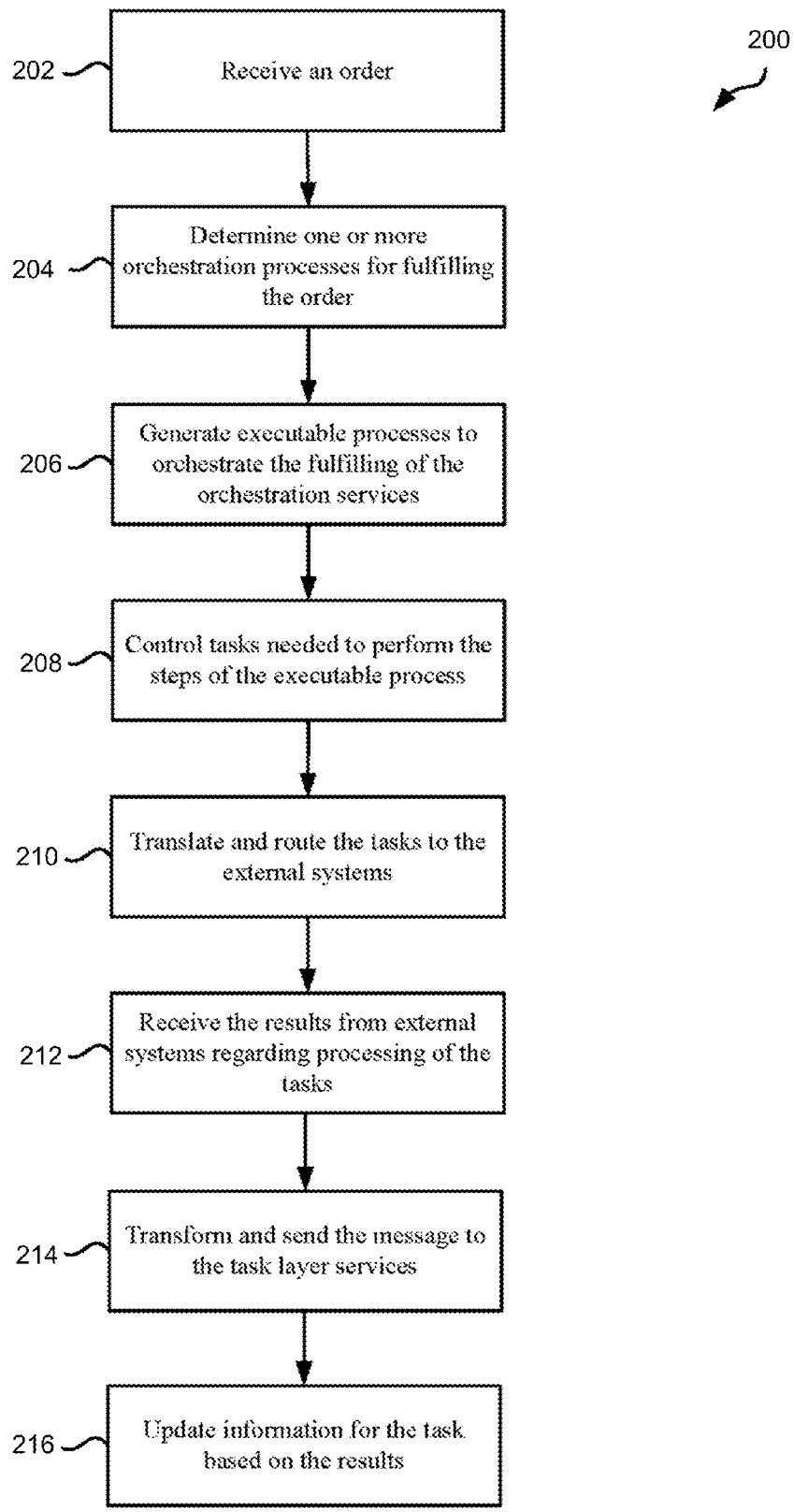
FIG. 2 illustrates a flowchart for processing an order according to one embodiment.

FIG. 2 depicts a simplified flowchart 200 for processing an order according to one embodiment. In step 202, decomposition layer 120 receives an order. In step 204, decomposition layer 120 determines one or more orchestration processes for fulfilling the order. For example, the order may be decomposed into items that need to be procured or services that need to be performed. Each item or service may have its own orchestration service.

In step 206, orchestration layer 130 generates executable processes to orchestrate the fulfilling of the orchestration services. The executable processes may have multiple steps that need to be performed for each orchestration service.

In step 208, task layer services 140 controls business functions needed to perform the steps of the executable process. Tasks to be performed for the executable process may include setting up a data structure with information and parameters that are needed to have external systems perform the tasks. The data structure may be in an internal format for system 100. For example, the task may be invoicing for an order. Parameters for performing the task are also included.

In step 210, external interface layer translates and routes the tasks to the external systems. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

In step 212, external interface layer 150 receives the results from external systems regarding processing of the tasks. When the task is performed, the result of the task is determined. The result may be a date when a shipment is scheduled, a date when a good is shipped, etc.

In step 214, external interface layer 150 transforms and sends the message to the task layer services 140. In step 216, orchestration layer updates information for the task based on the results. For example, the results may be stored in a table or database. The process then continues to the next service that can be invoked.

Further implementation details of orchestration are now described in relation to FIGS. 3-8, and in accordance with an embodiment of orchestration that utilizes a flow sequencer. However, one of ordinary skill in the art will readily appreciate that further details are merely an example of orchestration, and that orchestration may be implemented in many different embodiments, including alternative embodiments that do not utilize a flow sequencer. For example, orchestration may be implemented according to the details described in U.S. patent application Ser. No. 12/697,756, entitled "ORCHESTRATION OF BUSINESS PROCESSES USING TEMPLATES."

Figure 3:
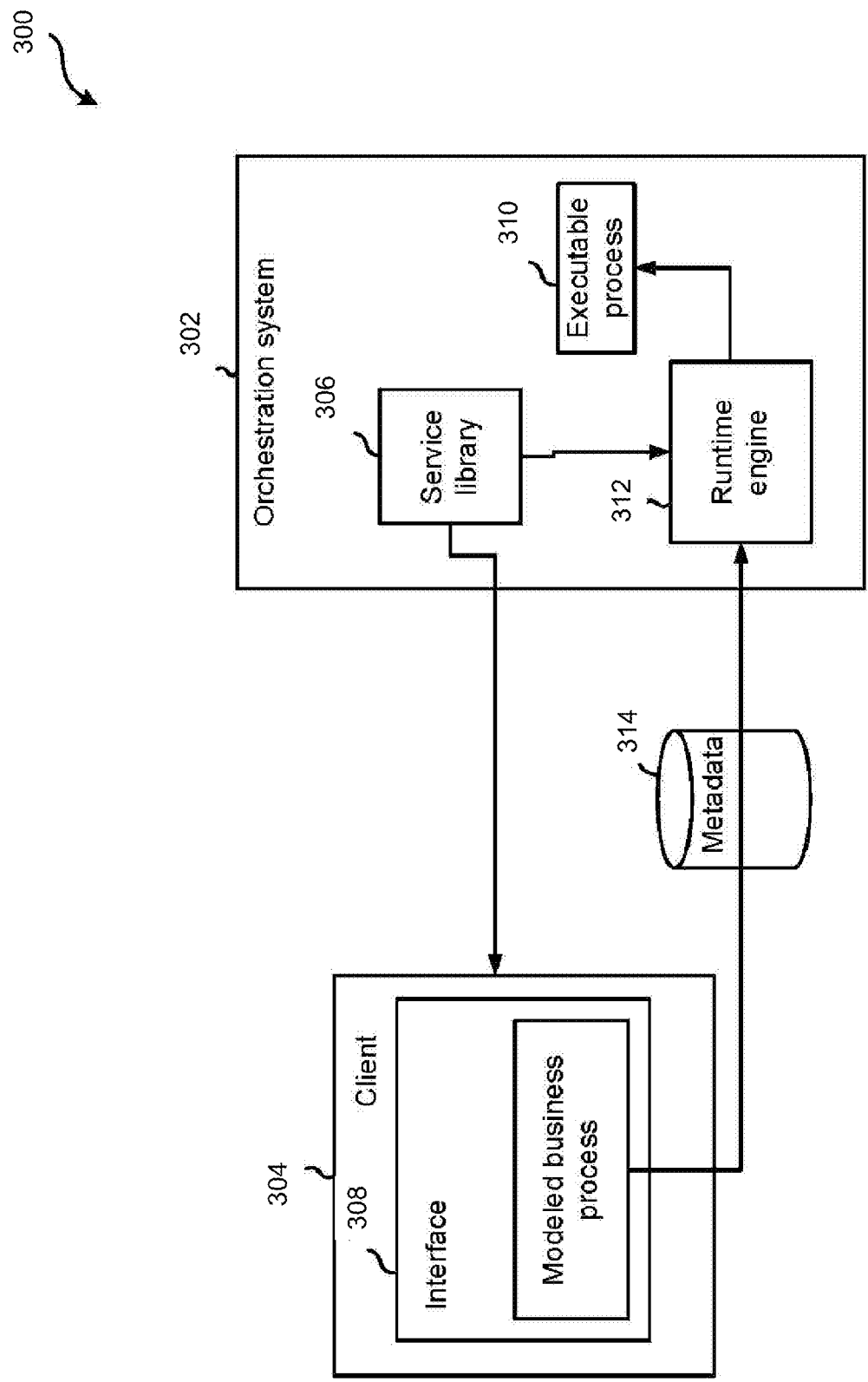
FIG. 3 illustrates an example of a system for providing an orchestration process design and authoring environment in a context of order fulfillment according to one embodiment.

FIG. 3 illustrates a system 300 for providing an orchestration process design and authoring environment in a context of order fulfillment according to one embodiment. In the embodiment, System 300 includes an orchestration system 302 and a client 304. Although single instances of orchestration system 302 and client 304 are provided, it will be understood that multiple instances may be used. Also, orchestration system 302 and client 304 may be part of a distributed computing system. That is, functions described may be distributed among various computing devices.

Client 304 may be a computing device or set of computing devices that are configured to allow a business process to be modeled. Orchestration system 302 orchestrates the invocation and running of services for an executable process 310 for the business process. Orchestration, as described, is the coordination and invoking of services that need to be performed in the business process.

As used, a business process may be modeled by a user. The business process is a definition of steps to be performed. The steps are defined in interface 308. An executable process is the process that is executed by run-time engine 312. The executable process includes code that is executed to coordinate performing of services.

A service library 306 that includes multiple services that can be included in a business process. In one embodiment, a service library 306 includes services that can be performed in an order fulfillment business process. Order fulfillment involves processes that are performed to fulfill an order. For example, an order may be received from an order capture module. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, particular embodiments create services for the services that are expected to be performed in an order fulfillment process.

Services may be non-configurable units and configurable units. Nonconfigurable units are services that are built and provided to customers. The nonconfigurable units are units that likely may be used in an order fulfillment process. For example, it is expected that different services may have to be performed in the order fulfillment process, such as account receivable. Accordingly, these services may be modeled using a language, such as BPEL. Although BPEL is described, one of ordinary skill in the art would readily understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 312 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different executable processes 310. Thus, the same deployed service is used to process different input arguments for the different orders, but different results may be obtained. In this way, the order fulfillment process can be abstracted. Different users can define which services need to be performed without regard to how the processes are coded in an orchestration language.

Interface 308 may be an administration user interface. For example, a graphical user interface allows a user to model a business process at an abstract level. For example, service library 306 may be provided to client 304. The user may then use interface 308 to define steps of the business process using services in service library 306. A user may define a plurality of steps in the business process. Each step may be associated with a service in service library 306. The steps may be stored in a data table, which may include metadata that may be used by runtime engine 312 to orchestrate executable process 310. The data table is shown as being stored in storage 314. It will be understood that the data table may be stored in any area, such as in client 304, orchestration system 302, or any other device. The metadata may be defined by the user, determined from data tables, and/or orchestration rules. The user defines the sequence in which the services are to be invoked as well as conditional or parallel branching that may be required to effect the business processing rules. When the user selects a service for a process step, the user also provides additional metadata that is used to determine how the processing data is to be executed during the processing of an order at runtime. For example, conditional or parallel branching is defined.

At runtime, runtime engine 312 receives the metadata and uses it to determine parameters for the orchestration of executable process 310. Runtime engine 312 uses the parameters to determine which steps to perform and when to perform them in executable process 310. For example, runtime engine 312 orchestrates executable process 310 by invoking services in the series of steps that have been defined by the user. As will be described in more detail below, parallel and conditional processing of steps can also be performed. Also, the metadata can be used to determine the input arguments used to invoke the services.

The metadata for the table is read at runtime and services are invoked, which allows changes to executable process 310 to be performed and realized at runtime automatically. Runtime engine 312 reads through each step that is defined and performs the steps. If a change in service is desired, the user may use interface 108 to add/delete/replace a service. At run-time, when the table is read, the change may be automatically performed.

Figure 4:
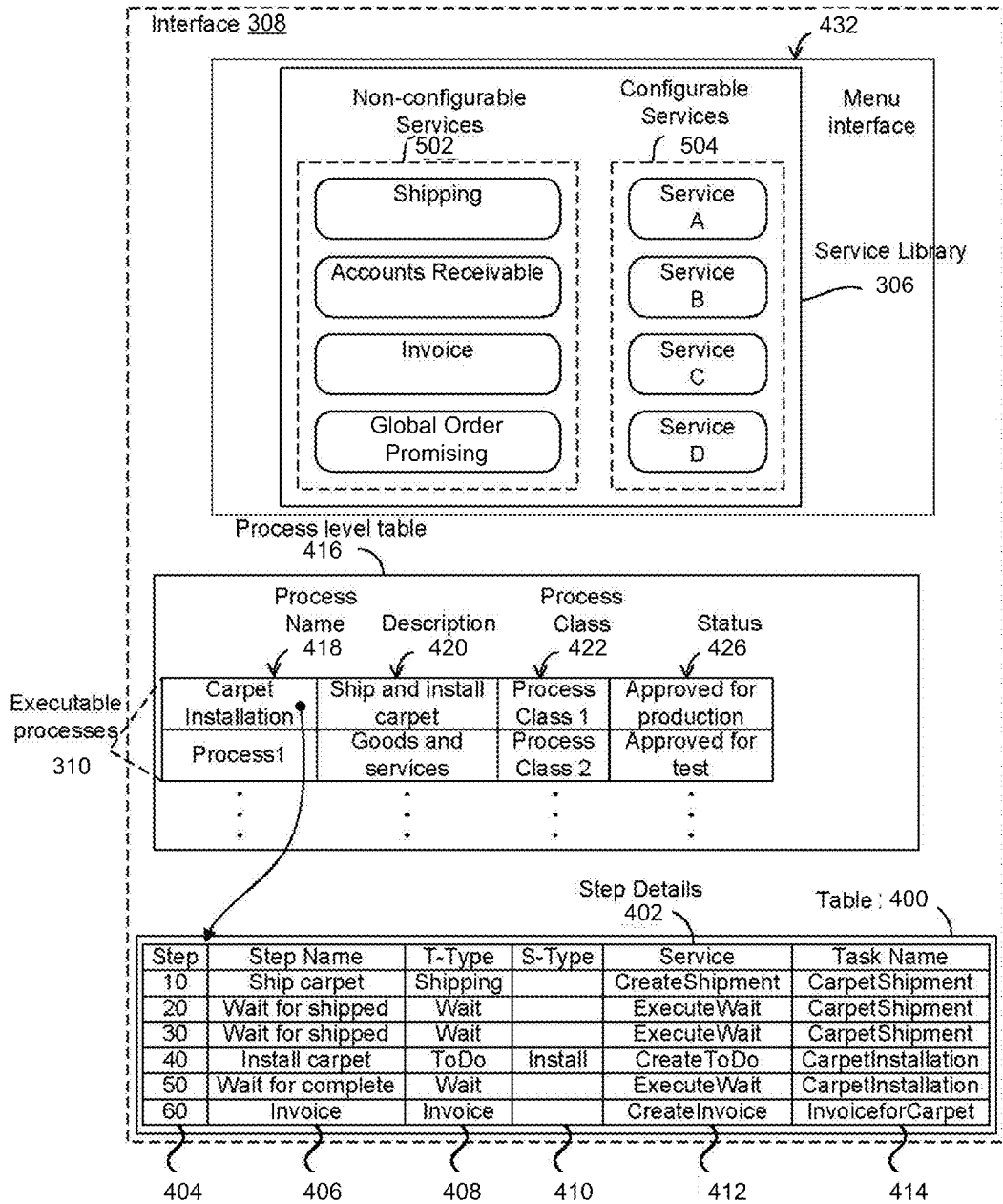
FIG. 4 illustrates an example of an interface according to one embodiment.

FIG. 4 illustrates an example of an interface 308 according to one embodiment. Process level table 416 summarizes different business processes that have been modeled. As shown, the business processes—Carpet Installation and Process 1—have been modeled by a user.

In process level table 416, a process name column 418 shows business processes carpet installation business process and process 1 have been modeled. A description column 420 describes the process. A process class column 422 describes the class of the process. A status column 426 is the status of the executable process. There may be different statuses of executable processes 310. For example, some business processes may be approved for production, approved for test, or may be new. Approved for production means that the service is approved for regular business use, approved for test is approved for testing, and new is a service in development.

A business process in table 416 can be selected and data table 400 may show the step details for individual business processes. One business process is entitled Carpet Installation and a data table 400 of step details shows each service that has been defined for the Carpet Installation.

In data table 400, a step column 404 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 308. Conditional steps are steps that depend on a result occurring (e.g., another step finishing) and parallel steps are performed in parallel. A user defines whether steps should be conditional or parallel.

Step name column 406 provides a descriptive name for the steps. For example, ship carpet, wait for shipped, install carpet, wait for complete, and invoice steps are provided.

A task type column 408 describes what type of task is being performed. For example, for the ship carpet task, an external system may perform a shipping task and for the invoice step, an invoice system may invoice for a bill.

A service column 412 identifies the service associated with the step. A task name column 414 is the name of the task. For example, those tasks have to do with carpet and are named carpet shipment, carpet installation, and invoice for carpet. If something other than a carpet is being installed, the task name will be different. For example, a sink shipment, sink installation, and invoice for sink may be the names of these tasks.

Users may use interface 308 to generate data table 400. A user may select services from a menu for service library 306. For example, a user uses a menu interface 432 to select services from service library 306. Drop-down menus, drag-and-drop options, and other visual processes may be used to define executable process 310. Users are provided with an orchestration-specific interface that presents the business process data with suitable validations, rather than being required to learn the complexities of a multipurpose IT development environment. This allows a user to model a business process in an abstract manner, but have executable process 310 be generated and executed from the model.

The services in service library 306 may be made up of non-configurable units and configurable units. For example, non-configurable units are provided in a column 502 and configurable units are provided in a column 504. As shown, services that are non-configurable include shipping, accounts receivable ("AR"), invoice, and global order promising ("GOP"). Also, configurable units are designated as A, B, C, and D. Table 400 is generated as shown in interface 308 using menu 412. Table 400 is associated with metadata that describes the services to be performed and any arguments that are needed to invoke the services.

Figure 5:
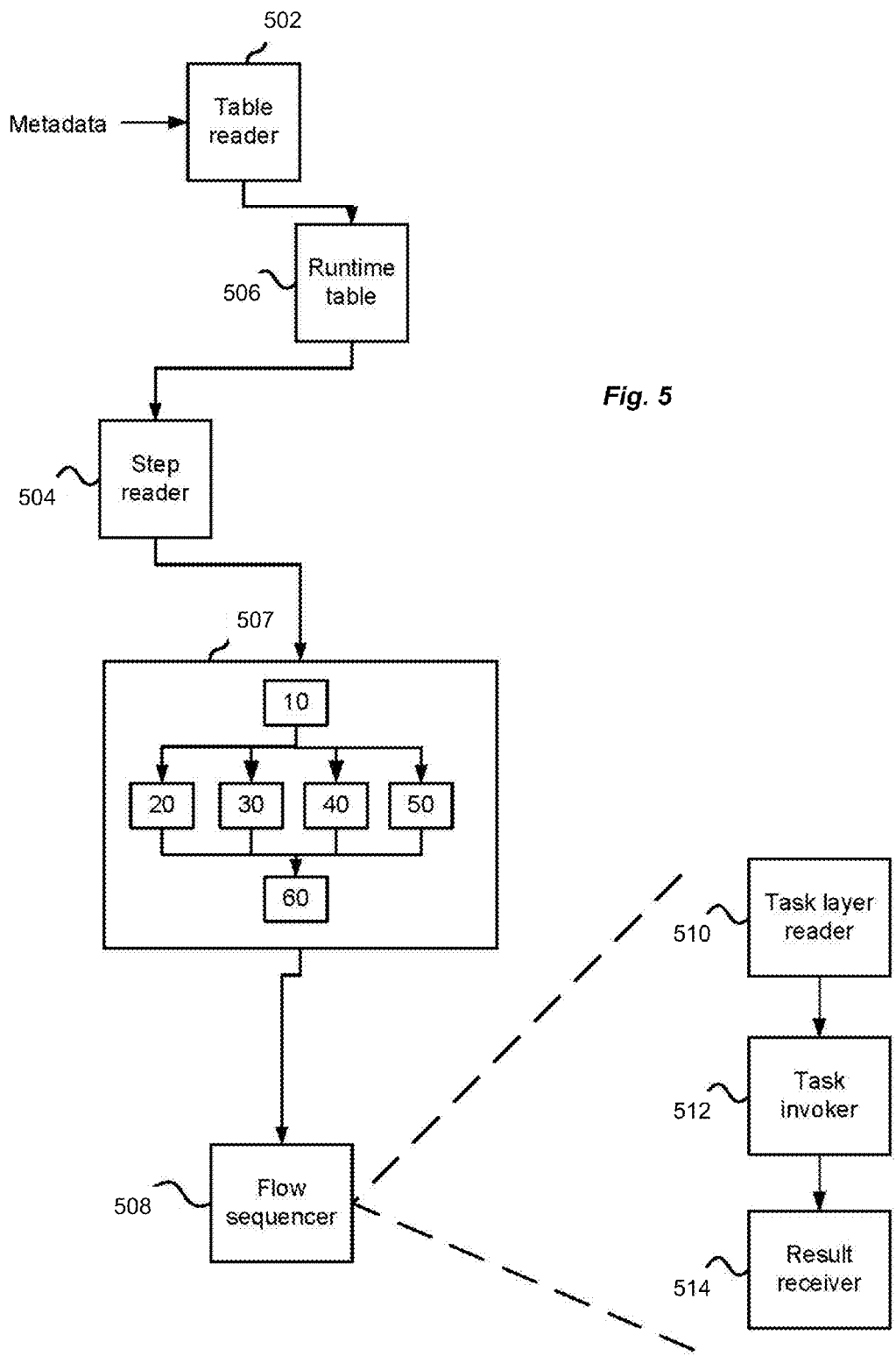
FIG. 5 illustrates the runtime operation according to one embodiment.

Once the business process is modeled in interface 308 and released by setting the process status, runtime engine 312 is used to orchestrate the invocation of the services. FIG. 5 illustrates the runtime operation according to one embodiment. In the embodiment, a table reader 502 receives metadata from interface 308 defining the business process. Table reader 502 may copy the data to a runtime table 506 but this is not necessary.

During run-time, a step reader 504 is configured to read the steps in runtime table 506, according to the embodiment. Step reader 504 may analyze the metadata and determine which steps should be executed and when. For example, step reader 504 checks to see if parallel or conditional branching is associated with a step. The metadata is also used to determine input arguments for the services. The input arguments may be determined from the metadata, from data in lookup tables, or determined using rules.

Step reader 504 may assemble executable process 310 using encapsulated services from service 306 and the metadata, according to the embodiment. For example, code for each service that was modeled in the steps is determined for executable process 310. The input arguments for each service are also determined. For example, the metadata is used to determine the input arguments such that the services can process an order for the business process. Also, any partner links are determined using the metadata to allow the services to interact with external systems. Executable process 310 is assembled based on the definition of steps in the business process. Because services are reusable, the same code for a service can be used for different business processes. However, the input arguments or partner links may be different. Because the same code is re-used, automatic assembly of executable process 310 is provided.

In the embodiment, a flow sequencer 508 is used to dynamically invoke the steps at the appropriate time based on executable process 310. As shown in box 507, a step 10 may determine a service to invoke. One of steps 20, 30, 40, and 50 are then performed. Step 60 then determines if other steps need to be performed. In this case, one of the other steps in 20, 30, 40, and 50 could be performed. Flow sequencer 508 may determine relevant input arguments depending on the content of the metadata received. These input arguments are then used to invoke a service. For example, flow sequencer 508 may include a task layer reader 510 that determines a service to invoke. A task invoker 512 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 514. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 508 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 308.

Accordingly, a user can set up the steps in a business process. Executable process 310 can be automatically assembled at run-time. The code used in executable process 310 is not generated by the user who set up the business process. Rather, metadata can be defined and is used to assemble encapsulated services for executable process 310.

Figure 6:
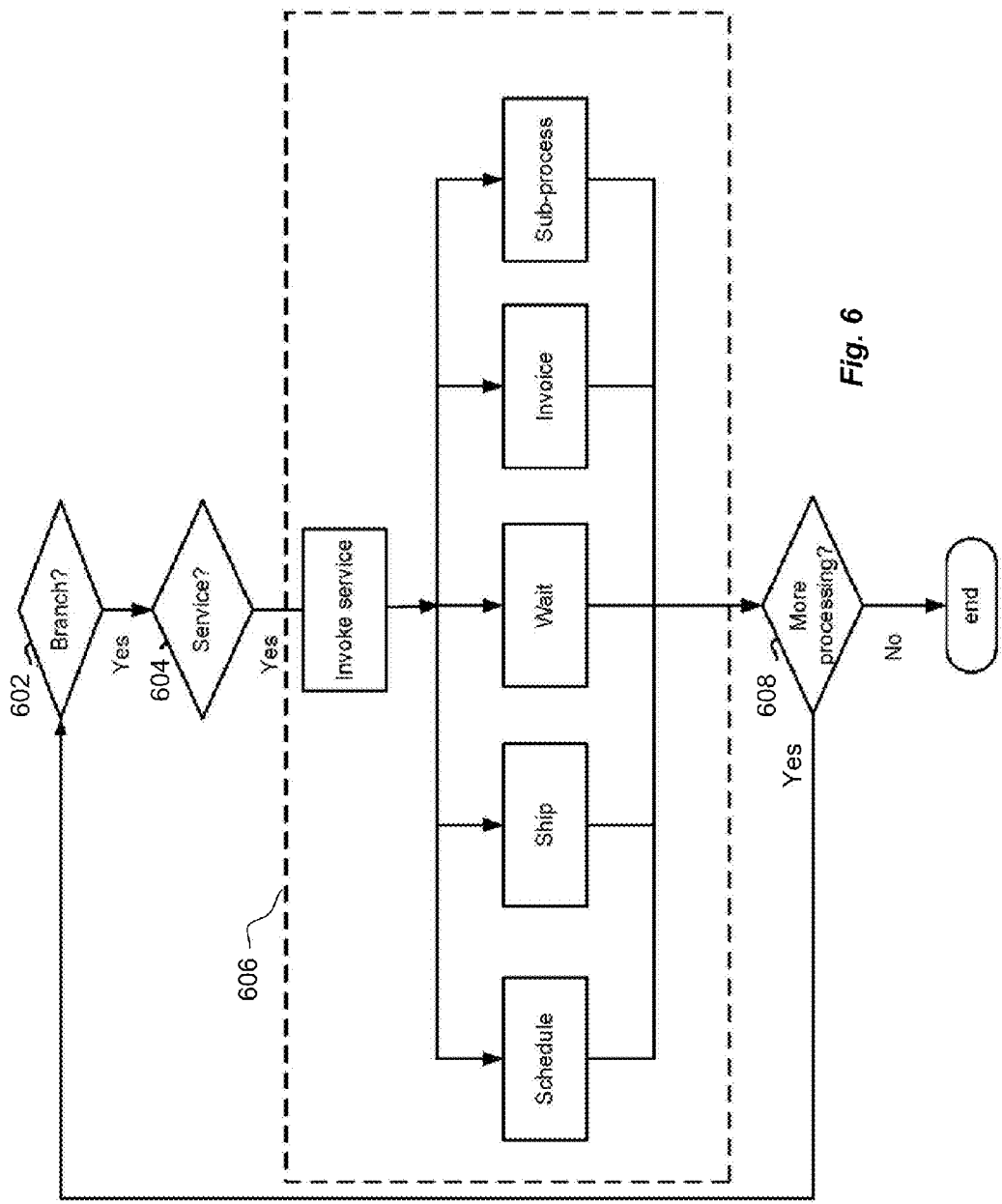
FIG. 6 illustrates an example of invocation of services using a flow sequencer according to one embodiment.

FIG. 6 illustrates an example of invocation of services using flow sequencer 308 according to one embodiment. At step 602, according to the embodiment, it is determined if branching is needed. If a conditional statement is encountered, the process proceeds down the appropriate branch based on which condition is satisfied. If parallel branching is encountered, parallel flow sequence instances are spawned to carry out the additional branches. The branching is determined and used later in invoking services. The process then proceeds to step 604 in which a service is determined.

Various services may then be performed. The steps include an invoke service step, schedule step, ship step, wait step, invoice step, and sub-process step. Identical processing sequences can flow in parallel until a unifying step is reached. Each flow sequence contains the same underlying coded process (such as a BPEL process), but different processing sequences can be used in different executable processes 310. That is, one sequence may contain Schedule, Ship, Invoice while another may contain Schedule, Activity, Ship, Activity, Invoice, although the runtime engine including the underlying coded processes do not change. That is, the code for each service that is invoked stays the same even though different executable processes are being run.

An external service invocation is contained in each branch of the flow sequencer, one branch for each service that can be invoked. The branch contains all the steps necessary to set up the data that should be included in the message to the specific external service and to format the response received from the service. Once a service is complete, the while activity module checks to see if there are further services to process and either returns to flow sequencer 508, continues to the next step in the process or waits until any parallel branches are complete.

Box 606 shows a conceptual execution of executable process 310. Not all steps may be run at once. For example, the invoke service is invoked for step 10 and determines a service to invoke. Once that is completed, step 608 determines if other steps need to be performed. In this case, step 604 determines the Schedule, Ship, Wait, Invoice, and subprocesses services should be performed. Once all the flows have been completed, a uniform set of results can be constructed. Based on the definition of the executable process, it is determined if additional processing should be performed. Different branches are performed where each branch invokes the associated service. Input arguments for the service are generated from the metadata in the runtime table. When the selected service has been performed, step 608 determines if additional services should be performed. If so, the process reiterates to step 602. If not, the process ends.

Figure 7:
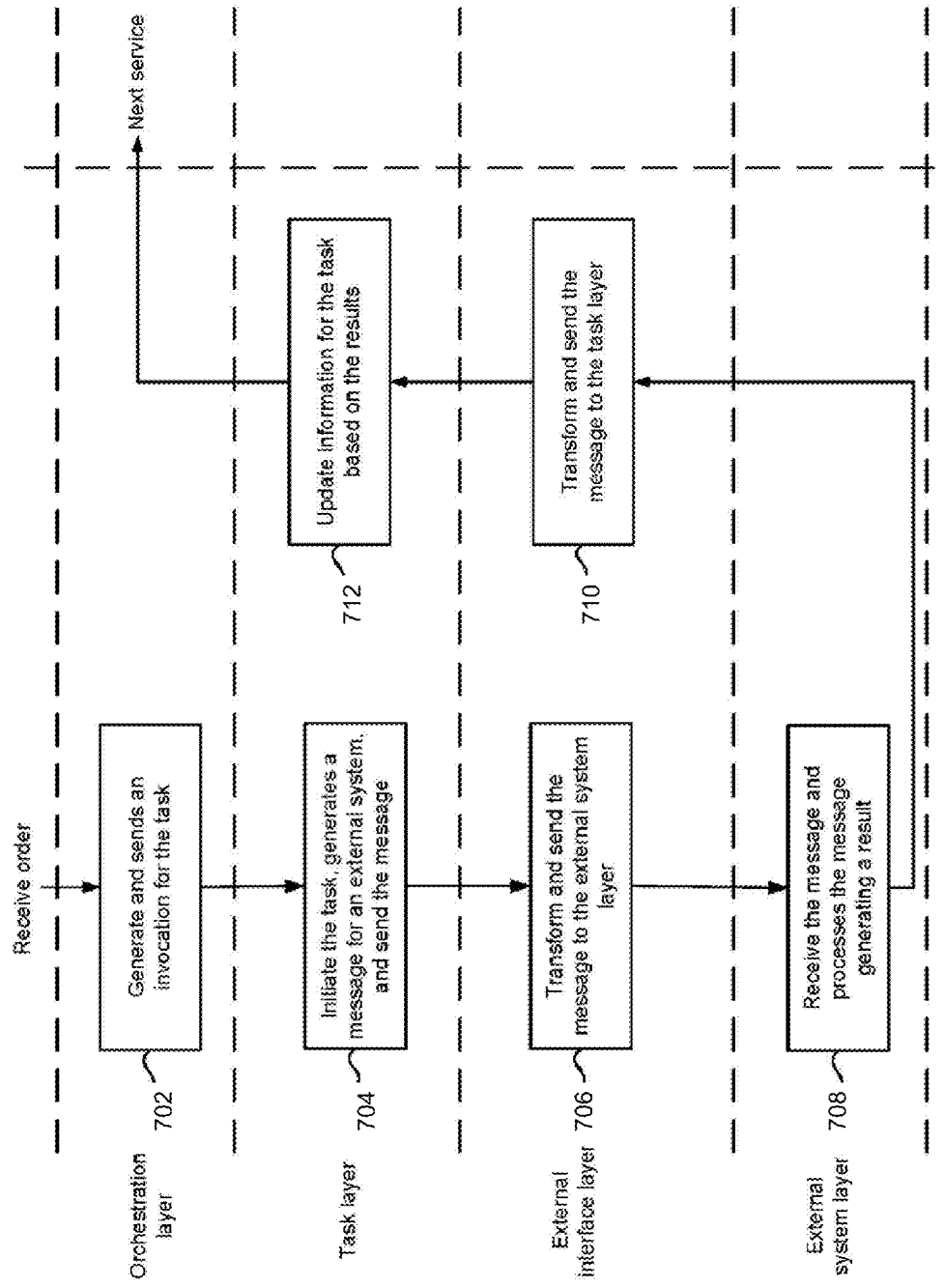
FIG. 7 illustrates a process for orchestration data flow among different layers according to one embodiment.

The orchestration of services is provided using information from table 400. However, in addition to orchestration, services need to communicate with external systems. FIG. 7 illustrates a process for orchestration data flow among different layers according to one embodiment. An orchestration layer, task layer, external interface layer, and external system layer is provided. In one embodiment, a decomposition layer (not shown) is provided before an orchestration layer.

Step 702 generates and sends an invocation for the task, according to the embodiment. An order may be received from an order capture module. This may cause a task to be invoked. The invocation request is generated using data found in the runtime table. The request is sent to the task layer.

Step 704 initiates the task, generates a message for an external system, and sends the message, according to the embodiment. The message generated indicates which task should be performed by the external system. The task to be performed is an aspect of order processing that has been modeled. For example, the task may be invoicing for an order. Parameters for performing the task are also included. The message is sent to an external interface.

Step 706 transforms and sends the message to the external system layer, according to the embodiment. The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

Step 708 receives the message returned by the external system and processes the message generating a result, according to the embodiment. The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to the external interface layer.

In the embodiment, step 710 transforms and sends the message to the task layer. Step 712 updates information for the task based on the results. For example, the results may be stored in a table or database. The process then continues to the next service that can be invoked.

By using encapsulated services that are defined using interface 308, changes can be made to an executable process 310 and implemented at runtime. For example, alterations to the metadata during the running of the process can influence the sequence of steps taken as well as the input arguments of the individual steps.

Figure 8:
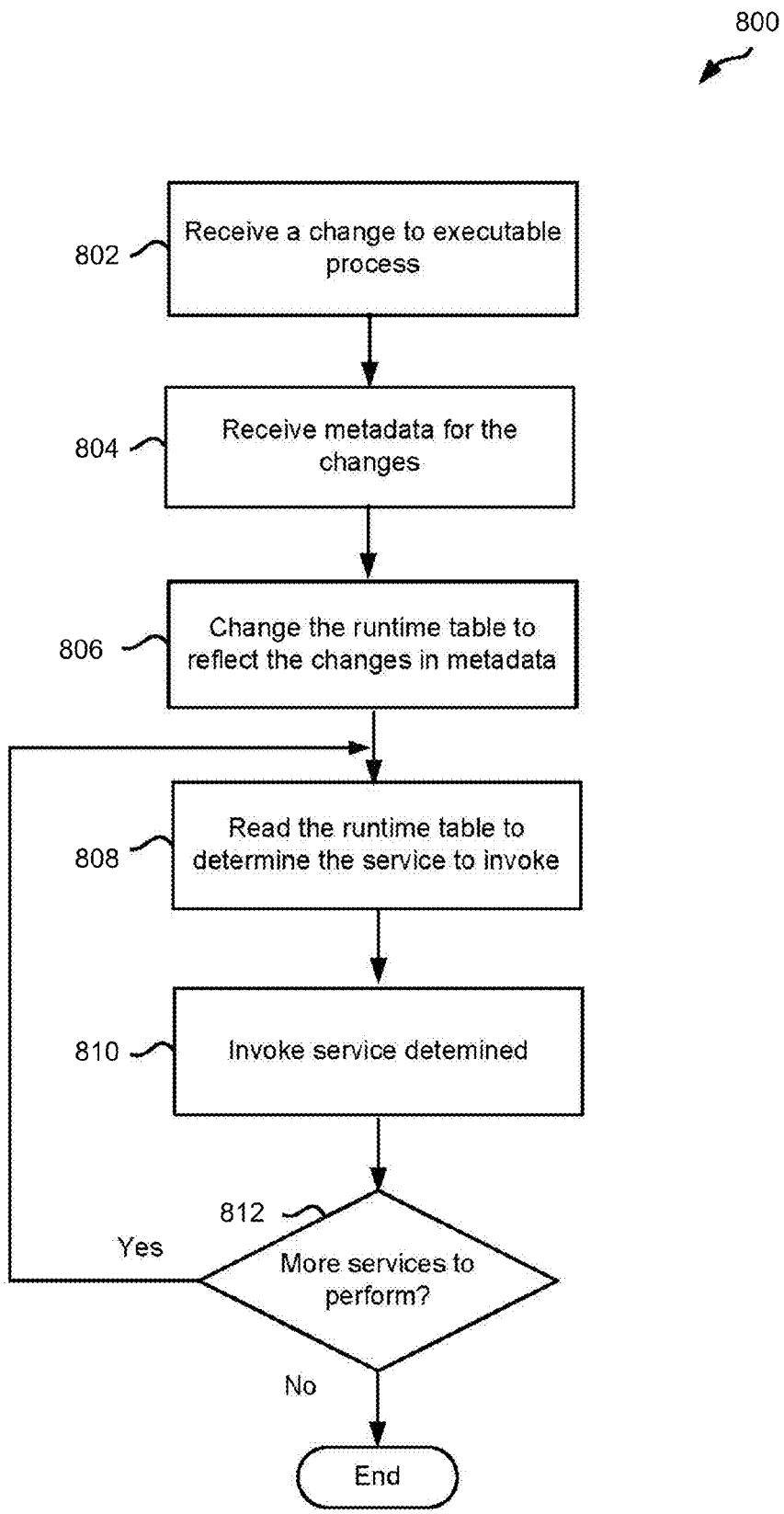
FIG. 8 illustrates a flowchart of a method for changing an executable process according to one embodiment.

FIG. 8 illustrates a flowchart 800 of a method for changing a business process according to one embodiment. In one embodiment, the functionality of flowchart 800 of FIG. 8, as well as the functionality of the flowcharts described below, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Step 802 receives a change to the business process. For example, interface 108 is used to change the business process to include different steps. In one example, steps may be replaced, steps may be deleted, or steps may be added.

Step 804 receives metadata for the changes. For example, runtime engine 312 may receive the changed metadata. Step 806 then changes the runtime table to reflect the changes in metadata. For example, executable process 310 may be changed to include different services to invoke.

When a service is to be invoked, step 808 reads the runtime table to determine the service to invoke. For example, step reader 504 may be reading the table during the processing of executable process 310. If the runtime table has been changed, step reader 504 determines the next step that needs to be performed based on the changes.

Step 810 then invokes the service determined. Because services can be called based on different input arguments, additional programming to re-deploy the new service is not needed when services in the business process are changed. Rather, the table may just be changed and different service can be automatically invoked.

Step 812 then determines if more services need to be performed. If so, the process reiterates to step 806 where the table is read again to determine the next step to perform. If not, the process ends.

Accordingly, data-driven orchestration provides abstraction and flexibility. The abstraction refers to the web-based administration of process metadata that defines the process steps in an executable process. Process code is re-used across different business processes. Flexibility refers to the ability to modify the processes without re-deployment of code. The use of changes to runtime metadata facilitates changes to executable process 310. Abstraction brings the process model closer to the business user and reduces administrative costs. Flexibility allows a business user to respond to change, such as the modification of process specifications when business processes or rules change.

Figure 9:
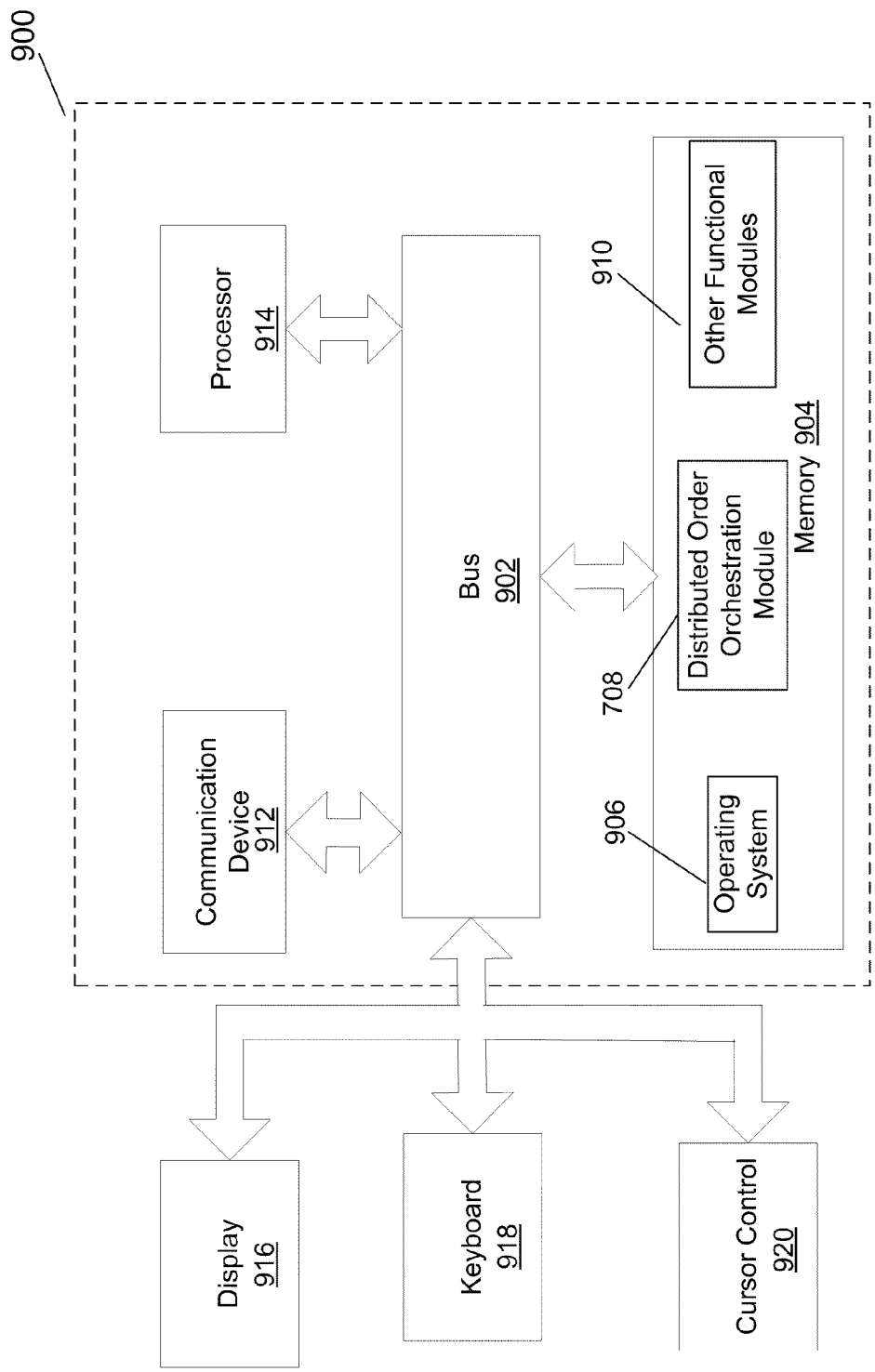
FIG. 9 illustrates a block diagram of a system that may implement an embodiment of the present invention.

FIG. 9 illustrates a block diagram of a system 900 that may implement one embodiment of the invention. In an embodiment of the invention, system 900 of FIG. 9 corresponds to orchestration system 302 of FIG. 3. System 900 includes a bus 902 or other communications mechanism for communicating information between components of system 900. System 900 also includes a processor 914, operatively coupled to bus 902, for processing information and executing instructions or operations. Processor 914 may be any type of general or specific purpose processor. System 900 further includes a memory 904 for storing information and instructions to be executed by processor 914. Memory 904 can be comprised of any combination of random access memory ("RAM"), read only memory ("ROM"), static storage such as a magnetic or optical disk, or any other type of machine or computer-readable medium. System 900 further includes a communication device 912, such as a network interface card or other communications interface, to provide access to a network. As a result, a user may interface with system 900 directly or remotely through a network or any other method. In an embodiment of the invention, a user may interface with system 900 through a client, such as client 304 illustrated in FIG. 3.

A computer-readable medium may be any available medium that can be accessed by processor 914. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 914 can also be operatively coupled via bus 902 to a display 916, such as a Liquid Crystal Display ("LCD"). Display 916 can display information to the user. A keyboard 918 and a cursor control device 920, such as a computer mouse, can also be operatively coupled to bus 902 to enable the user to interface with system 900.

According to one embodiment, memory 904 can store software modules that may provide functionality when executed by processor 914. The modules can include an operating system 906, a distributed order orchestration module 908, as well as other functional modules 910. Operating system 906 can provide an operating system functionality for system 900. Distributed order orchestration module 908 performs orchestration of a business process, as described above and further described below. System 900 can also be part of a larger system. Thus, system 900 can include one or more additional functional modules 910 to include the additional functionality. For example, functional modules 910 may include middleware modules that are part of the "Fusion" product from Oracle Corporation.

Figure 10:
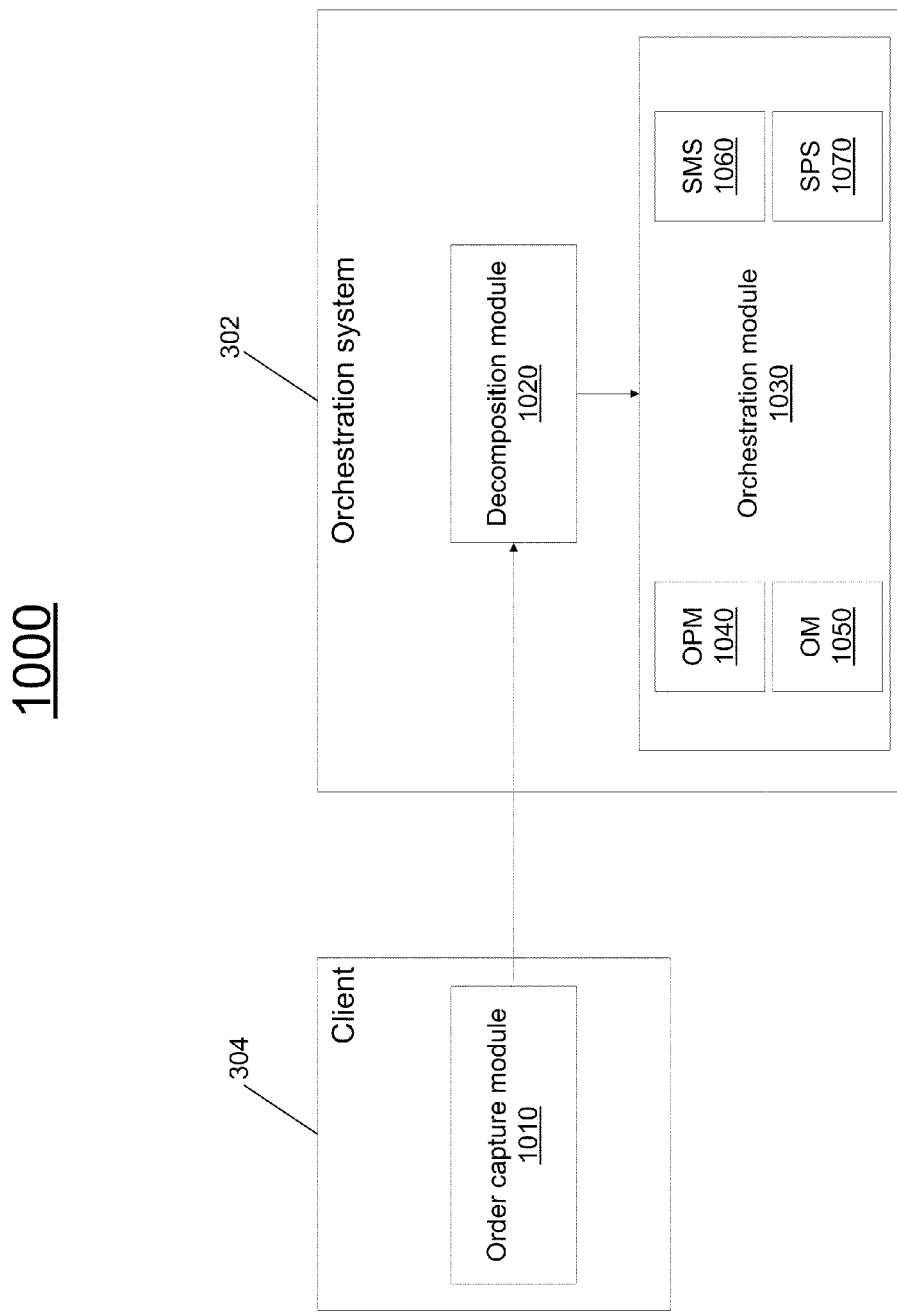
FIG. 10 illustrates a distributed order orchestration system according to one embodiment.

FIG. 10 illustrates a distributed order orchestration system 1000 which is capable of processing change requests according to one embodiment. In an embodiment of the invention, system 1000 corresponds to system 300 of FIG. 3 and only the portions of system 300 relevant to the discussion have been included in system 1000. All other portions of system 300 have been omitted for clarity purposes.

In the embodiment illustrated in FIG. 10, distributed order orchestration module 908 of FIG. 9 is represented as two modules: a decomposition module 1020 and an orchestration module 1030. However, one of ordinary skill in the art would readily recognize that a single module may provide the functionality of decomposition module 1020 and orchestration module 1030, and still be within the scope of the invention. Furthermore, distributed order orchestration module 908 of FIG. 9 may be represented as any number of modules and still be within the scope of the invention.

An exemplary embodiment of orchestration will now be described in relation to decomposition module 1020 and orchestration module 1030 illustrated in FIG. 10. However, one of ordinary skill in the art will readily appreciate that the described embodiment is merely an exemplary embodiment, and that orchestration may be implemented according to alternative embodiments and still be within the scope of the invention.

Decomposition is the conversion of data received from one or more order capture modules into an internal canonical format in order to process the data. As described above, orchestration is the coordination and invoking of services that need to be performed in the business process.

In an embodiment, decomposition module 1020 receives orders from one or more order capture modules, and acts as a mediator between the one or more order capture modules and orchestration module 1030. An order capture module is capable of capturing orders across multiple channels. In the illustrated embodiment, an order capture module is represented by order capture module 1010. In an embodiment of the invention, order capture module 1010 may capture information entered by a user via interface 308 of FIG. 3. However, one of ordinary skill in the art would readily understand that order capture module 1010 make take other forms and still be within the scope of the invention.

According to the embodiment, decomposition module 1020 is also responsible for translating and decomposing an object sent from order capture module 1010, where the object represents a order. Using the output from the translation and the decomposition, decomposition module 1020 creates a distributed order orchestration order ("DOO order") to be sent to orchestration module 1030. A DOO order is an object that represents an order received from an order capture module, and that has been transferred into an object format utilized by an orchestration system. Thus, a reference to an "order" is a reference to the business order that is entered by a user in an order capture system, whereas a reference to a "DOO order" is a reference to an entity created and implemented by an orchestration system in order to represent a business order entered by a user.

The DOO order is capable of including a distributed order orchestration header ("header"). A header is an object that contains the entire hierarchy of the order. The DOO order is capable of including one or more groups, where a group is an entity used to collect distributed order orchestration order lines ("lines") for processing in a single instance of an orchestration process. Each group is capable of including one or more lines. A line is an object that contains the information of the corresponding line of the order. Each line is capable of including one or more distributed order orchestration fulfillment lines ("fulfillment lines"). A fulfillment line is an object that corresponds to a supply action of a corresponding fulfillment system which is capable of processing the order line. Thus, a fulfillment line is a supply line that fulfills the corresponding fulfillment task.

In an embodiment of the invention, the creation of an order by decomposition module 1020 involves the following steps. First, a header is created. Next, one or more lines are created and associated with the header. Subsequently, for each line, one or more fulfillment lines are created, where a fulfillment line may be only associated with one line. Next, a service is invoked that assigns a separate executable process for each line. However, in certain embodiments of the invention, the step of assigning a separate executable process for each line is omitted, and a single executable process is used to process the entire DOO order. In either scenario, decomposition module 1020 selects an executable process based on the name and creation date of the executable process.

Below is example pseudo-code for selecting an executable process according to one embodiment:
select doo_process_id, doo_process_version from DOO_PROCESS_DEFINITION_B where process_name=:1 and (:2 between effective_start_date and effective_end_date) and main_process_flag='1' and Process_release_status_code='RELEASED';

However, one of ordinary skill in the art would readily appreciate that the above pseudo-code is merely an example according to an embodiment, and that computer code for selecting an executable process could take many different forms and still be within the scope of the invention.

Finally, according to the embodiment, decomposition module 1020 saves the state of the DOO order, as will be discussed in a separate section in more detail.

Orchestration module 1030 controls the sequences of events that occur while processing and fulfilling DOO orders created by decomposition module 1020 through the creation of executable processes. In the embodiment illustrated in FIG. 10, orchestration module 1030 comprises a sub-module Order Process Manager ("OPM") 1040, and three core processes Orchestration Manager ("OM") 1050, Step Manager Service ("SMS") 1060, and Split Process Manager (SPM") 1070. However, one of ordinary skill in the art would readily appreciate that this is an example, and that orchestration module 1030 may contain any number of sub-modules and processes, and still be within the scope of the invention.

According to the embodiment, decomposition module 1020 invokes OPM 1040 of orchestration module 1030 by passing in the header identity of the DOO order. OPM 1040 is capable of launching one or more executable processes, and is also capable of interacting with, and controlling, the one or more executable processes. OM 1050, SMS 1060, and SPM 1070 are the core modules that make up an executable process which controls a sequence of events that can occur while processing and fulfilling DOO orders created by decomposition module 1020. OM 1050 is invoked by OPM 1040, and is capable of executing process steps for a given group. SMS 1060 is invoked by OM 1050 and is capable of encapsulating business logic for pre-processing, error handling, and change management. SPM 1070 is invoked by OM 1050 and is capable of handling split units. A split unit defines a sequential set of steps in an executable process that can be split together. For example, an executable process can include the steps of Schedule, Ship, and Invoice. In the example, a split unit may be defined which includes the Schedule and Ship steps, but does not include the Invoice step. Based on this split unit definition, in a scenario where the executable process splits, the resulting Split steps can proceed in parallel, and only when both steps are completed can the Invoice step be invoked.

In the embodiment, OPM 1040 determines an appropriate executable process to orchestrate the DOO order. For each group in the DOO order, OPM 1040 determines the executable process by looking up a group table and subsequently launching the executable process for that group. Prior to launching the executable process, OPM 1040 invokes a service to assemble the executable process, if the executable process does not already exist. In an embodiment of the invention, OPM 1040 is also capable of querying a list of task services to be performed at header level and perform them in a sequence defined by the user.

OM 1050 is an example of the previously-identified executable process whose life cycle begins when OPM 1040 invokes it asynchronously. OM 1050 terminates when it has executed all its process steps. According to the embodiment, OM 1050 is responsible for initiating the invocation of a task layer service as defined by the business process. Furthermore, OM 1050 has logic to differentiate between split units and non-split units. For split units, OM 1050 can initiate the invocation of SPM 1070, which handles the split units.

SMS 1060 is also invoked by OM 1050. While OM 1050 acts as a process orchestration engine, SM 1060 functions as a step orchestration engine. Specifically, in the embodiment, SMS 1060 accepts requests from OM 1050, retrieves runtime information for each step, marks the step status as "started," sends the request to the task layer, process the response from the task layer, and finally sends back the control to OM 1050.
Change Management Framework As previously described, the elemental core of distributed order orchestration functionality is that it uses an orchestration process for orchestrating an order. The orchestration process controls the sequence of events that can occur while processing and fulfilling orders.

As also previously described, business processes can be long-running processes that consist of several business steps. A business step, in one embodiment, is always defined by a user and represents a step in the business flow. A business step in a distributed order orchestration business process involves either a task layer service, or a sub-process. A business step cannot participate in a process transaction because it cannot be undone automatically if the process transaction rolls back.

One of the key requirements of the core functionality is to manage change requests while processing and fulfilling orders. A change request comprises a new order that references the original order. The new order also comprises modifications to the original order, and thus, comprises modifications to business steps that comprise a business process. Therefore, a change request may cause significant alteration to the business process (and thus, the corresponding executable process) that is currently underway. A process transaction is insufficient to process change requests because several of the business steps of a business process interact with external fulfillment systems, and thus, go beyond the transaction boundary. Therefore, these business steps require special logic to accommodate change requests.

According to an embodiment of the invention, the distributed order orchestration system is able to receive a change request and determine the modifications between an original order and a new order (also referred to as "a modified order"). The modifications between the original order and the new order can then be used to determine what business process changes are necessary to respond to the change request. Thus, the system is able to cope with cases where the steps of the new business process are in conflict with steps of the original business process that are underway or that have already been completed. In addition to automatically adjusting past business steps of the original business process, the distributed order orchestration system is able to incorporate changes to business steps that have yet to be executed.

It is important to note that orchestration language compensation (such as BPEL compensation) and distributed order orchestration change management are very different. BPEL compensation is used for rolling back the effect of the executed activities in the process because of error conditions in the executable processes. Distributed order orchestration change management not only involves undoing of previously-executed steps in the business process, but also includes the forward propagation of changes in the steps of a business process that have not yet been executed. In other words, the latter requires the capability to undo or redo previously-executed steps and to update steps that not yet been executed. Furthermore, the undoing of a previously-executed step may be more than just a rollback to a prior state. Instead, it may require an invocation of a service to take a suitable undo action.

In an embodiment of the invention, the change management framework is provided via a framework scope with nested functional scopes. The framework scope is responsible for performing the steps of the business process in regular mode or change mode. When an executable process of a distributed order orchestration system is run for the first time, the executable process is run in regular mode. In regular mode, the steps of the executable process are dynamically performed at the appropriate time, as previously discussed in a separate section. However, when a change request is received, the distributed order orchestration system stops the original executable process (and all of its child processes) and initiates a new executable process in change mode. In an embodiment, stopping the original executable process includes terminating the original executable process. However, in an alternative embodiment, stopping the original executable process includes pausing the original executable process, where the original executable process can be resumed at a later point in time. The new executable process correlates to the original executable process in order to allow change processing. In change mode, the appropriate change steps are performed to automatically adjust the steps of the original executable process that have already been executed. The change steps are performed using the previously-saved state of the original executable process. Once the change steps have been performed, the remaining steps of the new executable process are performed using the current state of the new executable process in regular mode. In an embodiment of the invention, an executable process can save the state of the process at every milestone. The saved state can be used in the change mode for undoing or redoing the steps of the executable process that were performed in regular mode.

Below is example pseudo-code for performing the steps of an executable process in regular mode or change mode:

```
boolean continue_ = true;
boolean changeMode = getChangeMode( );
while (continue_) {
    if (changeMode) {
        if (isChanged( )) {
            //Compensate based on Compensation pattern
            String pattern =
                !CANCEL ? getCompensationPattern( ) : "CANCEL";
            if (pattern == UPDATE) {
                invokeUpdateOperation( );
                continue_ = false;
            } else {
                invokeCancelOperation( );
                if (isProcessBeingCancelled( )) {
                    continue_ = false;
                } else {
                    changeMode = false;
                }
            }
        } else {
            //This step does not have change implications
            continue_ = false;
        }
    } else {
      invokeCreateOperation( );
      continue_ = false;
    }
} //end while
```

As can be seen from the above pseudo-code, when the mode of the executable process is regular mode, the executable process performs the business steps associated with the executable process, which is indicated by the invokeCreateOperation( ). When the mode of the executable process is change mode, for each step associated with the executable process, the executable process checks if the step has change implications. Such change implications may include, whether the step run in the original business process before, and if the step was run, whether the change request requires that the step be undone or redone. If the step has change implications, the executable process automatically adjusts the step, which is indicated by either the invokeUpdateOperation( ) or the invokeCancelOperation( ). The automatic adjustment is discussed in greater detail in a separate section.

Furthermore, one of ordinary skill in the art would readily appreciate that the above pseudo-code is merely an example according to an embodiment, and that computer code for selecting an executable process could take many different forms and still be within the scope of the invention.

Figure 11:
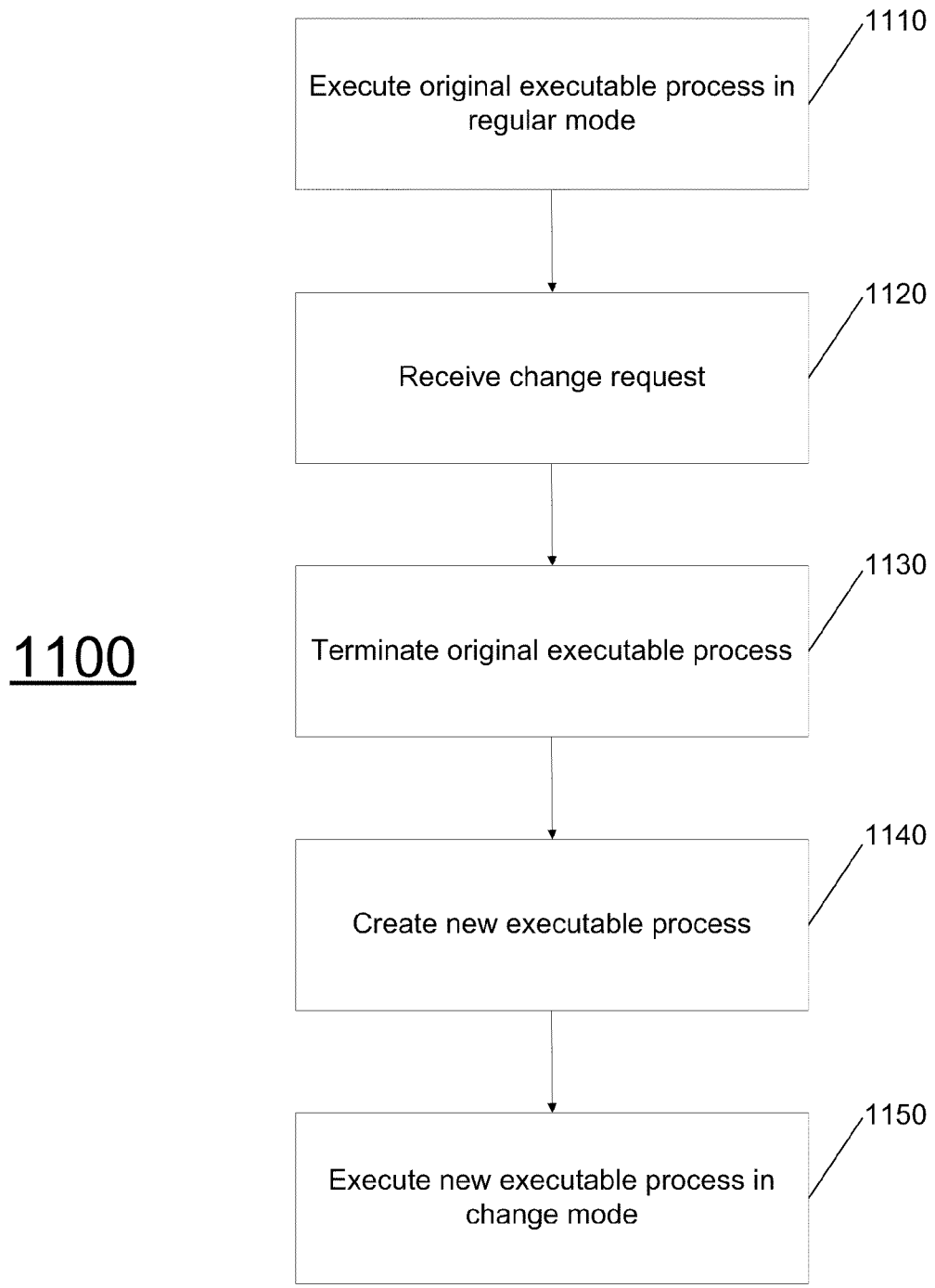
FIG. 11 illustrates a flowchart of a method for processing a change request according to one embodiment.

FIG. 11 illustrates a flowchart 1100 of a method of processing a change request, according to one embodiment of the invention. At 1110, an original executable process is executed in regular mode. As previously described, when an executable process is executed in regular mode, the executable process executes the steps which comprise the executable process and invokes the corresponding service for each step, as discussed in reference to FIG. 5.

At 1120, a change request is received. As discussed above, the change request comprises a new order captured by an order capture module that references an original order, where the new order comprises modifications to the original order. The change request is processed in the same way as an order is processed, as previously discussed above, and a new DOO order is created.

At 1130, the original executable process is stopped. The stopping of the original executable process may involve the stopping of any child processes that have been created by the original executable process. In an embodiment of the invention, the original executable process is terminated. In an alternative embodiment, the original executable process is merely paused. In this embodiment, the original executable process is capable of being resumed at a later point in time.

At 1140, a new executable process is created. More specifically, the executable process is created based on the new DOO order, which in turn, is based on the new order contained within the received change request.

At 1150, the new executable process is executed in change mode. When the new executable process is run in change mode, the executable process performs change steps to modify steps that were performed by the original executable process. The new executable process also performs the steps that were not performed by the original executable process using the differences between the original DOO order and the new DOO order.

Figure 12:
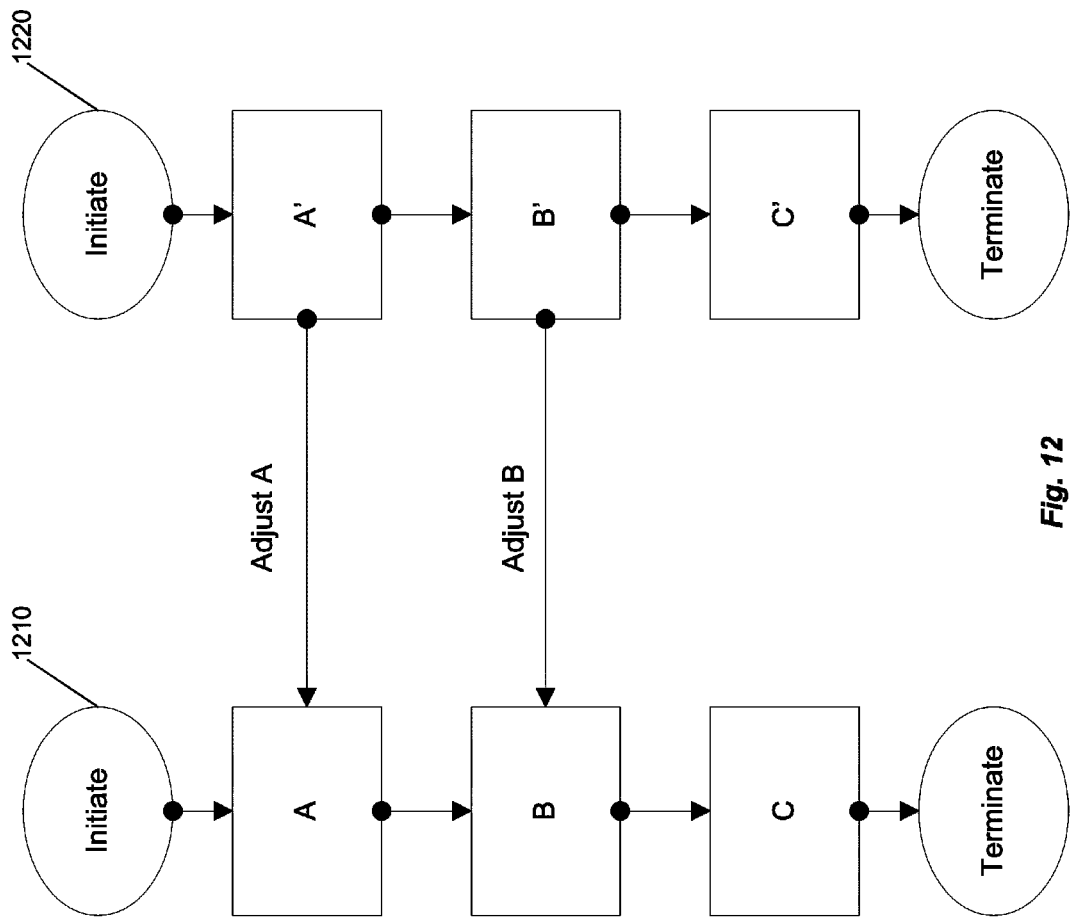
FIG. 12 illustrates an example of a change request flow according to one embodiment.

FIG. 12 illustrates a flowchart 1200 detailing an example of a change request flow according to one embodiment. In flowchart 1200, flow 1210 represents the flow of an original executable process. For example, the original executable process may correspond to a business process for ordering carpet. The original executable process performs steps A, B, and C. In the above example, step A comprises selecting the carpet from an inventory, step B comprises measuring the carpet according to requested dimensions, and step C comprises shipping the carpet.

In the embodiment, a change request (not shown) is received after step B has been completed, but before step C has been initiated, where the change request changes the carpet order to a tile order, where the process for ordering carpet and the process for ordering tiles use the same business process. Therefore, the original executable process is stopped, and a new executable process is initiated. In the above example, the new executable process corresponds to a business process for ordering tiles. In flowchart 1200, flow 1220 represents the flow of the new executable process. The new executable process performs steps A', B', and C'. Step A' comprises adjusting the already-completed step A. The adjustment of step A may take one of a number of forms depending on the underlying business process. In the illustrated example, the adjustment of step A may comprise adjusting the selection of a carpet from an inventory to the selection of tiles from an inventory. If the previously selected inventory does not included tiles, the adjustment may further comprise selecting a different inventory which does include tiles. Similarly, step B' comprises adjusting the already-completed step B, and may take one of a number of forms depending on the underlying business process. In the illustrated example, the adjustment of step B may comprise measuring the tile and replacing the measurement of the carpet with the measurement of the tile. Finally, step C' comprises the shipping of the tile. Because step C was never performed by the original executed process, an adjustment of step C is not required, and thus, is not performed. However, step C' is performed based on the new order, as opposed to the original order. Thus, in the illustrated example, step C' comprises shipping the tile, as opposed to shipping the carpet.

An exemplary embodiment of orchestration change management will now be described in relation to decomposition module 1020 and orchestration module 1030 illustrated in FIG. 10. However, one of ordinary skill in the art will readily appreciate that the described embodiment is merely an exemplary embodiment, and that orchestration change management may be implemented according to alternative embodiments and still be within the scope of the invention.

In an embodiment, decomposition module 1020 and orchestration module 1030 of FIG. 10 are capable of processing a request to change an order (i.e., a change request), as well as processing an order. In the event that an order capture module sends a change request, decomposition module 1020 can process the change request in the same way that decomposition module 1020 processes an original order, previously described with reference to FIG. 10, except for the following key differences.

First, according to the embodiment, decomposition module 1020 identifies that the new order received from an order capture module is not a genuine new order, but instead is part of a request to change an original order (i.e., a change request). Next, decomposition module 1020 checks to see if a change is allowed on the original order. The check comprises reviewing the status of the original order and the state of the corresponding executable process. If either the order status or the process state has a constraint that prevents change requests, then the change request is rejected. However, if a change is allowed, decomposition module 1020 notifies orchestration module 1030 to prepare for processing a change request. Next, decomposition module 1020 creates a new DOO order. The new DOO order references the original DOO order. Then, decomposition module 1020 correlates and maps the new DOO order with the original DOO order. The specifics of the correlation and mapping are discussed in greater detail in a separate section. Decomposition module 1020 also computes a delta between the new DOO order and the original DOO order. The specifics of the computing of the delta are discussed in greater detail in a separate section. Finally, decomposition module 1020 sends the new DOO order to orchestration module 1030.

According to the embodiment, orchestration module 1030 is able to process change requests by having OPM 1040 listen for both change notifications and change requests. A change notification is merely a notification from the decomposition module to prepare for processing a change request, in contrast to the actual change request. In the event of a change request, OPM 1040 first receives a change notification, and subsequently receives the actual change request.

When OPM 1040 receives a change notification, according to the embodiment, OPM 1040 is capable of notifying each OM 1050 invoked by OPM 1040. Based on this notification, OM 1050 does not execute any new tasks. When OPM 1040 receives a change request, OPM 1040 is capable of determining if the current executable process can accept change requests. If the process cannot accept change requests, then OPM 1040 can reject the entire change request. If the process can accept change requests, OPM 1040 can process the change request as described below.

In processing the change request, according to the embodiment, OPM 1040 first invokes notification services that are registered as part of each step of the executable process to determine if each notification service can accept a change request. If any of the registered notification services indicate that they cannot accept a change request, OPM 1040 rejects the entire change request, and the change request processing ends.

However, if all of the registered notification services indicate that they can accept a change request, the change request processing continues. OPM 1040 then notifies the wait step associated with the executable process to stop. OPM 1040 then merges the new DOO order with the original DOO order, according to the embodiment.

In the embodiment, OPM 1040 then adjusts group information for the new DOO order. When decomposition module 1020 creates a new DOO order, decomposition module 1020 creates a new group for each line and fulfillment line of the new DOO order. Depending on whether or not each line and fulfillment line is new, OPM 1040 can adjust references keys, activate certain groups, and deactivate other groups.

In order to adjust group information according to one embodiment, for each line of the new DOO order, OPM 1040 determines whether the line existed in the original DOO order. If the line existed in the original DOO order, then OPM 1040 further determines if the line has changed in the new DOO order. If the line did not exist in the original DOO order, OPM 1040 activates the group that decomposition module 1020 created for the new line, and sets the attribute delta (which is discussed in more detail in a separate section) for the line. If the line did exist in the original order, and has not been changed in the new order, OPM 1040 continues to use the previous group from the original DOO order. If the line did exist in the original order, and has been changed in the new order, OPM 1040 activates the group that decomposition module 1020 created for the modified line, sets the attribute delta (which is discussed in more detail in a separate section) for the line, and deactivates the previous group created for the original order. OPM 1040 also performs these steps for each fulfillment line of the new DOO order.

However, in alternative embodiments, OPM 1040 can adjust group information based on different criteria and still be within the scope of the invention.

Below is example pseudo-code for adjusting group information for the new order:

```
correlateAndComputeDeltaForGroups (Map ChangedLines2OriLine,
Map ChangedFLines2OriFLine)
    1. Query Group table for original_header and changed_header
    2. Now iterate over the records on changed_header:
    3. For each Line in changed_header from GroupTable
    Long   changedLineId  = next( );
    Long   orgLineId =   ChangedLines2OriLine.get(changedLineId)
    If the orgLineId  == null (line does not exist in original group info) {
    it is Line_add
    turn attribute_delta for this row
    Activate this group
    } Else {
    Change "changedLineId"  Line to orgLineId  in the groups table
    Set Reference_group_id of changed group to original_group_id
    If Changed_line.delta_type > 0 {
    Turn attribute_delta for this row
    Activate this group
    Deactivate the previous group from original order
         } // end If Changed_line.delta_type > 0
            } // end else
    4. Repeat step 3 for FLines.
```

However, one of ordinary skill in the art would readily appreciate that the above pseudo-code is merely an example according to an embodiment, and that computer code for selecting an executable process could take many different forms and still be within the scope of the invention.

Subsequently, according to the embodiment, OPM 1040 processes a computed delta between an original DOO order, and a new DOO order. How the delta is computed is discussed in more detail in a separate section. However, once the delta is computed, OPM 1040 determines the delta type and performs one of the following set of actions.

If the delta type is an add line delta (i.e., a new line is being added), and the line is being added to new DOO order, in an embodiment of the invention, OPM 1040 can start a new executable process for that line and can monitor it along with the other executable processes for the new DOO order. In the embodiment, OPM 1040 can also change the references for the group from the new DOO order to the original DOO order. OPM 1040 can perform this operation regardless of whether the new line is merely being added to the new DOO order, or whether the new line is also being added to a new group of the new DOO order.

In an alternative embodiment, if the delta type is an add line delta, and the line is being added to an existing group of the new DOO order, OPM 1040 can start a new executable process, and change the references as discussed above. In addition, OPM 1040 can merge the newly created group with the existing group of the new DOO order. An example of this merging is merging the newly created group with the existing group based on an item relationship and a shared process definition.

If the delta type is a cancel line delta (i.e., a line is being cancelled), in an embodiment of the invention, OPM 1040 can notify the appropriate executable process to cancel the line. The cancel operation is discussed in more detail in a separate section.

If the delta type is a delta attribute change delta (i.e., one or more delta attributes of a header, line, or fulfillment line have changed), in an embodiment, OPM 1040 can notify the appropriate executable process to update the attributes. In an embodiment of the invention, if the changed attribute is a quantity attribute, this change is treated separately by OPM 1040 to minimize the need for adjustment, and for better optimization. Specifically, for a quantity increase, OPM 1040 starts a new executable process for the appropriate line, and monitors it along with the other executable processes for the DOO order. However, for a quantity decrease, OPM 1040 will adjust the original executable process by executing the new executable process in change mode as previously discussed, and discussed in more detail below.

If the delta type is a dynamic delta attribute delta (i.e., one or more dynamic delta attributes of a header, line, or fulfillment line have changed), in an embodiment, OPM 1040 adjusts the original executable process by executing the executable process in change mode as previously discussed, and discussed in more detail below. In an embodiment of the invention, a user can indicate at an interface of an order capture module when defining a business process, or defining a step of a business process, whether an orchestration system should ignore changes to dynamic delta attributes. As defined in a separate section, dynamic delta attributes are attributes that a user defines as delta attributes.

Finally, according to an embodiment, OPM 1040 closes the new order and invokes the new executable process. In FIG. 10, as previously discussed, the new executable process is identified as OM 1050.

With respect to OM 1050, OM 1050 listens for a change request, according to an embodiment. Once OM 1050 receives a change request, it processes the change request, which is discussed in greater detail below.

Figure 13:
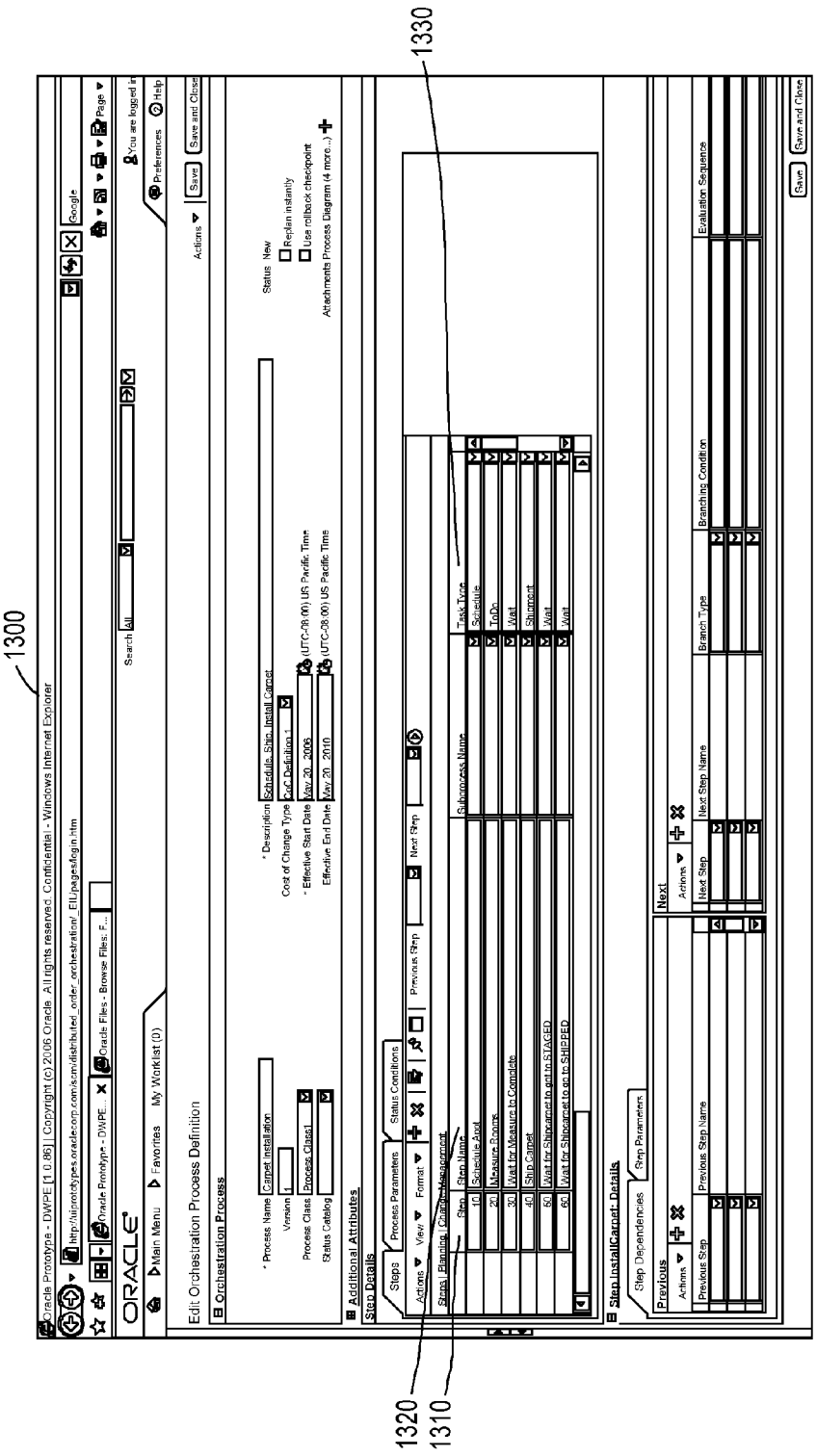
FIG. 13 illustrates a user interface of a distributed order orchestration system according to one embodiment.

FIG. 13 illustrates an example of a user interface 1300, according to one embodiment of the invention. In an embodiment of the invention, user interface 1300 corresponds to interface 308 of FIGS. 3 and 4. User interface 1300 allows a user to model a business process. For example, user interface 1300 displays the Carpet Installation business process. In user interface 1300, a step column 1310 identifies the steps of business process. The user is able to add, delete, and edit steps of a business process via user interface 1300. For example, step column 1310 identifies steps 10, 20, 30, 40, 50, and 60 of the business process Carpet Installation. A step name column 1320 identifies the name of each step of the business process. The user is able to create a name for each step via user interface 1300. For example, step 10 is titled "Schedule Appt," step 20 is titled "Measure Rooms," step 30 is titled "Wait for Measure to Complete," step 40 is titled "Ship Carpet," step 50 is titled "Wait for Shipcarpet to go to STAGED," and step 60 is titled "Wait for Shipcarpet to go to SHIPPED." A task type column 1330 identifies the task type of each step of the business process. The user is able to assign a task type to each step via user interface 1300. For example, step 10 is of the task type, "Schedule," step 20 is of the task type "ToDo," step 30 is of the task type "Wait", step 40 is of the task type "Shipment," and steps 50 and 60 are each of the task type "Wait."

Figure 14:
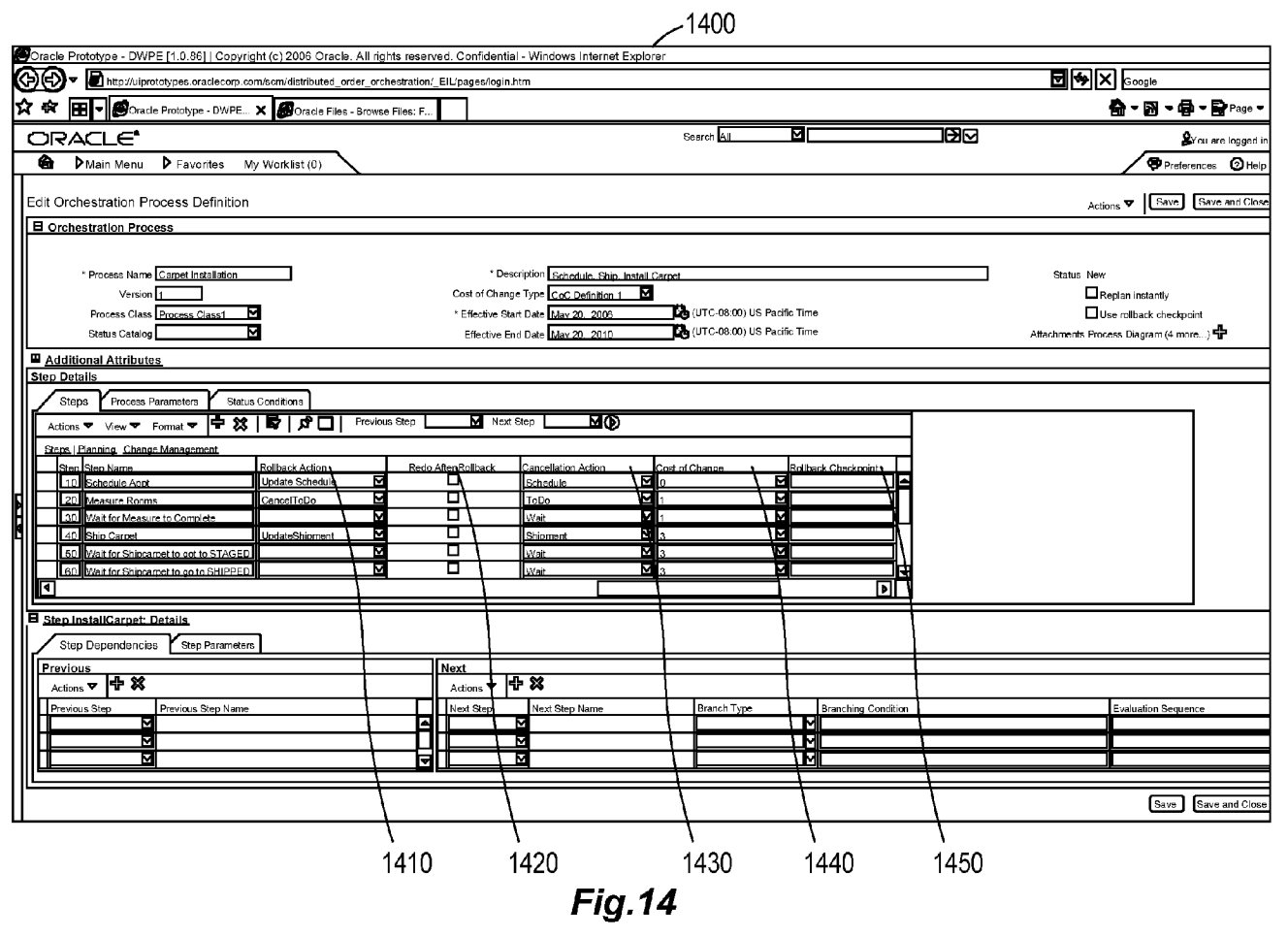

FIG. 14 illustrates an example of a user interface 1400, according to one embodiment of the invention. In an embodiment of the invention, user interface 1400 corresponds to interface 308 of FIGS. 3 and 4. User interface 1400 of FIG. 14 is similar to user interface 1300 of FIG. 13, but shows attributes relevant to the change management framework. Specifically, user interface includes a rollback action column 1410, a redo after rollback column 1420, a cancellation action 1430, a cost of change column 1440, and a rollback checkpoint column 1450. Rollback action column 1410 identifies the rollback action for each step. For example, rollback action column 1410 identifies that the rollback action for step 10 is "Update Schedule," the rollback action for step 20 is "CancelToDo," and the rollback action for step 40 is "UpdateShipment." Redo after rollback column 1420 identifies whether to redo the step after a rollback for each step. Cancellation action column 1430 identifies the cancellation action for each step. For example, in FIG. 14, cancellation action column 1430 identifies that there is no cancellation action associated with steps 10-60. Cost of change column 1440 identifies the cost of change for each step. The cost of change is a user-defined value used to specify an impact of change at each step of an orchestration process. Rollback checkpoint column 1450 identifies the rollback checkpoint for each step. A rollback checkpoint indicates that only steps after the rollback require adjustment in the event of a change request.

Figure 15:
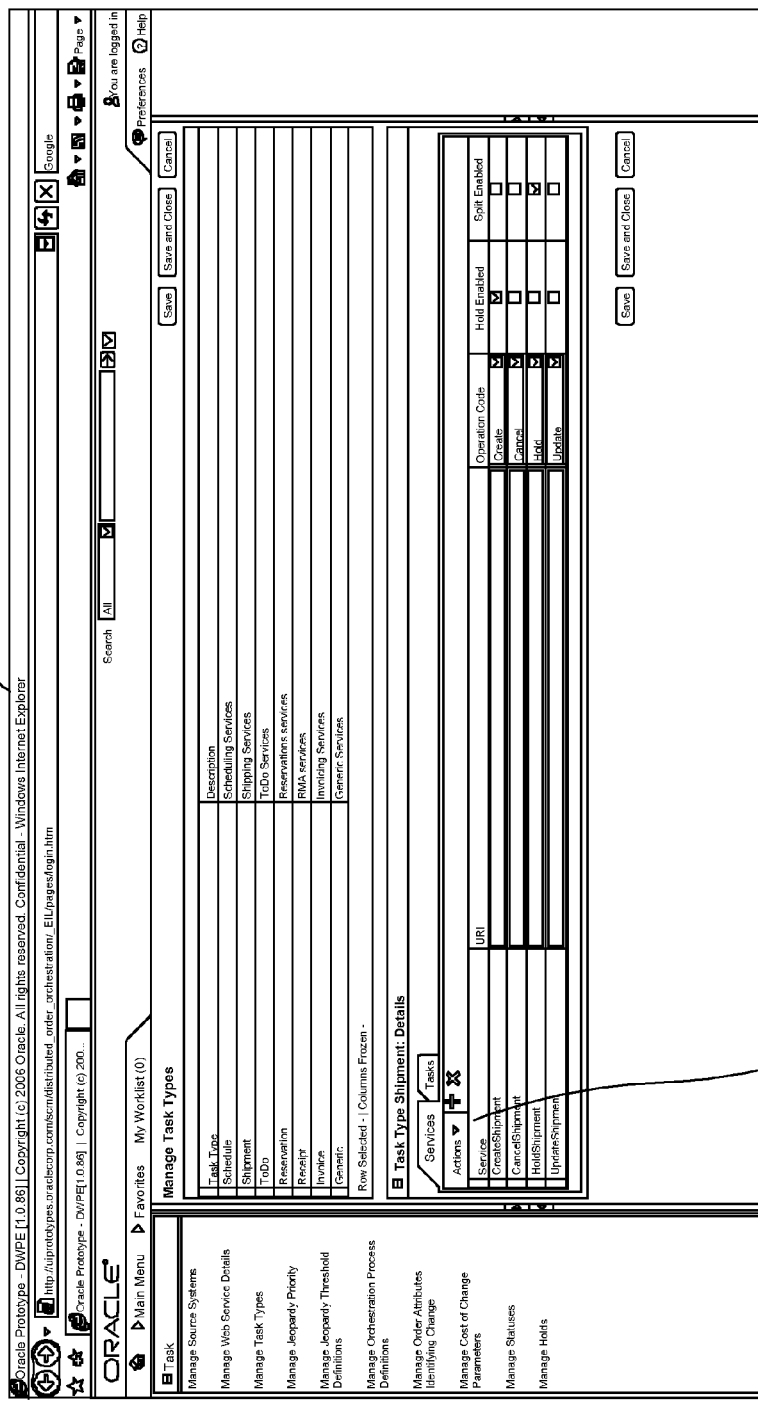
FIG. 15 illustrates a user interface of a distributed order orchestration system according to another embodiment.

FIG. 15 illustrates an example of a user interface 1500, according to one embodiment of the invention. In an embodiment of the invention, user interface 1500 corresponds to interface 308 of FIGS. 3 and 4. User interface 1500 allows a user to manage task types, where a task type corresponds to the task type illustrated in task type column 1330 of FIG. 13. Specifically, user interface 1500 allows a user to associate one or more services with a task type at service column 1510. For example, in FIG. 15, service column 1510 displays the services CreateShipment, CancelShipment, HoldShipment, and UpdateShipment for the task type Shipment.

Notify/Inquire Fulfillment Systems Before Processing Change Requests

According to an embodiment of the invention, before a distributed order orchestration system starts processing a change request, the system inquires with one or more fulfillment systems (via a running step of the executable process) if the one or more fulfillment systems will accept change requests. In an embodiment, the inquiry is accomplished by inquiring with one or more fulfillment systems whether a change is allowed for a step of the executable process. In an alternative embodiment, the inquiry is accomplished by putting on hold a step of the executable process which includes a wait step and inquiring if a change is allowed for the step of the executable process.

According to an embodiment, a user interface of an order capture module includes a flag associated with a step of a business process that is customizable by a user. The flag is identified as a hold flag. When the user defines a business process to include one or more business steps, using the user interface, the user can also set the hold flag associated with each step. In an embodiment of the invention, the hold flag is entitled, "In Event of Change, Hold Task When Step is Waiting." When the hold flag is turned on for a particular step of the business process, if a change request is received when the particular step is being executed and is waiting, the distributed order orchestration system puts that particular step on hold. While that particular step is on hold, the distributed order orchestration system inquires as to whether the fulfillment system that corresponds to the particular step will be able to accept the change request. In an embodiment of the invention, the order capture module may comprise client 304 of FIG. 3.

In an embodiment of the invention, if a user sets a hold flag associated with a step, the user can also enter a service uniform resource locator (URL) for a hold service. In an alternative embodiment, the service URL can be automatically generated by the distributed order orchestration system, rather than defined by a user.

According to another embodiment, whether the system inquires with one or more fulfillment systems (via a running step of the executable process) if the one or more fulfillment systems will accept change requests is not user-selectable, but instead is predetermined by the distributed order orchestration.

Figure 16:
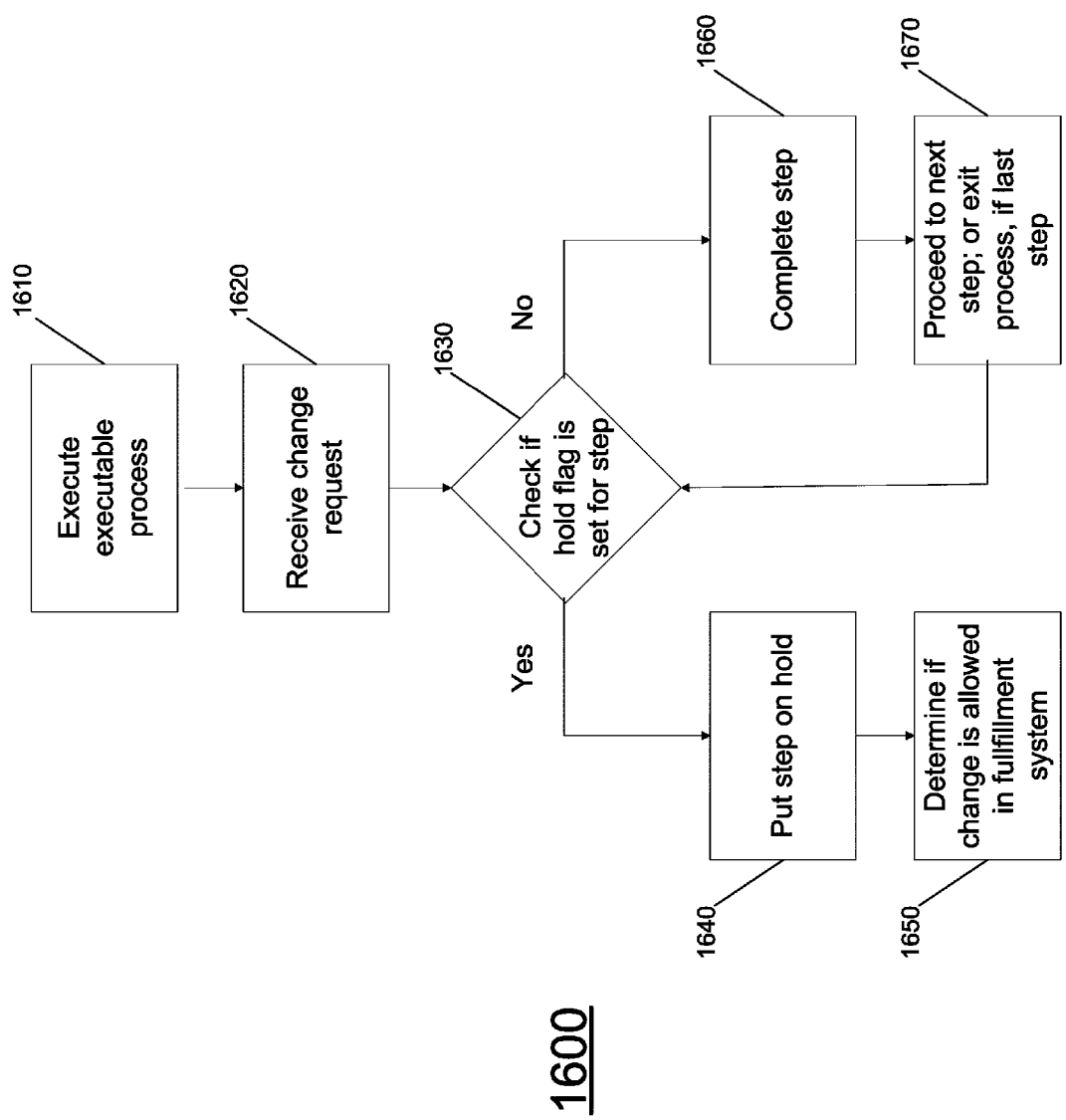
FIG. 16 illustrates a flowchart of a method for inquiring whether a fulfillment system will be able to accept a change request according to one embodiment.

FIG. 16 illustrates a flowchart 1600 of a method for inquiring whether a fulfillment system will be able to accept a change request according to one embodiment. At 1610, an executable process, which comprises one or more steps, is executed as discussed above. At 1620, a change request is received while the executable process is still being executed and before the executable process has completed. At 1630, it is determined which step of the executable process is being executed, and when the step enters into a Wait step, it is determined if a hold flag has been previously set for the step. If the hold flag has been previously set, then at 1640, the step is put on hold, and at 1650, an inquiry is sent to the fulfillment system, which is interfaced by the step, as to whether the requested change is allowed. However, if the hold flag has not been previously set, then at 1660, the step is completed, and at 1670, the distributed order orchestration system proceeds to the next step of the executable process, and step 1630 is repeated. Once the executable process has completed, the executable process exits, as shown in FIG. 16.

Figure 17:
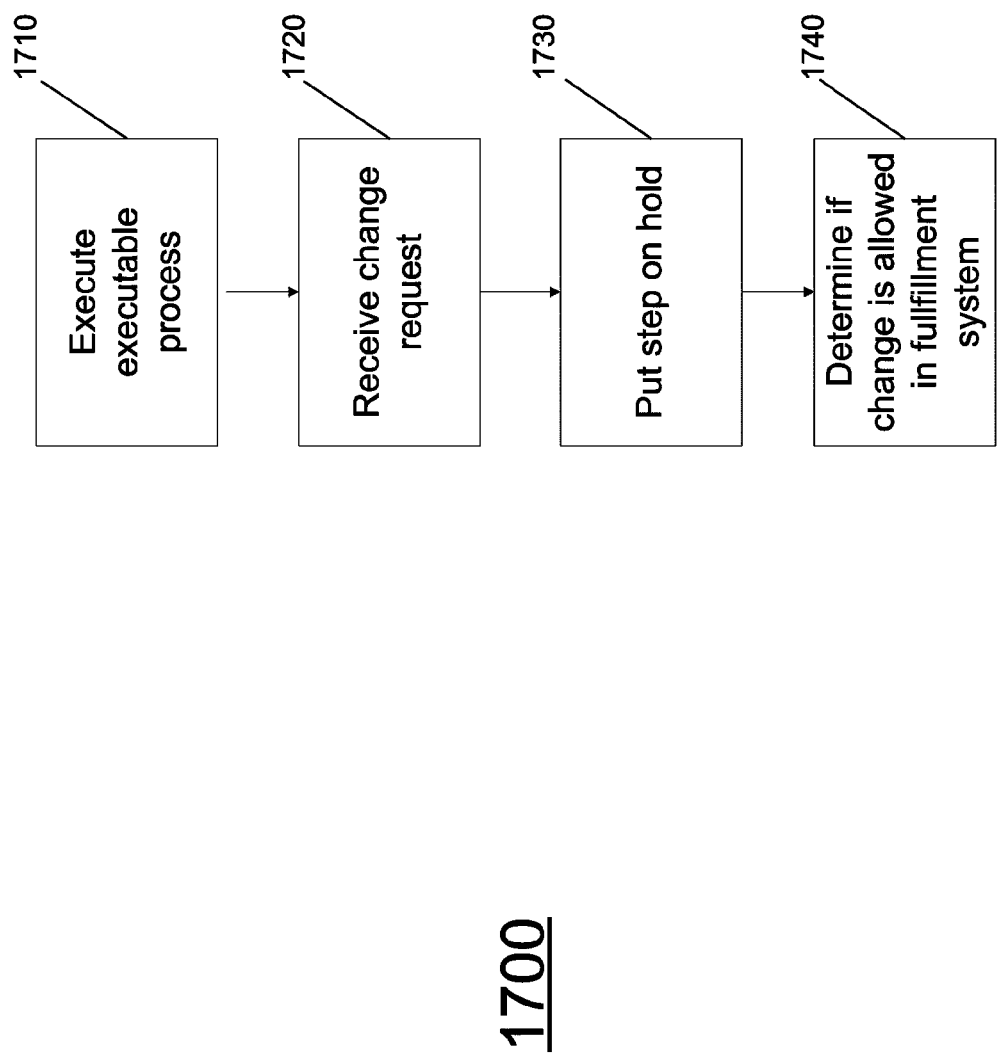
FIG. 17 illustrates a flowchart of a method for inquiring whether a fulfillment system will be able to accept a change request according to another embodiment.

FIG. 17 illustrates a flowchart 1700 of a method for inquiring whether a fulfillment system will be able to accept a change request according to another embodiment. At 1710, an executable process, which comprises one or more steps, is executed as discussed above. At 1720, a change request is received while the executable process is still being executed and before the executable process has completed. At 1730, the step is put on hold, and at 1740, an inquiry is sent to the fulfillment system, which is interfaced by the step, as to whether the requested change is allowed.

Figure 18:
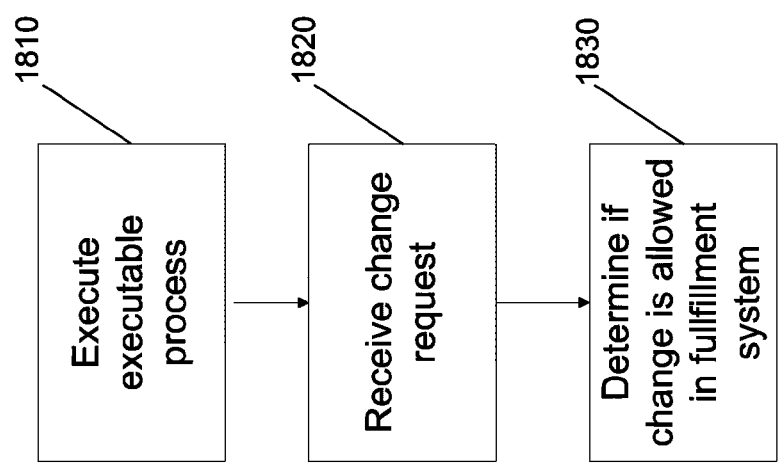
FIG. 18 illustrates a flowchart of a method for inquiring whether a fulfillment system will be able to accept a change request according to another embodiment.

FIG. 18 illustrates a flowchart 1800 of a method for inquiring whether a fulfillment system will be able to accept a change request according to another embodiment. At 1810, an executable process, which comprises one or more steps, is executed as discussed above. At 1820, a change request is received while the executable process is still being executed and before the executable process has completed. At 1830, an inquiry is sent to the fulfillment system, which is interfaced by the step, as to whether the requested change is allowed.

Localized Processing of Change Requests

According to an embodiment of the invention, each line of an order, and thus each line of an DOO order, is capable of being assigned to a unique executable process definition. An executable process instance can contain several order lines or just one order line. Thus, a user can define whether a line of an order requires its own executable process instance through the order capture module. Subsequently, an orchestration system can orchestrate each line of an order in a separate executable process instance.

Thus, in the embodiment, when a change request is received in the orchestration system, a decomposition module correlates and computes a delta value. The specifics of the delta value are described in a separate section. Based on the delta value, an orchestration module can determine whether the change applies to the entire DOO order created by the decomposition module, or merely a line of the DOO order. Thus, the orchestration module is capable of targeting the change request to the particular executable process instance.

Figure 19:
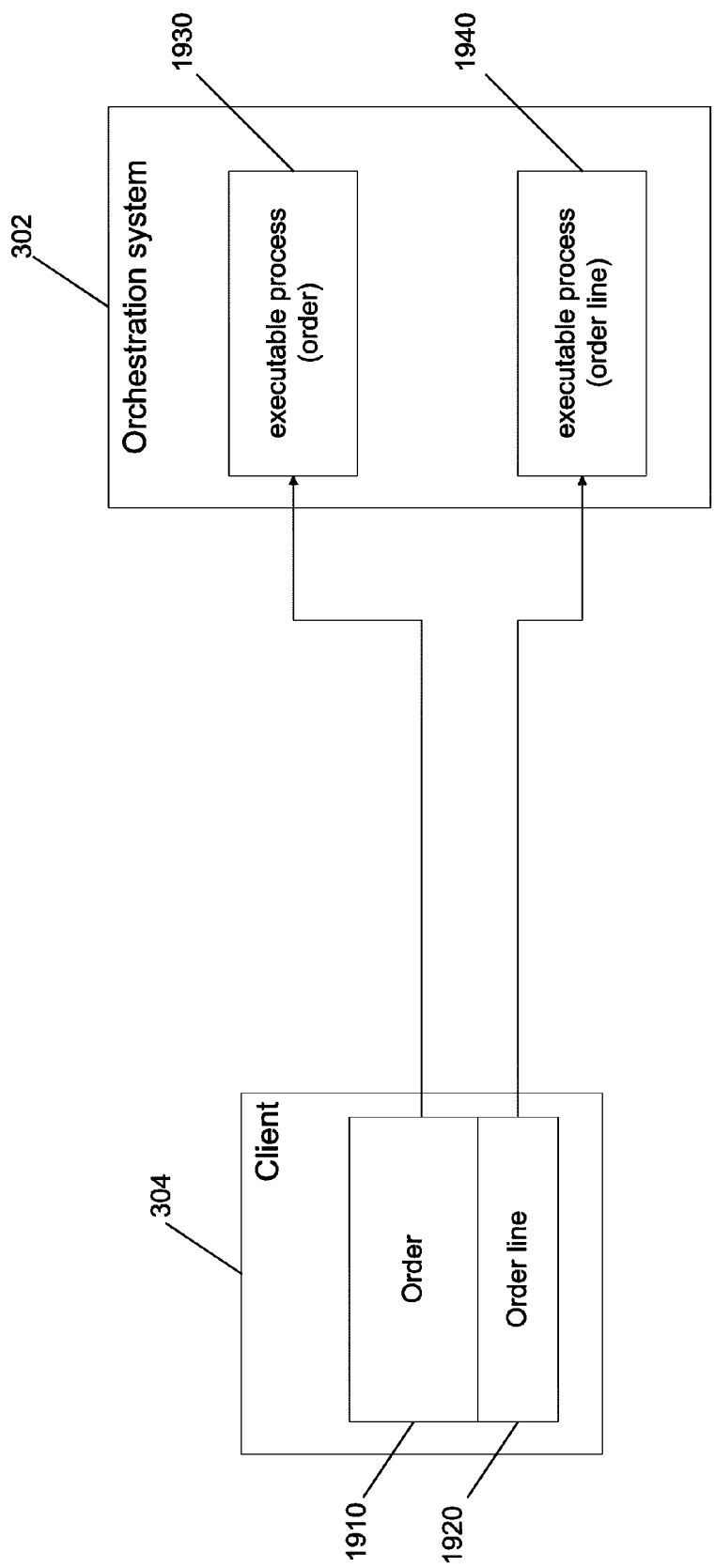
FIG. 19 illustrates an example of a distributed order orchestration system for creating a separate executable process instance for each order line of an order according to one embodiment.

FIG. 19 illustrates a distributed order orchestration system 1900 for creating a separate executable process instance for each order line of an order according to one embodiment. In an embodiment of the invention, system 1900 corresponds to system 300 of FIG. 3 and only the portions of system 300 relevant to the discussion have been included in system 1900. All other portions of system 300 have been omitted for clarity purposes.

In client 304, an order 1910 is created by a user. In the embodiment of the invention, order 1910 includes an order line 1920, as illustrated in FIG. 19. While one order line is illustrated in FIG. 19 for clarity purposes, one of ordinary skill in the art would readily understand that the order could include a plurality of order lines, and still be within the scope of the invention.

Orchestration system 302 orchestrates the invocation of an executable process 1930 for order 1910, and separately orchestrates the invocation of an executable process 1940 for order line 1920. Therefore, if orchestration system 302 receives a change request that only affects order line 1920, and does not affect order 1910, orchestration system 302 can selectively target the change request towards executable process 1940 without affecting executable process 1930.

Compensation Patterns

In the context of change management, compensation is defined as the act of adjusting steps in an executable process in order to accommodate change requests. Therefore, in order for an orchestration system to process change requests, various service patterns are needed to perform the adjustment of the business process steps. A service pattern is a template for providing a service that can be used in many different situations, as opposed to a finished service that is capable of being executed. In this section, the service patterns capable of adjusting the steps of an executable process are defined in this application as "compensation patterns."

A compensation pattern comprises one or more services that are invoked in the event of a change request for adjusting the step of the executable process. These services are defined in this application as "compensating services." A compensating service is defined and associated with a step as part of the process definition of the executable process. Thus, a "compensating pair" is provided in order to encapsulate a compensation pattern. The compensating pair includes the original service capable of performing the step of the executable process and one or more compensating services capable of adjusting the step of the executable process.

There are many examples of compensation patterns. For instance, a cancel compensation pattern may be provided. The cancel compensation pattern can include a cancel service capable of cancelling a step of the executable process. As another example, a cancel/re-perform compensation pattern (also identified as a redo compensation pattern) may be provided. The cancel/re-perform compensation pattern can include a cancel service capable of cancelling a step of the executable process, and a re-perform service capable of re-performing the step of the executable process. As yet another example, an update compensation pattern may be provided. The update compensation pattern can include an update service capable of updating a step of the executable process. As yet another example, a no-operation compensation pattern may be provided. The no-operation compensation pattern does not perform any adjustment of a step of the executable process. Instead, the no-operation compensation pattern skips the step of the executable process and proceeds to the next step of the executable process. One of ordinary skill in the art would readily appreciate that there are other examples of compensation patterns that may be provided, in addition to what is described above, and still fall within the scope of the invention.

Figure 20:
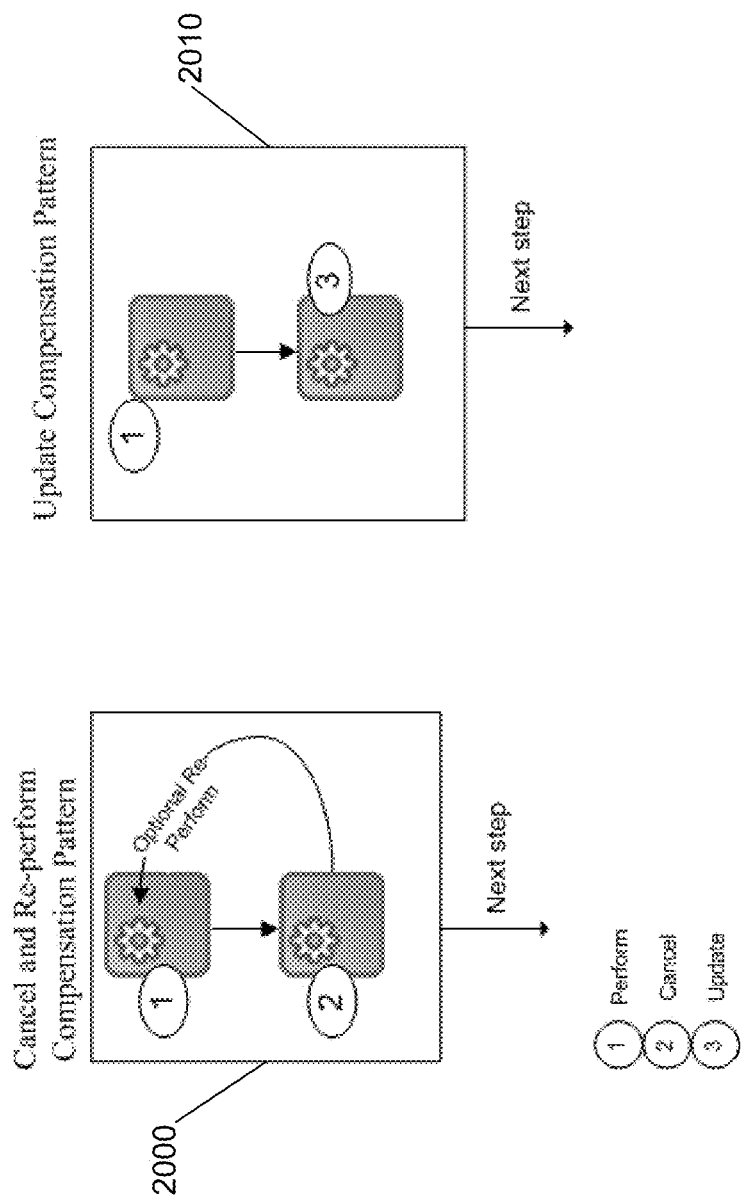
FIG. 20 illustrates two examples of compensation patterns according to two separate embodiments.

FIG. 20 illustrates two examples of compensation patterns according to two separate embodiments. Specifically, FIG. 20 illustrates cancel and re-perform compensation pattern 2000 (also identified as a redo compensation pattern) and update compensation pattern 2010. In a first embodiment, cancel and re-perform compensation pattern 2000 includes a cancel service which is capable of cancelling the original step of the executable process. Thus, in an embodiment, the cancel service invokes an external system to perform a task which cancels the task previously invoked by the original step of the executable process. A cancel and re-perform compensation pattern may optionally include a re-perform service which is capable of re-performing the original step of the executable process with a current set of data after the original step has been cancelled. In an embodiment, the re-perform service invokes an external system to perform the task previously invoked by the original step of the executable process with a current set of data. This is illustrated in cancel and re-perform compensation pattern 2000 by a perform service and a cancel service, and an optional step of re-performing the perform service. Furthermore, because cancel and re-perform compensation pattern 2000 is capable of performing a cancel service (and optionally re-performing a perform service), the compensating pair for cancel and re-perform compensation pattern 2000 is (P;C or P;[C:P]), where P represents the perform service, and C represents the cancel service.

In a second embodiment, update compensation pattern 2010 includes an update service which is capable of updating the original step of the original executable process. In an embodiment, the update service invokes an external system to perform an update task which updates the task invoked by the original step of the original executable process. This is illustrated in update compensation pattern 2010 by a perform and an update service. Furthermore, because update compensation pattern 2010 is capable of performing an update service, the compensating pair for update compensation pattern 2010 is (P;U), where P represents the perform service and U represents the update service.

One of ordinary skill in the art would readily understand that compensation patterns 2000 and 2010 are merely example compensation patterns, and that other compensation patterns may be utilized to adjust the steps of the executable process and still be within the scope of the invention. For example, in a cancel compensation pattern, the optional re-perform service described above, may be omitted. In this embodiment, the cancel compensation pattern includes a cancel service as described above. As another example, in a no operation compensation pattern, no service is invoked.

In an embodiment of the invention, an orchestration system user can define a compensation pattern as part of an business process definition. However, in an alternative embodiment of the invention, a user can define a business rule that can determine the compensation pattern to be applied based on runtime data at a time a corresponding executable process is being executed. For example, a business rule may be established for a step of a business process (for example a shipment step) which applies a cancel pattern where a change request modifies the type of an item that a user is requesting to be shipped, and which alternatively applies an update pattern when a change request merely modifies the quantity of an item (but maintains the type of the item). Thus, in the identified example, where a process for ordering carpet and a process for ordering tiles use the same business process if a change request is received on an order requesting a quantity of five carpets to be shipped, and if the change request changes the items from carpets to tiles, then at runtime, the business rule can determine that the cancel pattern should be applied, the shipment order of ten carpets is canceled, and a new shipment order of five tiles is implemented. However, if the change request merely changes the quantity from five carpets to ten carpets, then at runtime, the business rule can determine that the update pattern should be applied, and the shipment order is updated to account for the new quantity.

Figure 21:
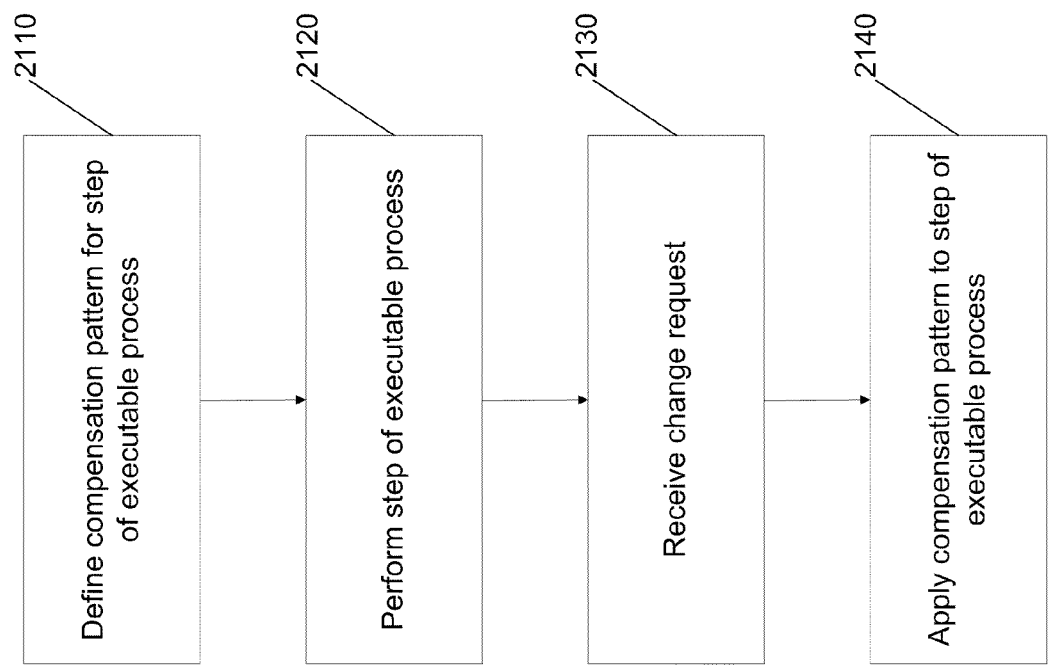
FIG. 21 illustrates a flowchart of a method for processing a change request using a compensation pattern according to one embodiment.

FIG. 21 illustrates a flowchart 2100 of a method for processing a change request using a compensation pattern according to one embodiment. At 2110, a compensation pattern is defined for a step of an executable process. For example, a cancel compensation pattern may be defined as a set of one or more compensating services which cancel the step of the executable process (and optionally re-performs the step). As another example, an update compensation pattern may be defined as a set of one or more compensating services which update the step of the executable process. At 2120, the step of the executable process is executed. At 2130, a change request is received. Based on the change request, at 2140, the compensation pattern is applied to the step of the executable process.

Figure 22:
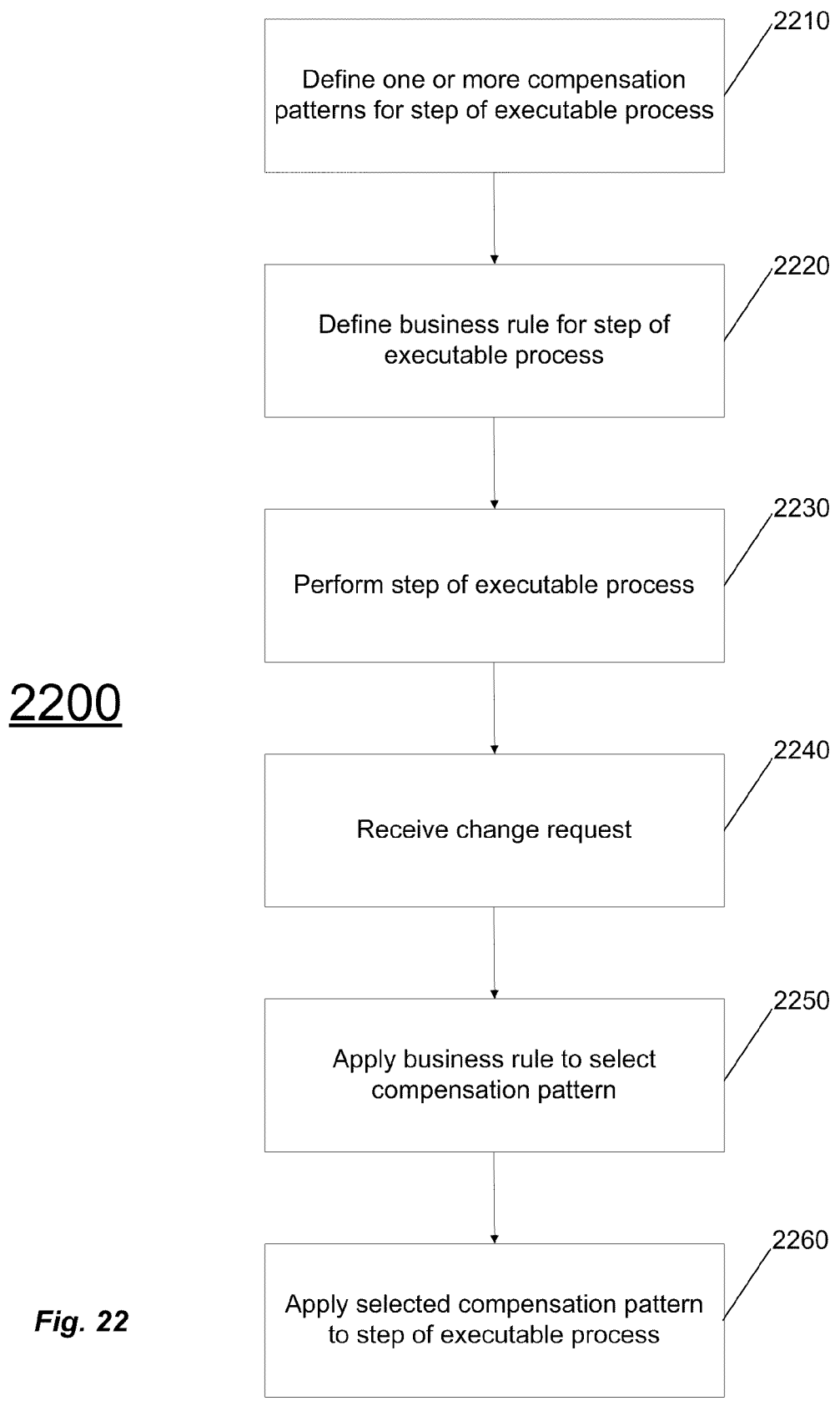
FIG. 22 illustrates a flowchart of another method for processing a change request using a compensation pattern according to another embodiment.

FIG. 22 illustrates a flowchart 2200 of another method for processing a change request using a compensation pattern according to another embodiment. At 2210, one or more compensation patterns are defined for a step of an executable process. For example, one or more cancel compensation patterns may be defined as previously discussed. As another example, one or more update compensation patterns may be defined as discussed. As yet another example, one or more cancel compensation patterns and one or more update compensation patterns may be defined as previously discussed. At 2220, a business rule is also defined for the step of the executable process. The business rule can determine the compensation pattern to be applied based on runtime data. At 2230, the step of the executable process is executed. At 2240, a change request is received. Based on the change request, at 2250, a business rule is applied to runtime data associated with the change request in order to select a compensation pattern from the one or more defined compensation patterns to be applied. At 2260, based on the selection of the business rule, the selected compensation pattern is applied to the step of the executable process.

Compensation Sequences

As defined previously, "compensation" is the act of adjusting steps in an executable process to accommodate a change request. Since an executable process comprises several steps and sub-processes, the sequence of adjusting the steps of the executable process is crucial from both a business perspective and a technical perspective. The sequence of adjusting the steps of the executable process is defined in this application as a "compensating sequence."

According to an embodiment of the invention, the order of a compensating sequence of an executable process can be customized. As an example, the order of a compensating sequence can be customized so that the order of the adjusting steps is the same order of the steps of the original executable process. As another example, the order of the compensating sequence can be customized so that the order of the adjusting steps is the reverse order of the original steps of the original executable process. As one of ordinary skill in the art would readily understand, these are not the only orders that the compensating sequence may take, but merely serve as exemplary embodiments of the invention. In fact, the adjusting steps of the compensating sequence may be customized in any order and still be within the scope of the invention.

Figure 23:
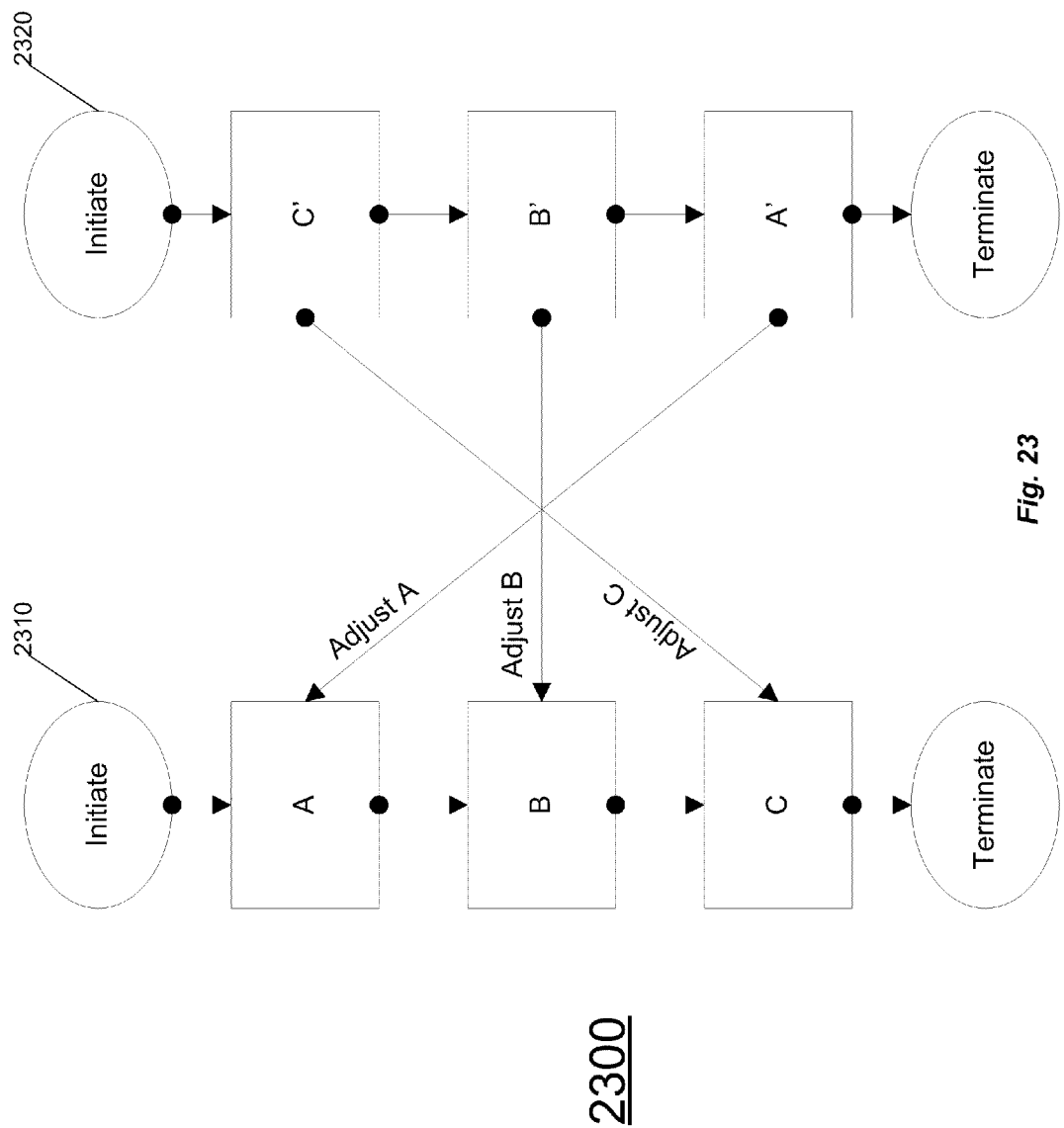
FIG. 23 illustrates an example of a compensating sequence according to one embodiment.
Figure 24:
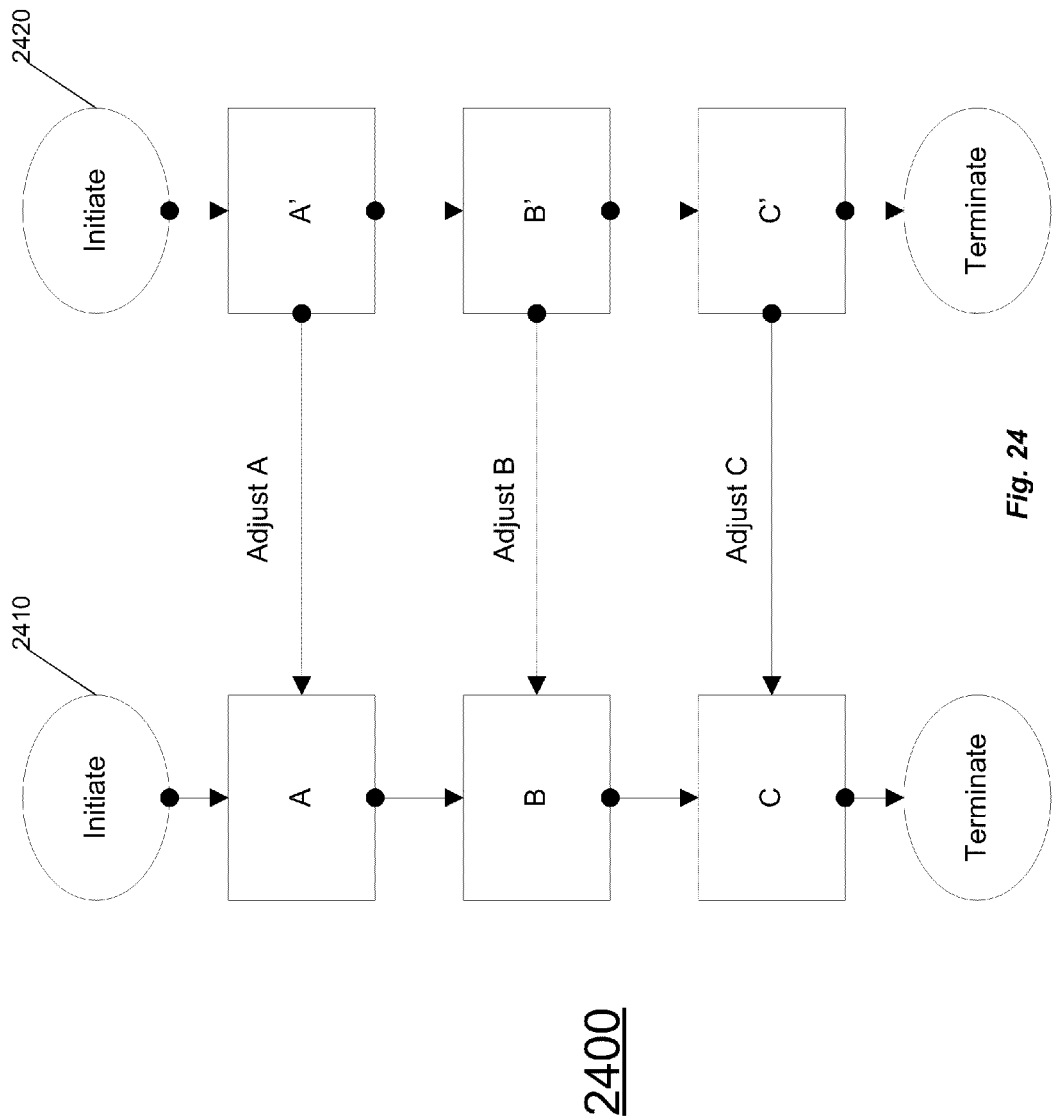
FIG. 24 illustrates another example of a compensating sequence according to one embodiment.

FIGS. 23 and 24 illustrate exemplary compensating sequences to further illustrate how an orchestration system provides for the customization of a compensating sequence. However, one of ordinary skill in the art would readily understand that the following compensating sequences are merely examples, and that a compensating sequence may be customized to follow any order, including orders not illustrated in FIGS. 23 and 24.

FIG. 23 illustrates a flowchart 2300 detailing an example of a compensating sequence according to one embodiment. In flowchart 2300, flow 2310 represents the flow of an original executable process. For example, the original executable process may correspond to a business process for ordering carpet. The original executable process performs steps A, B, and C. In the above example, step A comprises selecting the carpet from an inventory, step B comprises measuring the carpet according to requested dimensions, and step C comprises shipping the carpet.

In the embodiment, a change request (not shown) is received after step C has been completed, where the change request changes the carpet order to a tile order. Therefore, the original executable process is stopped, and a new executable process is initiated. In the above example, the new executable process corresponds to a business process for ordering tiles. In flowchart 2300, flow 2320 represents the flow of the new executable process. The new executable process performs steps C', B', and A'. Step A' comprises adjusting the already-completed step A, step B' comprises adjusting the already-completed step B, and step C' comprises adjusting the already-completed step C.

The compensating sequence of flow 2320 is a Last In First Out ("LIFO") sequence. In other words, the compensating sequence is a reverse sequence of the original executable process. Thus, step C' of the new executable process, which adjusts step C, is performed first, because step C was performed last in the original executable process. The new executable process then proceeds to perform step B' and step A', which is a reverse order of the order of the original executable process.

FIG. 24 illustrates a flowchart 2400 detailing another example of a compensating sequence according to one embodiment. In flowchart 2400, flow 2410 represents the flow of an original executable process. In the embodiment, a change request (not shown) is received after step C has been completed, where the change request changes the carpet order to a tile order. Therefore, the original executable process is stopped, and a new executable process is initiated. In flowchart 2400, flow 2420 represents the flow of the new executable process.

Flow 2420 of FIG. 24 is similar to flow 2320 of FIG. 23, except that flow 2420 has a different compensating sequence than flow 2320 of FIG. 23. More particularly, flow 2420 has a First In First Out ("FIFO") compensating sequence, rather than a LIFO compensating sequence. In other words, the compensating sequence is the same sequence of the original executable process. Thus, step A' of the new executable process, which adjust step A, is performed first, because step A was performed first in the original executable process. The new executable process then proceed to perform step B' and step C' which is the same order as the order of the original process.

Figure 25:
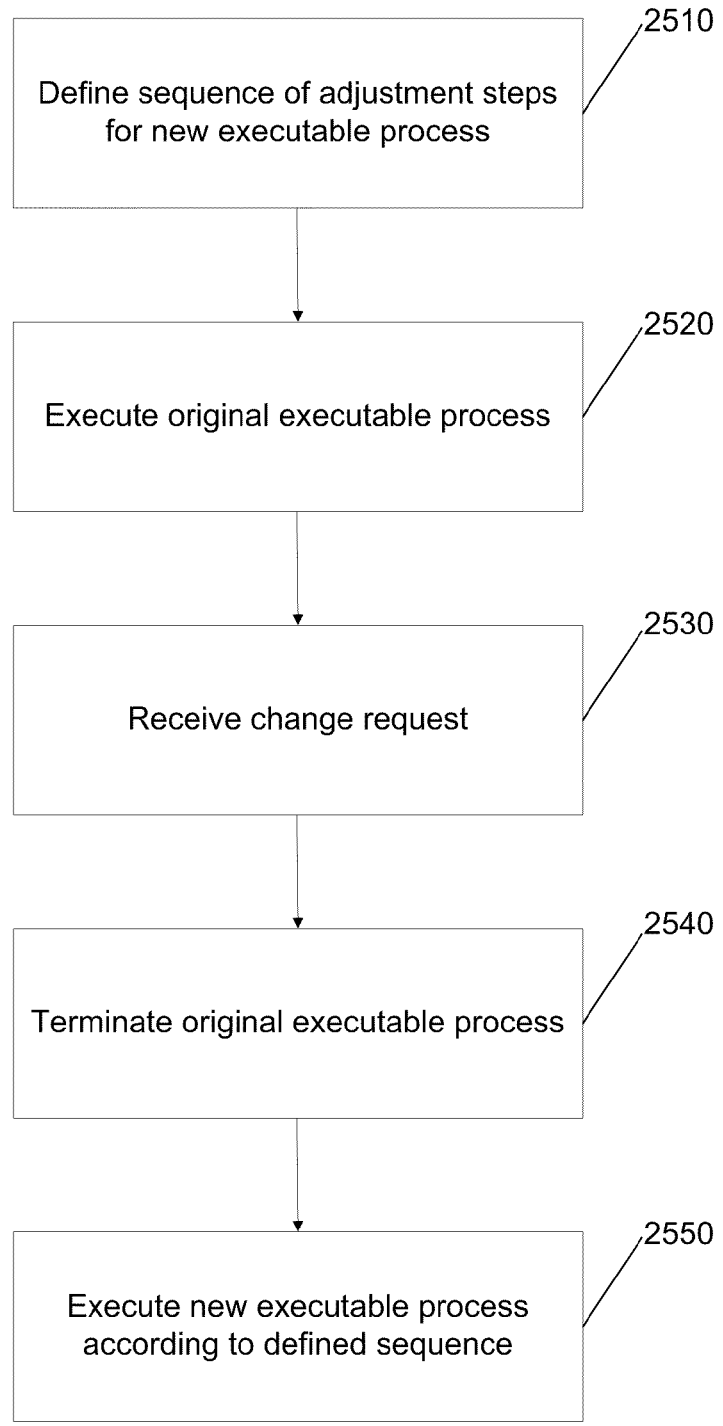
FIG. 25 illustrates a flowchart of a method for customizing a compensating sequence according to one embodiment.

FIG. 25 illustrates a flowchart 2500 of a method for customizing a compensating sequence according to one embodiment. At 2510, a sequence of adjustment steps for a new executable process is defined. The new executable process is capable of adjusting an original executable process. The sequence of adjustment steps may be defined based on a sequence of steps for the original executable process.

At 2520, the original executable process is executed. During the execution of the original executable process, the steps of the original executable process are performed. At 2530, a change request is received. At 2540, the original executable process is stopped. At 2550, the new executable process is executed. During the execution of the new executable process, the adjustment steps of the new executable process are performed according to the sequence defined at 2510.

Reuse Step Data

As described in a separate section, in an orchestration system, an original executable process which corresponds to a user-generated business process is run in regular mode in order to orchestrate the business process. When a change request is received, the orchestration system stops the original executable process (and all of its child processes) and initiates a new executable process in change mode, which correlates to the original executable process. The new executable process, operating in change mode, processes the change request by automatically adjusting the steps of the original executable process. In certain scenarios, such as where an order line of the modified order is different from an order line of the original order, the process definition for the new executable process is different from the process definition for the original executable process. However, there are other scenarios in which business activities from the original executable process may be reused in the new executable process.

According to an embodiment of the invention, each step of an executable process may be annotated to indicate that the step is reusable. Based on the annotation the orchestration system can reuse data from the original executable process in executing the new executable process.

According to an embodiment of the invention, reusability is only possible if the step in the original executable process is not cancelled. Thus, the orchestration system does not reuse a step from the original executable process if the adjustment step of the new executable process cancels the original step, even if the original step includes the reusability annotation. Furthermore, the orchestration system only cancels a step including a reusable annotation if the change request includes a delta (discussed in another section) for the step, or if the step is not required in the new executable process. Finally, a step can only be reused if: (1) the reusability annotation of the step of the original executable process matches the reusability annotation of the step of the new executable process; (2) the service that corresponds to the original step matches the service that corresponds to the new step; and (3) there is no delta for the step.

Below is example pseudo-code for checking the reusability of a step of an executable process:

```
Input Parameters: pTaskId, pPrimaryTaskId and
pOrgProcessInstanceId(Original Orch Process)
1)     select step_status from doo_process_step_instance where
       task_id = 'pTaskId' and primary_task_id =
       'pPrimaryTaskId' and process_instance_id =
       'pOrgProcessInstanceId'
2)         //If the step_status value is equal to -1, the step is cancelled.
           If step_status == -1
               Return "The step is cancelled"
           Else
               Return "This step can be reused"
```

* processInstanceId can be obtained from the doo_orchestration_groups table using the group_id.

However, one of ordinary skill in the art would readily appreciate that the above pseudo-code is merely an example according to an embodiment, and that computer code for selecting an executable process could take many different forms and still be within the scope of the invention.

Figure 26:
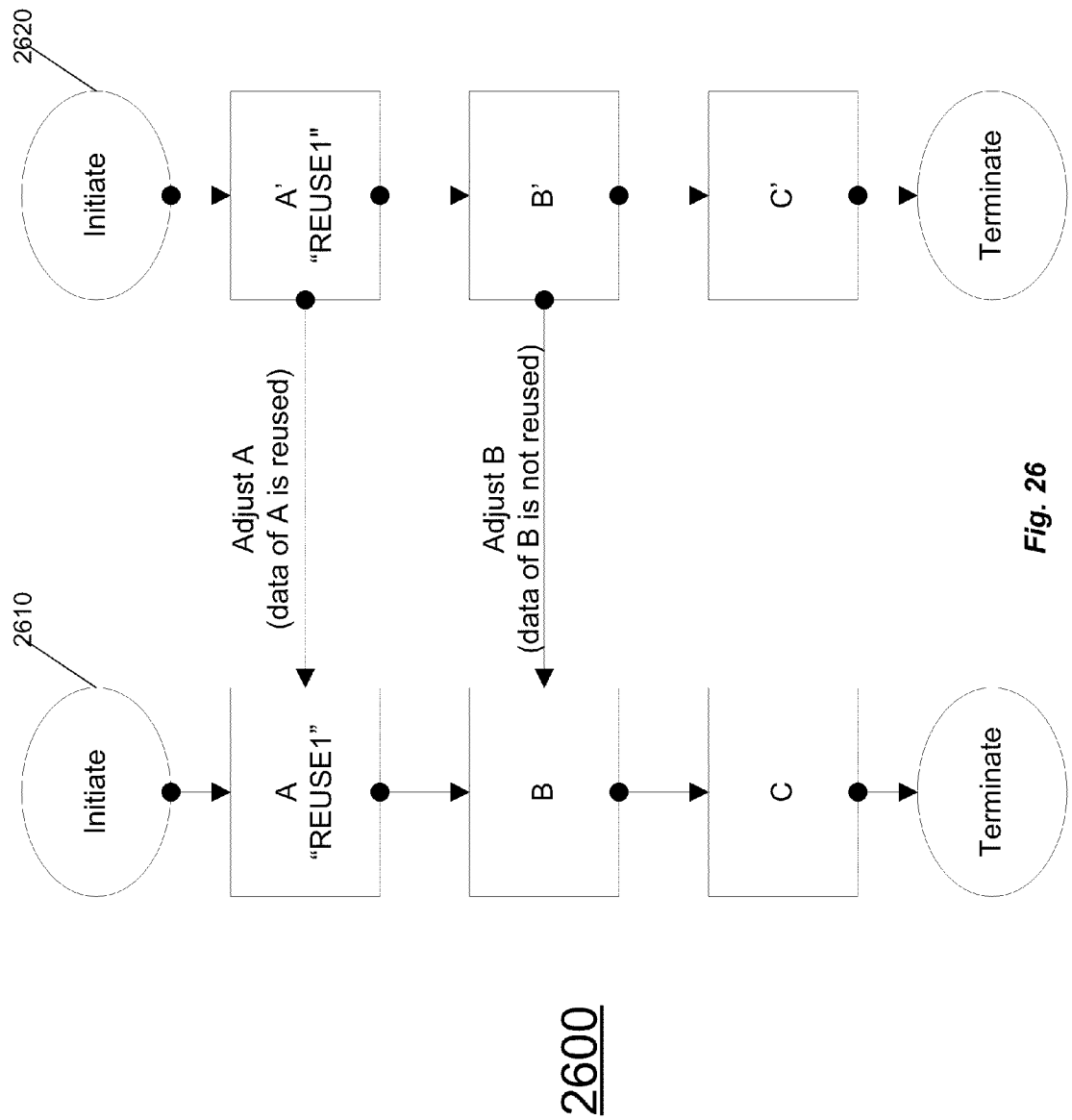
FIG. 26 illustrates an example of a change request flow utilizing a reusability annotation according to one embodiment.

FIG. 26 illustrates a flowchart 2600 detailing an example of a change request flow utilizing a reusability annotation according to one embodiment. In flowchart 2600, flow 2610 represents the flow of an original executable process, and flow 2620 represents the flow of the new executable process. The original executable process performs steps A, B, and C. In the embodiment, a change request (not shown) is received after step B has been completed, but before step C has been initiated. Therefore, the original executable process is stopped, and the new executable process is initiated. The new executable process performs steps A', B', and C'. Step A' comprises adjusting the already-completed step A. Because step A of the original executable process includes a reusability annotation "REUSE1," which indicates that step A is a reusable step, the execution of step A' reuses data from step A to adjust step A. Further A' also includes the reusability annotation "REUSE1," and thus, the reusability annotations of A and A' match. Similarly, step B' comprises adjusting the already-completed step B. However, in this scenario, because step B does not include a reusability annotation, step B' does not reuse data from step B to adjust step B.

Correlating and Mapping Original DOO Orders with New DOO Orders

As described in a previous section, a DOO order comprises a header and one or more groups, where each group is capable of including one or more lines, and each line is capable of including one or more fulfillment lines. In an embodiment of the invention, when a change request is received in an orchestration system, a new DOO order (i.e., the DOO order incorporating the requested change) is created. Before the change request is processed the new DOO order is mapped and correlated to an original DOO order (i.e., the DOO order before a change is requested).

The mapping of the two DOO orders occurs at the header level, line level (including all child entities, if any), and at the fulfillment line level. The mapping of a new DOO order header and an original DOO order header, is defined as the identification of a header that exists in both the new DOO order and the original DOO order, and the correlation of the header of the new DOO order and header the original DOO order, so that the header of the new DOO order references the header of the original DOO order. A header exists both the new DOO order and the original DOO order if the header of the new DOO order and the original DOO order have the same key (such as a source order number). The mapping of a new DOO order line and an original DOO order line, and the mapping of a new DOO fulfillment line and an original DOO order fulfillment line are similarly defined.

At each level, attributes are also mapped. The mapping of attributes is defined as the identification of an attribute that exists in both the new DOO order and the original DOO order, and the correlation of the attributes, so that the attribute of the new DOO order references the attribute of the original DOO order. An attribute exists in both the new DOO order and the original DOO order, if an attribute is present on each of two matching headers, two matching lines, or two matching fulfillment lines.

This mapping of headers, lines, fulfillment lines, and attributes is done so that a decomposition module can accurately calculate a delta between the original DOO order and the new DOO order before an orchestration module processes the change request. The delta is described in greater detail in a separate section.

When a new DOO order is created, while the new DOO order has a separate identity from the original DOO order, both the new DOO order and the original DOO order are assigned the same source order, and thus, both refer to the same order number. The original DOO order header is queried using the source order details of the new DOO order. Once the original DOO order header is queried, the original DOO order header, along with the new DOO order header, are used to retrieve all the lines and fulfillment lines of the original DOO order header, and all the lines and fulfillment lines of the new DOO order header. The lines of the DOO original order header, and the lines of the new DOO order header, are compared to determine which lines appear in both the original DOO order and the new DOO order. For the lines which appear in both DOO orders, the reference identity of the line in the new DOO order is set to the identity of the line in the original DOO order, so that a line in the new DOO order correctly references its corresponding line in the original DOO order. A similar comparison is performed for the fulfillment lines of both DOO orders, and for the fulfillment lines which appear in both DOO orders, the reference identity of the fulfillment line of the new DOO order is set to the identity of the fulfillment line of the original DOO order, so that the fulfillment line in the new DOO order correctly references its corresponding fulfillment line in the original DOO order.

Below is example pseudo-code for correlating and mapping the new DOO order with the original DOO order:

```
correlateAndMapOrders(HeaderViewRowImpl changedDooOrderHeader){
// Query the original doo order header using the source order details of changed order.
```

```
        fetch
            original_doo_order_header from doo_order_headers table
        into
            originalDooOrderHeader
        where
            source_order_id = changedDooOrderHeader. source_order_id ,
            source_order_system = changedDooOrderHeader.source_order_system,
            AND
            source_order_number = changedDooOrderHeader. source_order_number.
//Collections to hold doolines and fulfilllines of both changed and original orders
        Hashmap     originalOrderDooLines      = new Hashmap ( );
        Hashmap     changedOrderDooLines       = new Hashmap ( );
        Hashmap     originalOrderDooFulfillLines = new Hashmap ( );
        Hashmap     changedOrderDooFulfillLines = new Hashmap ( );
// Populate the collections
        for each (dooLine in originalDooOrderHeader)
        originalOrderDooLines.put(source_order_number, dooLine);
        for each(dooLine in changedDooOrderHeader)
        changedOrderDooLines.put(source_order_number , dooLine);
// Setting the reference line ids of the changed order lines with original doo line ids
        for each dooLine in changedOrderDooLines
        originalDooLine = orginalOrderDooLines.getDooLine;
        set dooLine.REFERENCE_LINE_ID(originalDooLine.getDooLineId( ));
// Populating the collections
        for each (FulfillLine in originalDooOrderHeader)
        originalOrderDooFulfillLines.put(source_order_number dooFulfillLine);
        for each(FulfillLine in changedDooOrderHeader)
        changedOrderDooFulfillLines.put(source_order_number dooFulfillLine);
// Setting the reference fulfill line ids of the changed order lines with original doo fulfillline
ids.
        for each dooFulfillLine in changedOrderDooFulfillLines
        originalDooFulfillLine = orginalOrderDooLines.getDooFulfillLine;
Set dooLine.REFERENCE_FLINE_ID(originalDooFullfillLine.getDooFulfillLineId( ));
}
```

However, one of ordinary skill in the art would readily appreciate that the above pseudo-code is merely an example according to an embodiment, and that computer code for selecting an executable process could take many different forms and still be within the scope of the invention.

Figure 27:
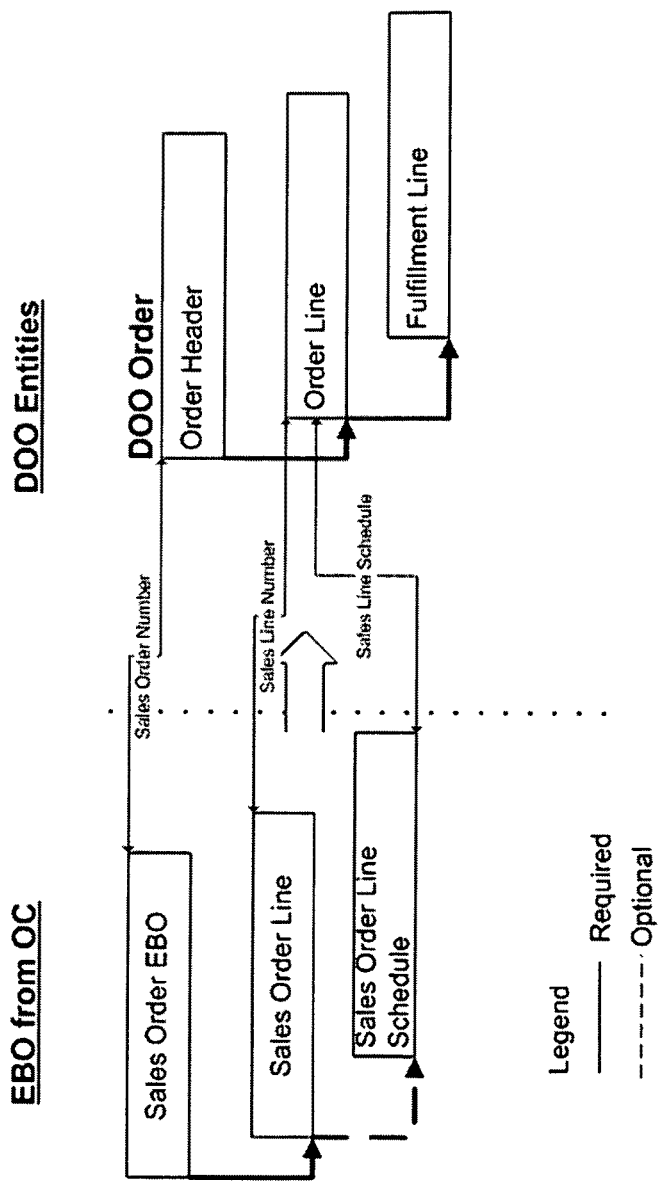
FIG. 27 illustrates an example of a mapping between an original DOO order and a new DOO order according to one embodiment.

FIG. 27 illustrates an example of a mapping between an original DOO order and a new DOO order according to one embodiment. In FIG. 27, an EBO which represents a new DOO order that has been generated by a decomposition module of an orchestration system in light of a change request. The EBO is a sales order EBO, and includes a sales order line, and a sales order line schedule. The orchestration system is capable of mapping the sales order EBO to a corresponding original DOO order, identified in FIG. 27 as "DOO order." The DOO order includes an order line and a fulfillment line. Thus, the changes in the new DOO order, represented by the sales order EBO, as compared to the DOO original order, represented by "DOO Order," include a new schedule added for the line, and the deletion of the original fulfillment line.

As shown in FIG. 27, the Sales Order EBO references the order header of the DOO order. As also shown in FIG. 27, both the sales order line, and the sales order line schedule reference the order line of the DOO order. Even though the order line schedule has been added, and is not present in the DOO order, because the order line schedule is part of the order line, it corresponds to the order line of the DOO order. Because the sales order EBO does not include an object that corresponds to the fulfillment line of the DOO order, there is no reference from the sales order EBO to the fulfillment line of the DOO order, as can be seen from FIG. 27.

Figure 28:
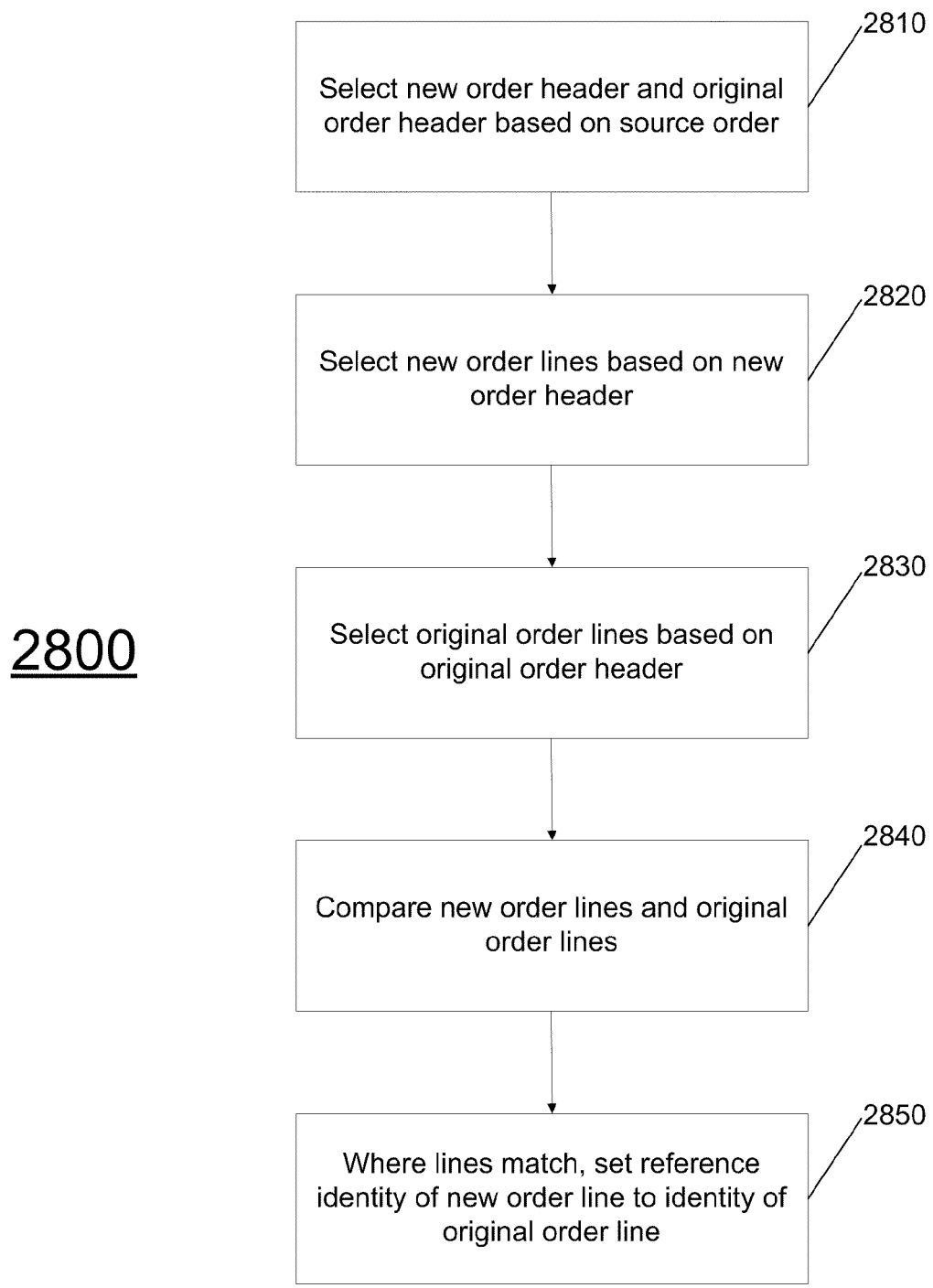
FIG. 28 illustrates a flowchart of a method for mapping lines of a new DOO order to lines of an original DOO order according to one embodiment.

FIG. 28 illustrates a flowchart 2800 of a method for mapping the order lines of a new DOO order to the order lines of an original DOO order according to one embodiment. At 2810, a header of a new DOO order, and a header of an original DOO order is selected. The header of the original DOO order is selected based on the source order of the new DOO order. At 2820, all the lines of the header of the new DOO order are selected. At 2830, all the lines of the header of the original DOO order are selected. At 2840, the lines of the header of the new DOO order are compared with the lines of the header of the original DOO order in order to determine which lines in the original DOO order are also in the new DOO order. At 2850, if two lines match (i.e., if a line is found in both the original DOO order and the new DOO order) the reference identity of the new line is set to the identity of the original line. Thus, each line of the new DOO order that is also present in the original DOO order correctly references its corresponding line in the original DOO order.

Figure 29:
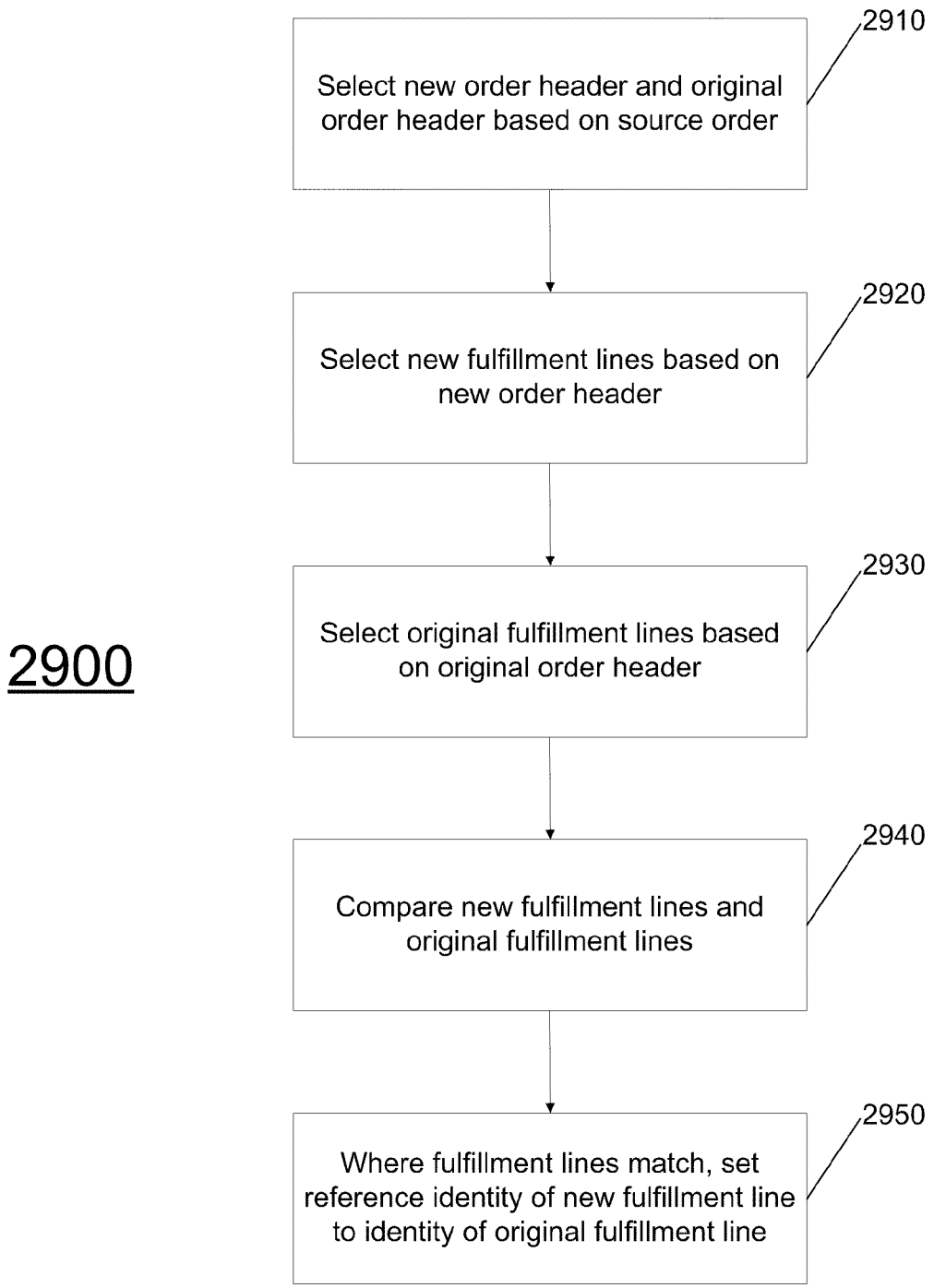
FIG. 29 illustrates a flowchart of a method for mapping fulfillment lines of a new DOO order to fulfillment lines of an original DOO order according to one embodiment.

FIG. 29 illustrates a flowchart 2900 of a method for mapping fulfillment lines of a new DOO order to fulfillment lines of an original DOO order according to one embodiment. At 2910, a header of a new DOO order, and a header of an original DOO order is selected. The header of the original DOO order is selected based on the source order of the new DOO order. At 2920, all the fulfillment lines of the header of the new DOO order are selected. At 2930, all the fulfillment lines of the header of the original DOO order are selected. At 2940, the fulfillment lines of the new DOO order are compared with the fulfillment lines of the original DOO order in order to determine which fulfillment lines in the original DOO order are also in the new DOO order. At 2950, if two fulfillment lines match (i.e., if a fulfillment line is found in both the original DOO order and the new DOO order) the reference identity of the new fulfillment line is set to the identity of the original fulfillment line. Thus, each fulfillment line of the new DOO order that is also present in the original DOO order correctly references its corresponding fulfillment line in the original DOO order.

Delta Attributes

Although an orchestration system is capable of automatically adjusting the steps of an executable process, not all steps are required to be adjusted in a given executable process. One of the key factors determining whether a business step is required to be adjusted is whether there is a change in one or more attributes that step is acting on. This change is defined as "delta."

For example, as part of an regular executable process, the process performs a perform service. Upon the receipt of a change request, the decision to adjust the perform service (e.g., invoke an update service) depends if a set of attributes that the perform service (and potentially the update service) would act upon have changed. If the set of attributes has changed, then the decision is made to adjust the perform service (e.g., decision is made to invoke the update service). If the set of attributes has not changed, then the decision is made not to adjust the perform service, as no adjustment is required.

In an embodiment of the invention, when a change request is received in an orchestration system, a new DOO order is created and the new DOO order is mapped and correlated to the original DOO order. Before the change request is processed, a delta is calculated between the new DOO order and the original DOO order. The delta is calculated using the state of the original DOO order after the creation of the original DOO order (i.e., before the orchestration system starts to process the original DOO order), rather than the current running state of the original DOO order at the exact moment a change request is received.

The delta comprises a set of pre-defined order attributes, identified as "delta attributes." A delta attribute is an attribute that denotes a change in an order, and triggers an adjustment of the order that is being orchestrated. Thus, the delta is computed based on a well-defined set of delta attributes. The delta attributes may be located at a header level, a line level, and a fulfillment level of a DOO order. The delta attributes may also be located on a child entity of a DOO order. In an embodiment, a user may add additional delta attributes to the pre-defined set of delta attributes. These additional attributes are identified as dynamic delta attributes. However, a user cannot remove an pre-defined delta attribute from the set.

The delta computation can be done in an application module that compares appropriate objects (i.e., the new DOO order and the original DOO order) and reviews the delta attributes, defined both by the orchestration system and users of the orchestration system, in order to determine delta. The application module will then create an indication of the delta between the two DOO orders, which is suitable for storage.

Below is example pseudo-code for computing a delta between a new DOO order and an original DOO order:

```
computeDelta(HeaderVORowImpl changedOrder) {
    Header originalOrderHeader = fetchOriginalOrder( );
    Header changedOrderHeader = new Header(changedOrder);
    --- Fetch order's group id
    GroupId = orginalOrder.getFulfillmentLine.getGroupId;
    --- Fetch process id of the order
    -- Fetch process id using group id
    ProcessId = getProcessId(GroupId );
    ---- Fetch the delta attributes of the processId
    HashMap hmDeltaAttributeSet = getDeltaAttributes(ProcessId);
    HashMap lineAttributeCollection = hmDeltaAttributeSet.get(LineCollection);
    HashMap FlineAttributeCollection = hmDeltaAttributeSet.get(FLineCollection);
    HashMap hmOriginalOrderLines = originalOrderHeader.getlines( );
    HashMap hmOriginalOrderFLines = originalOrderHeader.getFlines( );
    HashMap hmChangedOrderLines = changedOrderHeader.getlines( );
    HashMap hmChangedOrderFLines = changedOrderHeader.getFlines( );
    for each changedOrderHeader.dooLine fetch originalOrderHeader.dooLine
        loop around the lineAttributeCollection and get AttributeName
            fetch the Attribute Value for both changedOrderHeader.dooLine
            and originalOrderHeader.dooLine.
    -- Compare attribute values
    compareValues;
    If found different mark delta bit set for attribute change as 1
    for each changedOrderHeader.dooFLine fetch originalOrderHeader.dooFLine
        loop around the FlineAttributeCollection and get AttributeName
            fetch the Attribute Value for both changedOrderHeader.dooFLine
            and originalOrderHeader.dooFLine.
    -- Compare attribute values
    compareValues;
    If found different mark delta bit set for attribute change as 1
    For all the lines in changedOrderHeader and not in originalOrderHeader
    Set the line addition bit to 1.
    For all the lines in originalOrderHeader and not in changedOrderHeader
    Set the line cancel bit to 1.
    For all the Flines in changedOrderHeader and not in originalOrderHeader
    Set the Fline addition bit to 1.
    For all the Flines in originalOrderHeader and not in changedOrderHeader
    Set the Fline cancel bit to 1.
    }
    --Fetch process id using group id
    getProcessId(groupId){
        set where condition on doo orchestration groups VO and fetch process id
        for the corresponding group id.
        return process id;
    }
    Collection getAttributeSet(processId){
        --Fetch all the attribute rows for the process Id
        Collection attributeRowCollection = select attributeRowSet for the
```

```
        processId;
        for(each row in the attributeRowCollection)
        --Check the attribute source
        if(attribute source = Line)
            lineAttributeCollection.add(attributeName)
        else if(attribute source = FulfillLine)
            fulfillLineAttributeCollection.add(attributeName)
        entireCollection.add(LineAttributeCollection);
        entireCollection.add(fulfillLineAttributeCollection);
        return the entireCollection with all the individual collections
}
Header fetchOriginalOrder( ){
    Build original order header using the fetched HeaderVORowImpl
    From the table DOO_ORDER_STATE;
}
```

However, one of ordinary skill in the art would readily appreciate that the above pseudo-code is merely an example according to an embodiment, and that computer code for selecting an executable process could take many different forms and still be within the scope of the invention.

Figure 30:
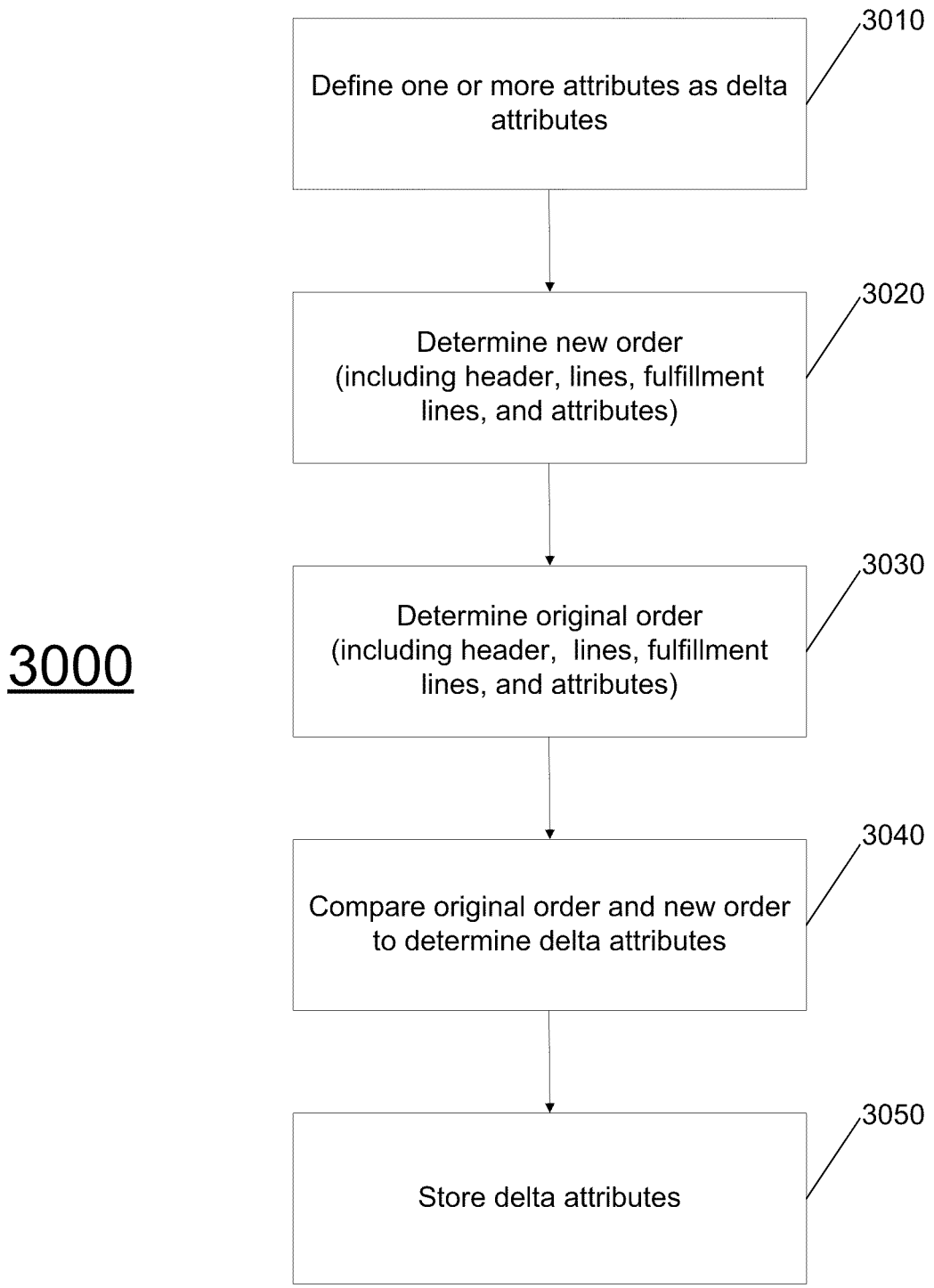
FIG. 30 illustrates a flowchart of a method for determining one or more delta attributes according to one embodiment.

FIG. 30 illustrates a flowchart 3000 of a method for determining one or more delta attributes according to one embodiment. At 3010, one or more attributes are defined as delta attributes. The one or more attributes include the order attributes that are pre-defined by the orchestration system as delta attributes and any order attributes defined by the user as delta attributes. The one or more attributes may exist at the header level, the line level, and the fulfillment line level. At 3020, a new DOO order is determined. The new DOO order is the DOO order created after the change request is received, where the new DOO order includes the requested modifications to the original DOO order. At 3030, an original DOO order is determined. The original DOO order is the DOO order that is currently being processed by an orchestration system when a change request is received. At 3040, the original DOO order and the new DOO order are compared to determine delta attributes between the original DOO order and the new DOO order. In an embodiment, this comparison can include: (a) determining which lines and fulfillment lines have moved to a new group in the new DOO order; (b) determining which lines and fulfillment lines have been added to the new DOO order; (c) determining which lines and fulfillment lines have been cancelled from the original DOO order; (d) determining which system-defined delta attributes have changed in the new DOO order as compared to the original DOO order; and (e) determining which user-defined dynamic delta attributes have changed in the new DOO order as compared to the original DOO order. As previously discussed, delta attributes may be found at the header, line, and fulfillment line level. At 3050, delta attributes are stored in order to indicate the delta between the original DOO order and the new DOO order. The specifics of how the delta attributes are stored are discussed below.

In an embodiment of the invention, five types of delta are defined. The five types are: (a) group change; (b) add line; (c) cancel line; (d) delta attribute change; and (e) dynamic delta attribute change. The group change delta signifies that one or more lines of the original DOO order have moved to a new group in the new DOO order. The add line delta signifies that one or more new lines have been added to the new DOO order. The cancel line delta signifies that one or more lines from the original DOO order have been cancelled in the new DOO order. The delta attribute change delta signifies that one or more delta attributes at either the header level, line level, or fulfillment line level have changed in the new DOO order, compared to the original DOO order. If the quantity delta attribute is one of the attributes that have changed, this is also specifically indicated, because the quantity delta attribute requires special logic, as described in a previous section, because a quantity increase or decrease can affect how a change request is processed. The dynamic delta attribute change delta signifies that one or more user-defined attributes have changed in the new DOO order on one or more lines.

Figure 31:
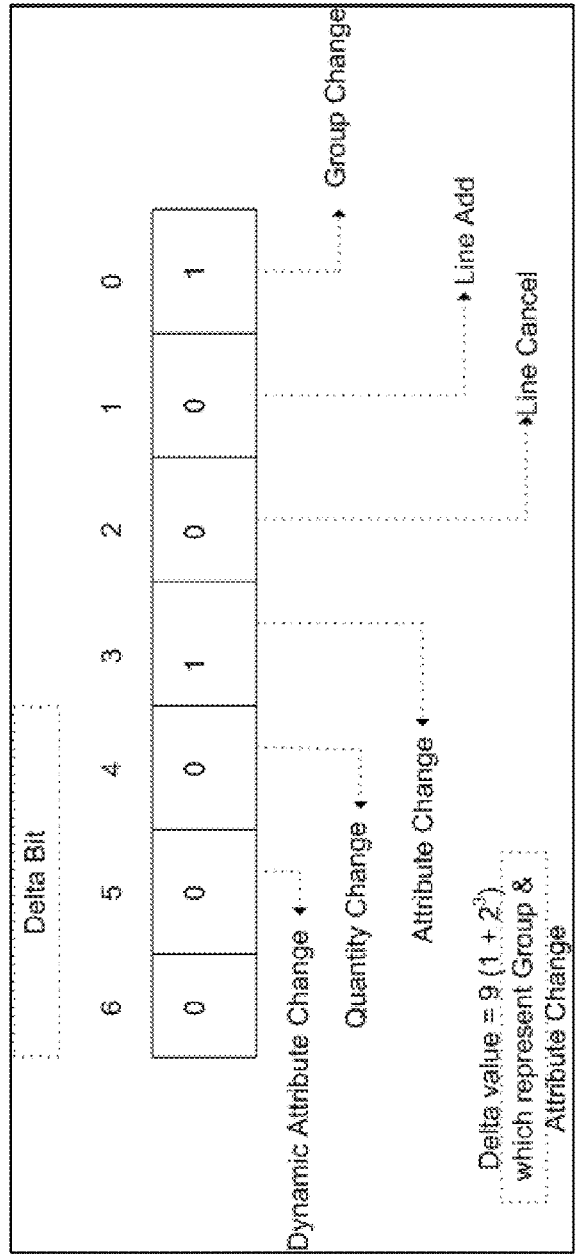
FIG. 31 illustrates a bit diagram of possible delta types according to one embodiment.

FIG. 31 illustrates a bit diagram 3100 used to store a delta type according to one embodiment. Bit diagram 3100 illustrates the possible delta types. In an embodiment of the invention, a delta type can be stored which is capable of representing the delta(s) computed. The delta type is stored in a bit storage, as illustrated in FIG. 31. As also illustrated in FIG. 31, the bit storage includes seven bits, where each bit is capable of storing a value of either 0 or 1. Bits 0 through 5 each indicate one of the types of delta discussed above. More specifically, bit 0 corresponds to a group change delta between the original DOO order and the new DOO order, bit 1 corresponds to an add line delta, bit 2 corresponds to a cancel line delta, bit 3 corresponds to an attribute change delta, bit 4 corresponds to a quantity attribute change delta, and bit 5 corresponds to a dynamic attribute change delta. Each bit may be set to 0, which indicates that there is no delta for that particular delta type, or may be set to 1, which indicates at least one delta for that particular delta type.

Furthermore, more than one bit of the bit storage may be set to 1 at the same time. For example, as illustrated in FIG. 31, bit 0 and bit 3 of bit diagram 3100 are both set to 1. The bit representation of bit diagram 3100 therefore represents that there is both a group change delta and an attribute change delta between the new DOO order and the original DOO order, and that there are no other types of delta between the two DOO orders.

In an embodiment of the invention, the set of order attributes that the orchestration system pre-defines as delta attributes can be stored in a Java® programming language class. In the embodiment, the set of dynamic order attributes that can be defined by a user as delta attributes can be stored in a storage medium, such as a database or cache.

In an embodiment of the invention, the set of attributes (both pre-defined and dynamic) which are defined as delta attributes can be customized at a process level, a task level, and a process-service level. At the process level, for a given executable process, a user can selectively add delta attributes to a global process set (i.e., a set of delta attributes for all processes). Additional delta attributes selected by a user can subsequently be added to a specific executable process, and at runtime, the orchestration system views the global delta attributes plus the additional delta attributes added by the user. At the task level, for a given task type, a user can selectively add delta attributes to a global delta attribute set for the task type. Additional delta attributes selected by the user can subsequently be added to the specific task type, and at runtime, the orchestration system views the global delta attributes plus the additional delta attributes added by the user. At the process-service level, a user can customize a set of delta attributes for a specific service within a context of an executable process.

Figure 32:
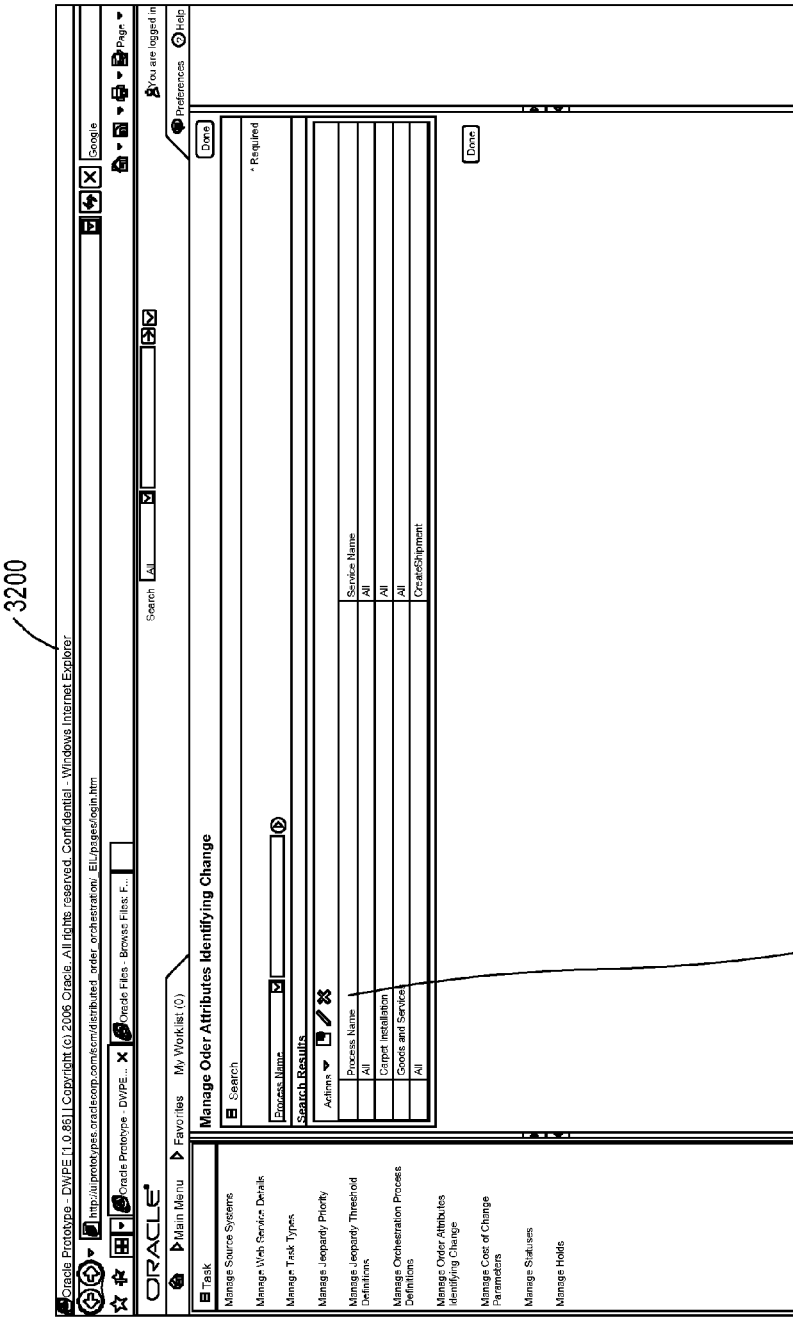
FIG. 32 illustrates a user interface for managing delta attributes according to one embodiment.

FIG. 32 illustrates an example of a user interface 3200 for managing delta attributes for an orchestration process according to one embodiment. User interface includes process column 3210 which shows a list of processes. User interface 3200 allows a user to select a process from process column 3210 and further manage the delta attributes for that particular process. For example, in FIG. 32, process column displays the processes "All," "Carpet Installation," "Goods and Services," and "All."

Figure 33:
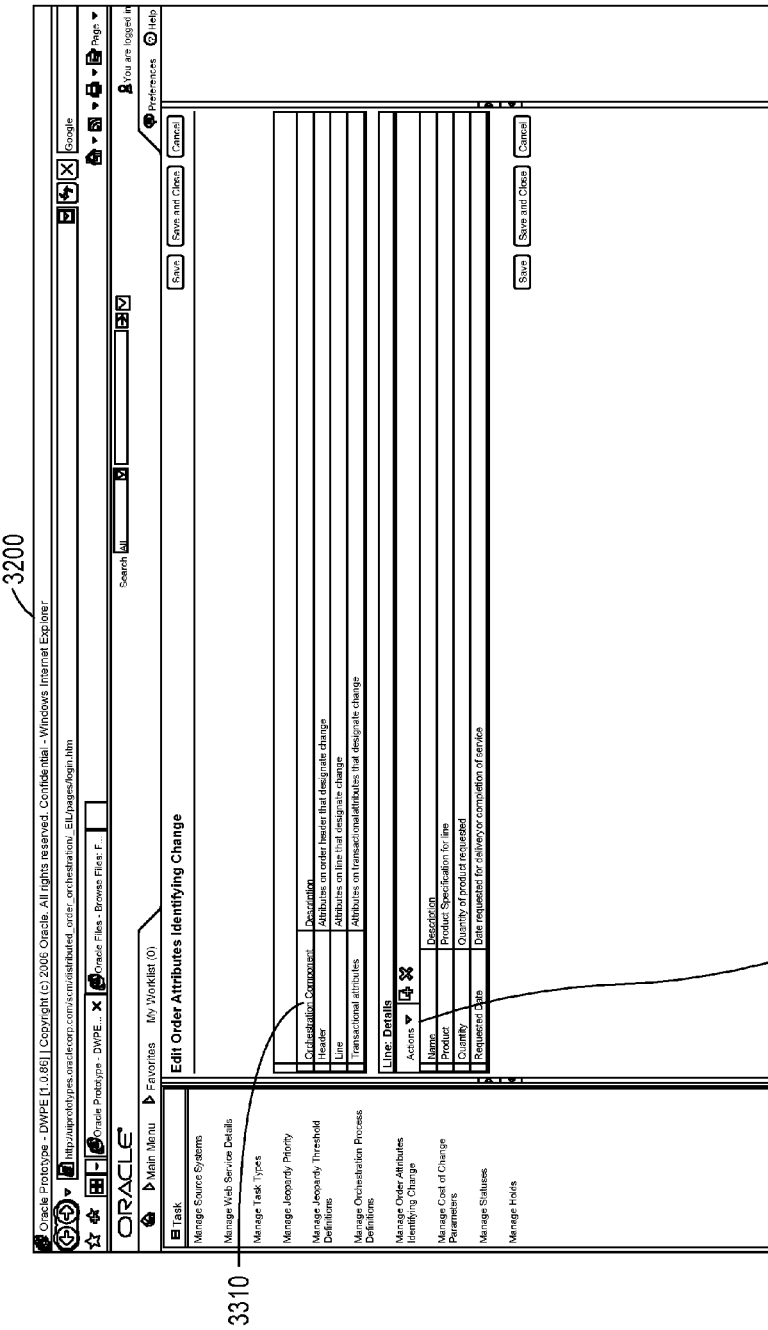
FIG. 33 illustrates a user interface for editing delta attributes according to one embodiment.

FIG. 33 illustrates an example of a user interface 3300 for editing delta attributes for an orchestration process according to another embodiment. In an embodiment, user interface 3300 is displayed, after a user selects a process from process column 3210 of FIG. 32. User interface 3300 includes orchestration component column 3310. Orchestration component column 3310 includes a list of orchestration components. In the example illustrated in FIG. 33, orchestration component column 3310 includes the orchestration components, "Header," "Line," and "Transactional attributes." Once a user selects one of the orchestration components, user interface 3300 displays a details screen. In the example illustrated in FIG. 33, the user has selected the orchestration component, "Line," and thus, user interface 3300 displays a "Line: Details" screen. The details screen includes name column 3320. Name column 3320 displays a list of attributes that have been selected as delta attributes for the selected orchestration component. The user may add, delete, or update attributes that are selected as delta attributes. In the example illustrated in FIG. 33, the attributes selected as delta attributes (and displayed in name column 3320) are, "Product," "Quantity," and "Requested Date."

Saving Order Process State

According to an embodiment of the invention, while an executable process is being executed, the executable process is capable of saving the state of the executable process at a milestone. A state of the process includes attribute values for the header, line, and fulfillment line of the corresponding DOO order. A milestone is a pre-defined step in the execution of the executable process. The saved state can be used to automatically adjust the already-performed step in the event that a change request is received, previously discussed in a separate section.

According to the embodiment, the executable process can save the state of the executable process through one of two modes: Simple mode and Advanced mode. In Simple mode, the executable process saves the state of the executable process after an original DOO order is created, and before the executable process processes the DOO order. This milestone is identified as "Saving Original Order." In Simple mode, the executable process also saves the state of the executable process upon receiving a change request and before merging the new DOO order with the original DOO order. This milestone is identified as "Saving Running Order."

In Advanced mode, rather than saving the state of the executable process upon receiving a change request, the executable process saves the state of the executable process after it completes each step of the executable process. This milestone is identified as "Saving Order While Executing Step." Thus, the "Saving Order While Executing Step" milestone replaces the "Saving Running Order" milestone in Advanced mode. This mode can be used when the state of the executable process changes at each step.

Furthermore, according to the embodiment, a framework for disabling change requests at a process level may be provided. In this embodiment, if change requests are disabled, then the executable process does not save the state at the appropriate milestone. In an embodiment, this framework may be implemented by a flag associated with the executable process.

Figure 34:
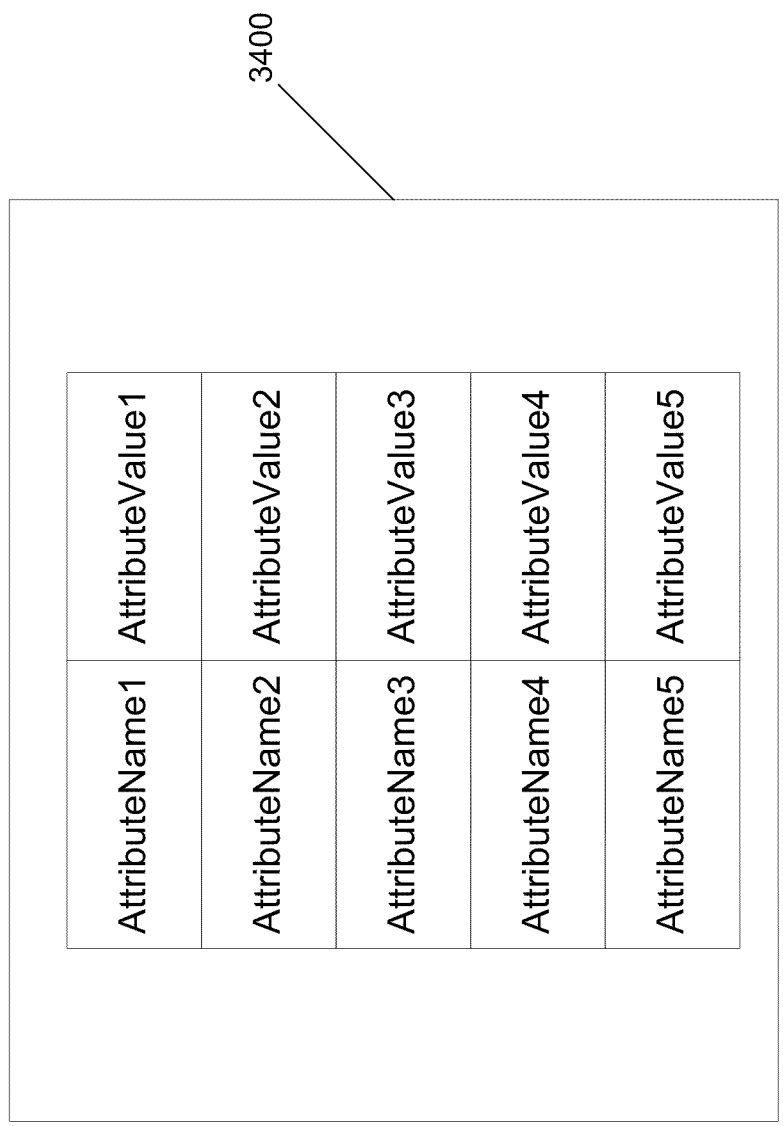
FIG. 34 illustrates an example of a binary object which comprises the saved state of an executable process according to one embodiment.

FIG. 34 illustrates a binary object 3400 which comprises the saved state of an executable process according to one embodiment. In the embodiment, binary object 3400 includes a map of the attribute values of the corresponding order. In other words, binary object 3400 includes a map which includes one or more attribute name/attribute value pairs (illustrated in FIG. 34 as [AttributeName1, AttributeValue1], [AttributeName2, AttributeValue2], . . . [AttributeName5, AttributeValue5]). One of ordinary skill in the art would readily understand that the number of pairs included in binary object 3400 is merely an example, and that binary object 3400 may include any number of attribute name/attribute value pairs.

Figure 35:
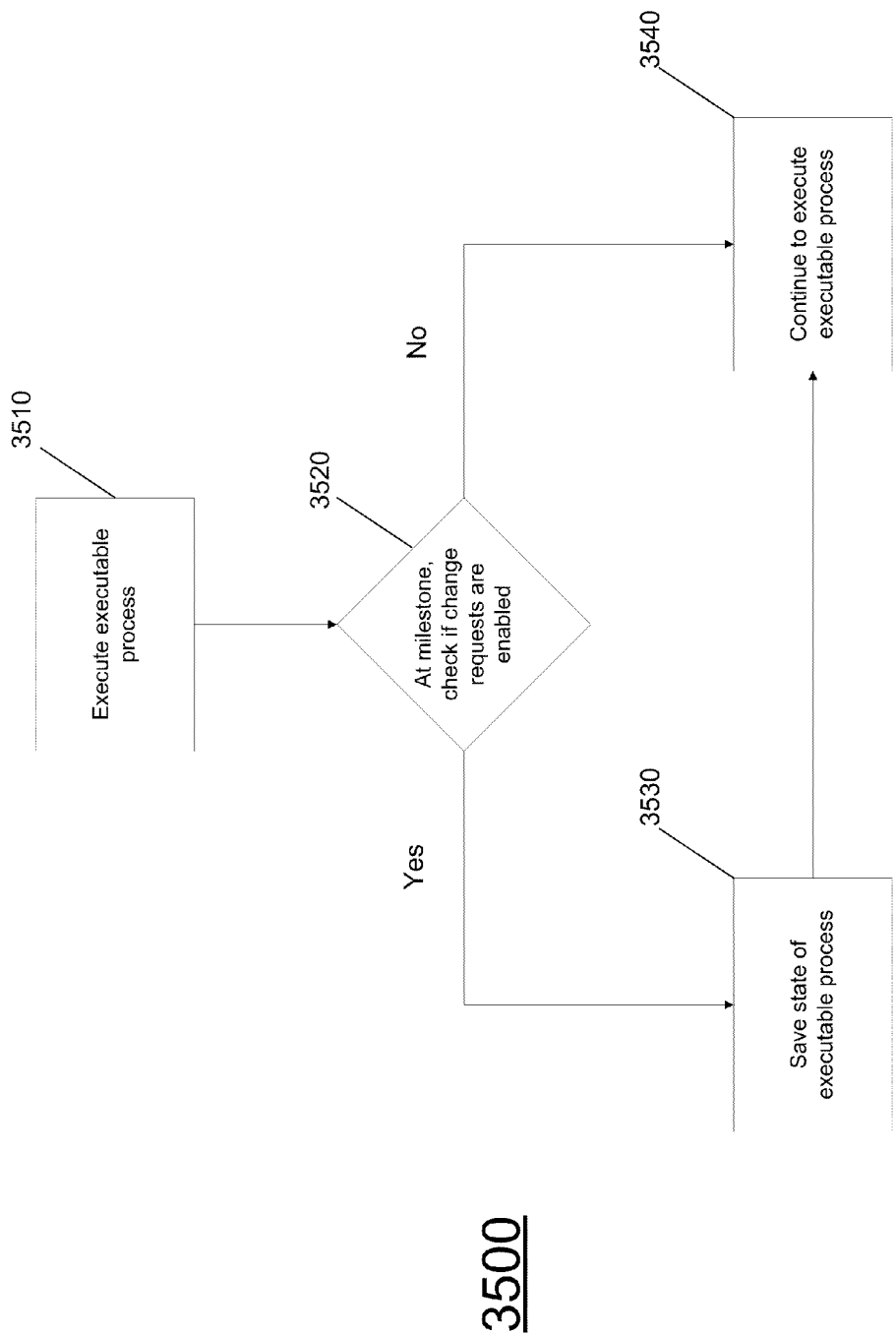
FIG. 35 illustrates a flowchart of a method for saving a state of an executable process according to one embodiment.

FIG. 35 illustrates a flowchart 3500 of a method for saving a state of an executable process according to one embodiment of the invention. At 3510, an executable process is executed. At 3520, when the executable process reaches an appropriate milestone, it is determined whether change requests are enabled. If change requests are enabled, the executable process saves the state of the executable project in a binary object at 3530, and continues executing the process at 3540. If change requests are not enabled, the executable process does not save the state, and merely simply continues executing the process at 3540.

Figure 36:
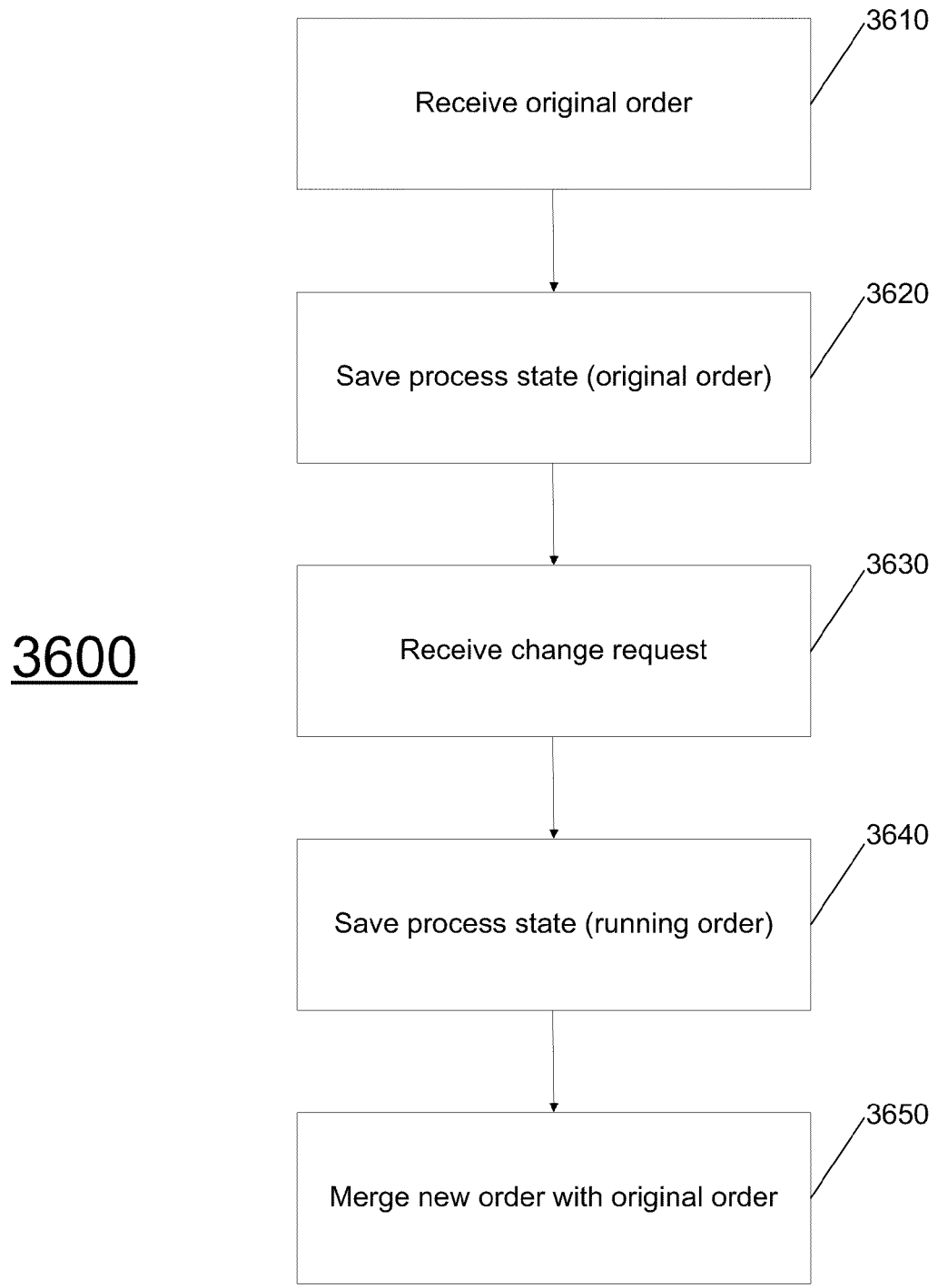
FIG. 36 illustrates a flowchart of a method for saving a state of an executable process in simple change management mode according to one embodiment.

FIG. 36 illustrates a flowchart 3600 of a method for saving a state of an executable process in simple change management mode according to one embodiment. At 3610, an original DOO order is received, and a corresponding executable process is generated. At 3620, the executable process saves its current state before executing the steps of the executable process. At 3630, the executable process receives an indication of a change request. At 3640, the executable process saves its current state. At 3650, a new DOO order is merged with the original DOO order. In an embodiment of the invention, the saved state of the executable process is used in the merging of the new DOO order with the original DOO order.

Figure 37:
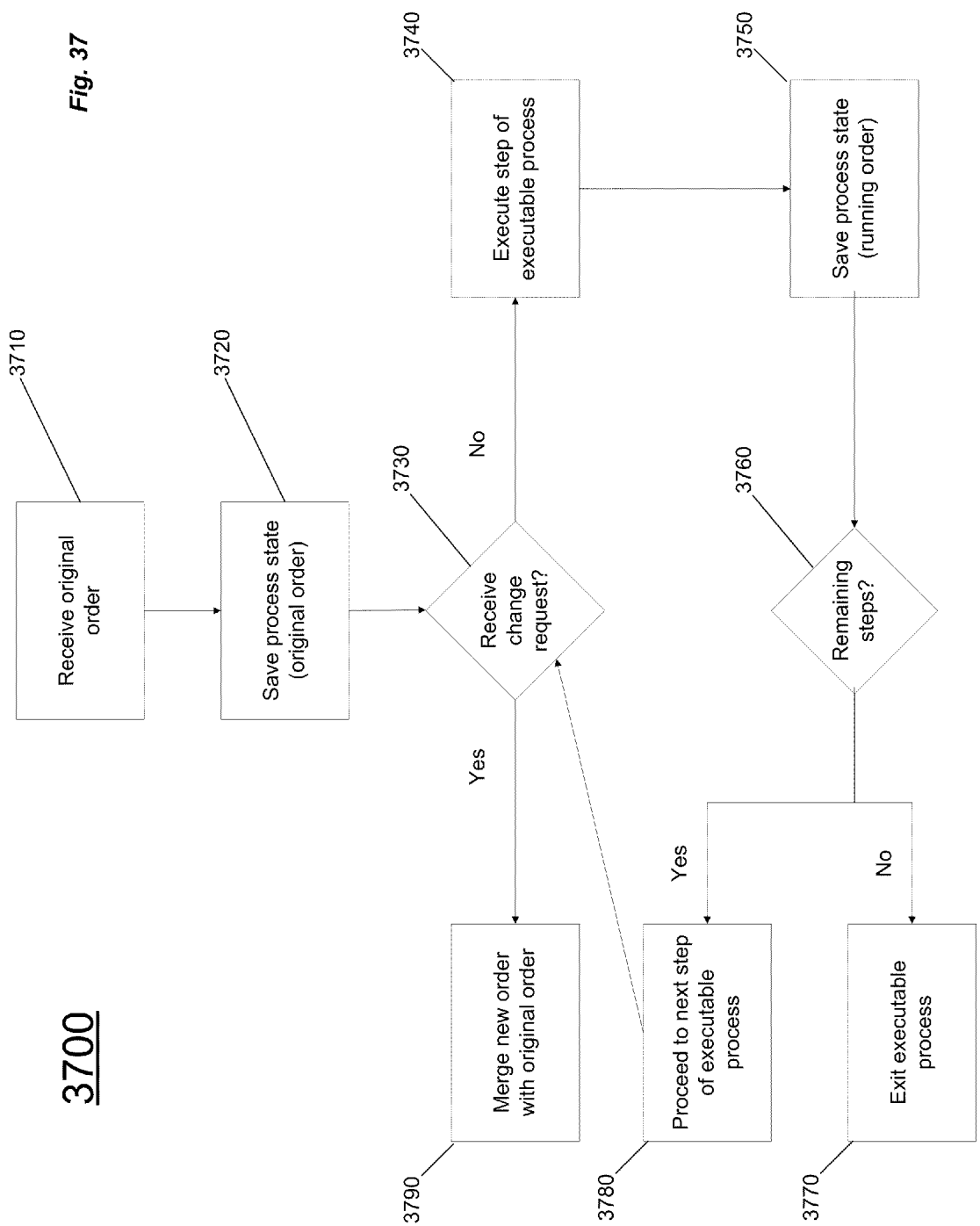
FIG. 37 illustrates a flowchart of a method for saving a state of an executable process in advanced change management mode according to one embodiment.

FIG. 37 illustrates a flowchart 3700 of a method for saving a state of an executable process in advanced change management mode according to one embodiment. At 3710, an original DOO order is received, and a corresponding executable process is generated. At 3720, the executable process saves its current state before executing the steps of the executable process. At 3730, it is determined whether the executable process receives an indication of a change request before executing the next step of the executable process. Based on the determination, one of the following two branches is implemented.

If no change request indication is received, at 3740, the executable process executes the next step of the executable process. At 3750, after the step has been executed, the executable process saves its current state. At 3760, the executable process determines if there are any remaining steps to be performed. If there are no remaining steps then, at 3770, the executable process is exited. If there are remaining steps then, at 3780, the executable process proceeds to the next step. The flow then returns to 3730, where it again determines whether an indication of a change request has been received.

If a change request is received, at 3790, a new DOO order is merged with the original DOO order. In an embodiment of the invention, the saved state of the executable process is used in the merging of the new DOO order with the original DOO order.

In the embodiments previously described, an orchestration system saves a state of the executable process when executing a step (i.e., when invoking a task layer service). However, in an embodiment of the invention, a user using a to-do service or a generic service may trigger the orchestration system to save the state of the executable process. Within a to-do service or a generic service, a user may optionally save the state for the following activities: (a) an invoke activity; (b) a switch case; (c) a while loop; (d) a flow; and (e) a flowN.

Cost of Change

Changing an order while it is being fulfilled has an associated cost. Based on this cost, users may or may not want to process a change to an existing order. According to an embodiment of the invention, a user is able to define a cost of change value for a business process. In one embodiment, a user can define a cost of change value for the overall business process. In another embodiment, a user can define a cost of change value for each step of the business process.

Furthermore, in one embodiment, a user can define a cost of change value (for either a business process or a step of a business process) by selecting one cost of change value from one or more cost of change values. These one or more cost of change values can be pre-defined by a user or an administrator. In another embodiment, a user can define a cost of change value (for either a business process or a step of a business process) by selecting a business rule. The business rule can then evaluate runtime data associated with the business process and calculate a cost of change value based on the runtime data. An example of a business rule is described in more detail in a separate section. The business rule can be pre-defined by a user or an administrator.

Furthermore, according to an embodiment of the invention, a user or an administrator, can also associate a cost of change value to either a line, a transactional attribute record, or a field of line item record.

In an embodiment, the cost of change value (of either the business process or a step of the business process) can be interpreted by an order capture module, and any change request can be validated base on the overall cost of change value.

For example, a user defines a business process for ordering carpet. The business process includes a step for measuring the carpet, a step for cutting the carpet, and a step for shipping the carpet. A user also defines a cost of change value for each step of the business process, where the cost of change value for the step of measuring the carpet is relatively smaller than the cost of change value for the steps of cutting the carpet and shipping the carpet. If a change request is received in a distributed order orchestration system where the system has not begun executing the step of cutting the carpet, the system can decide to process the change request, because the cost of change value for the step of measuring the carpet is not large. However, if a change request is received in a distributed order orchestration system has begun executing the step of cutting the carpet, or the step of shipping the carpet, the system can decide to deny the change request, because the overall cost of change value of adjusting the steps of measuring the carpet and cutting the carpet (and potentially shipping the carpet) is too large.

Figure 38:
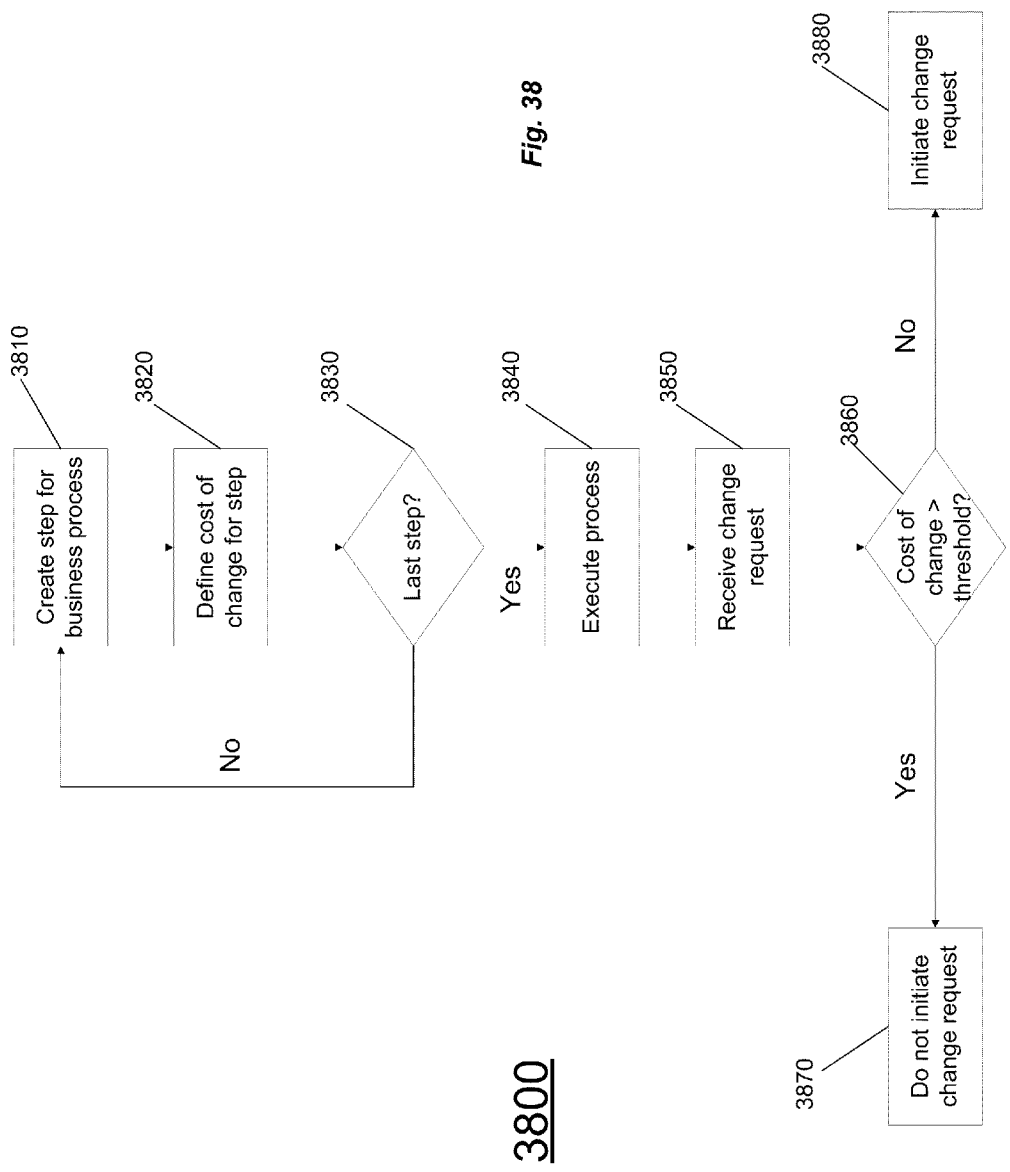
FIG. 38 illustrates a flowchart of a method for defining and applying a cost of change according to one embodiment.

FIG. 38 includes a flowchart 3800 of a method for defining and applying a cost of change according to one embodiment. At 3810 a step for a business process is created. At 3820, a cost of change is defined for the step. The cost of change represents a valuation of the cost required to adjust the step of the business process. In an embodiment, a cost of change can be defined by selecting one cost of change value from one or more cost of change values. However, other methods for defining a cost of change may be used. For example, in an alternative embodiment, a cost of change can be defined by selecting and implementing a business rule. At 3830, it is determined if there are any more steps to be created for the business process. If there are more steps to be created, 3810 and 3820 are repeated. 3810 and 3820 are repeated until all the steps of the business process have been created.

If there are no more steps to be created, at 3840, the executable process generated from the business process is executed. At 3850, a change request is received. Before initiating the change request it is determined at 3860 whether the total cost of change value for the executable process (i.e., the sum of the cost of change values for each of the steps) is greater than a pre-defined threshold. If the total cost of change value for the executable process is greater than the threshold, then the change request is not initiated, as shown at 3870. If the total cost of change value for the executable process is not greater than the threshold, then the change request is initiated, as shown at 3880.

Figure 39:
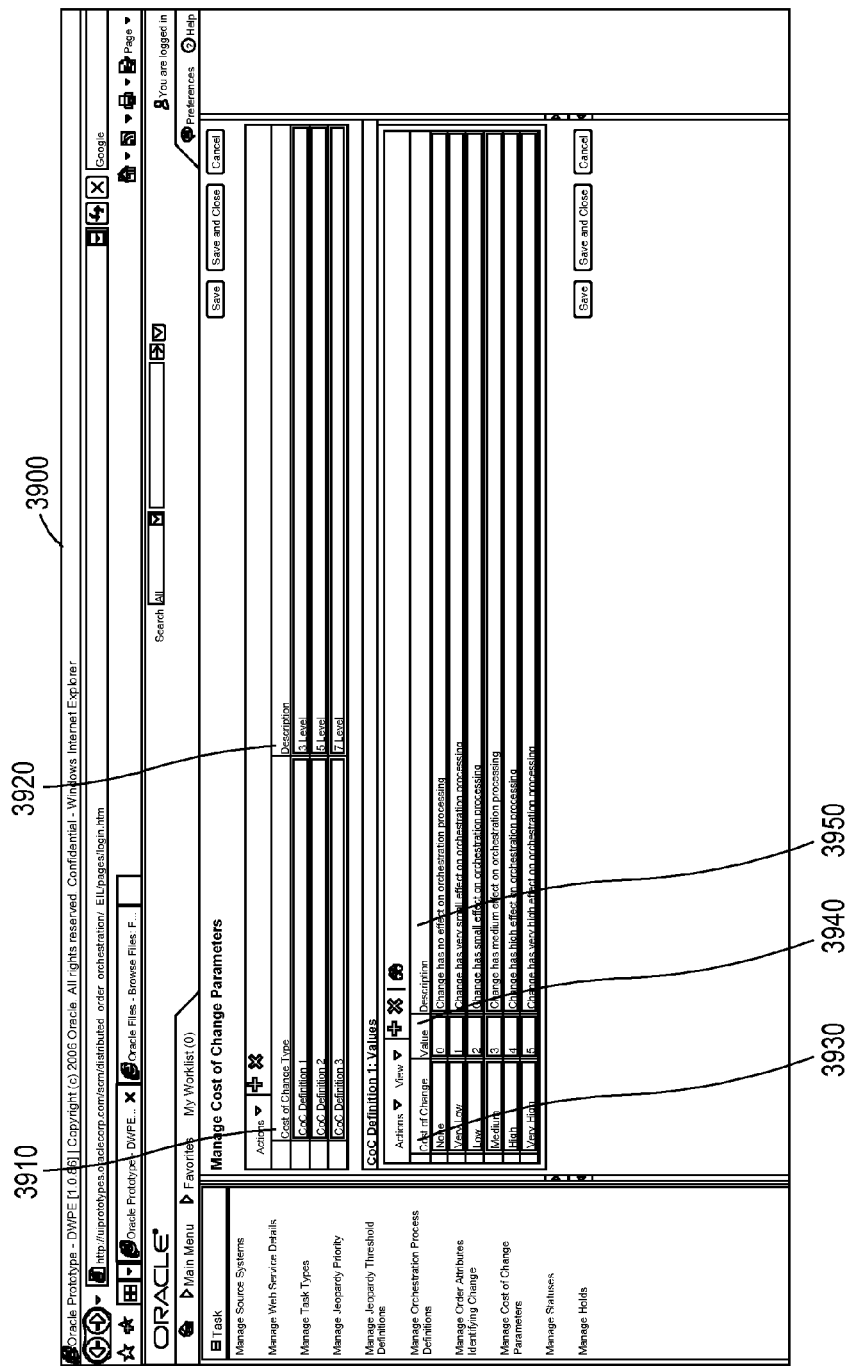
FIG. 39 illustrates a user interface for defining a cost of change value according to one embodiment.

FIG. 39 illustrates an example of a user interface 3900 for defining a cost of change value according to one embodiment. User interface 3900 allows a user to define one or more cost of change value types, with each cost of change value type including one or more cost of change values. In an embodiment, user interface 3900 includes cost of change type column 3910. Cost of change type column 3910 identifies each cost of change type defined by the user. A cost of change type describes a set of cost of change values defined by a user. A user can define different sets of cost of change values for each cost of change type. For example, cost of change type A may include the cost of change values 0, 1, 2, 3, whereas cost of change type B may include the cost of change values 0, 1, 2, 3, 4, 5, and 6. In the example illustrated in FIG. 39, cost of change type column 3910 displays three cost of change types created by the user: CoC Definition 1, CoC Definition 2, and CoC Definition 3. User interface also includes description column 3920, which includes a description of each cost of change type created by the user.

User interface 3900 also includes columns which identify each cost of change value of a specific cost of change type. For example, user interface 3900 displays the cost of change values for the cost of change type, "CoC Definition 1." User interface 3900 includes three columns, cost of change column 3930, value column 3940, and description column 3950. In the example illustrated in FIG. 39, user interface 3900 displays six cost of changes values (i.e., 0, 1, 2, 3, 4, and 5) for the cost of change type, "CoC Definition 1." The cost of change value 0 corresponds to no effect on orchestration processing. The cost of change value 1 corresponds to a very small effect on orchestration processing. The cost of change value 2 corresponds to a small effect on orchestration processing. The cost of change value 3 corresponds to a medium effect on orchestration processing. The cost of change value 4 corresponds to a high effect on orchestration processing. The cost of change value 5 corresponds to a very high effect on orchestration processing. Thus, a user can assign a cost of change value to each step of a business process utilizing the cost of change values of a given cost of change type.

Figure 40:
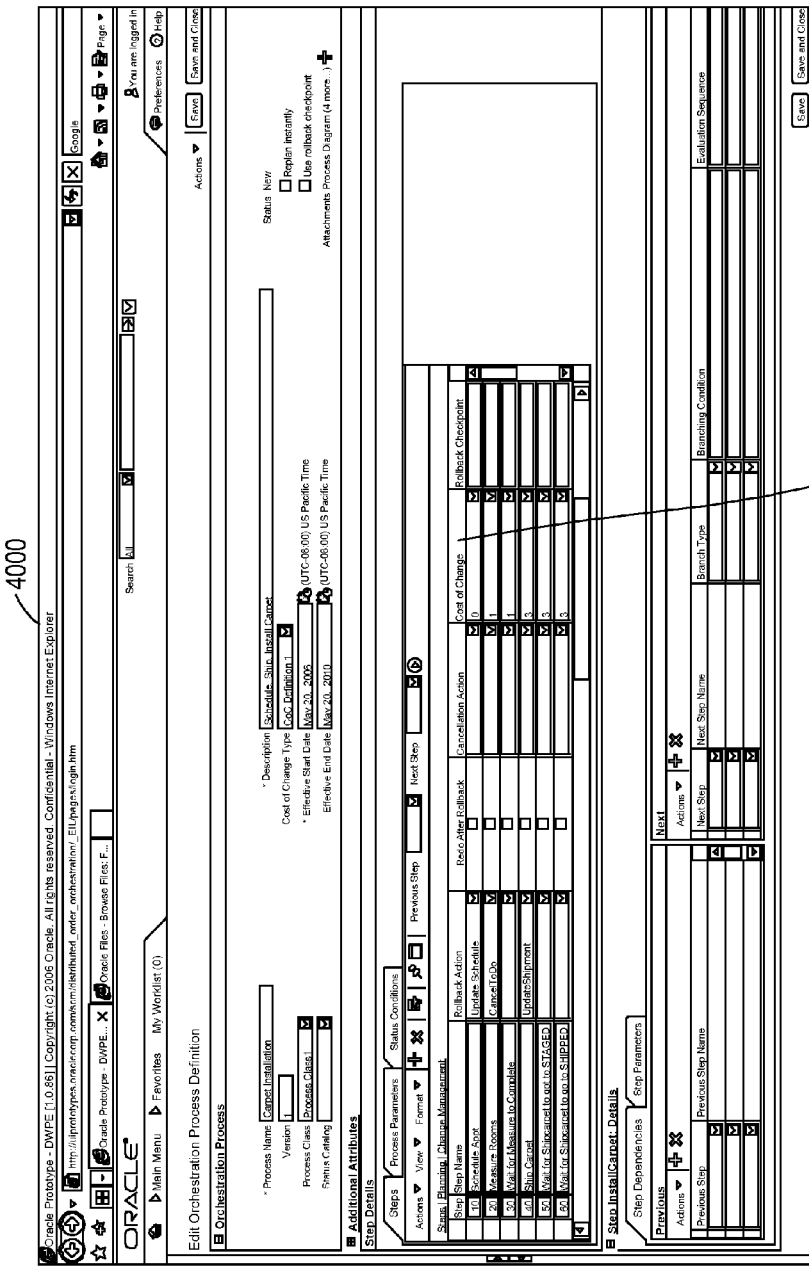
FIG. 40 illustrates a user interface for defining a cost of change value for a step of a business process according to one embodiment.

FIG. 40 illustrates an example of a user interface 4000 for defining a cost of change value for a step of a business process according to one embodiment. Specifically, user interface 4000 provides a column, cost of change column 4010, where a user can assign a cost of change value for a particular step of a business process. The user can assign each step any value from a list of available cost of change values. For example, in user interface 4000, a user has assigned the following cost of change values:

| Step | Cost of Change Value |
|------|---------------------|
| 10   | 0                   |
| 20   | 1                   |
| 30   | 1                   |
| 40   | 3                   |
| 50   | 3                   |
| 60   | 3                   |

Figure 41:
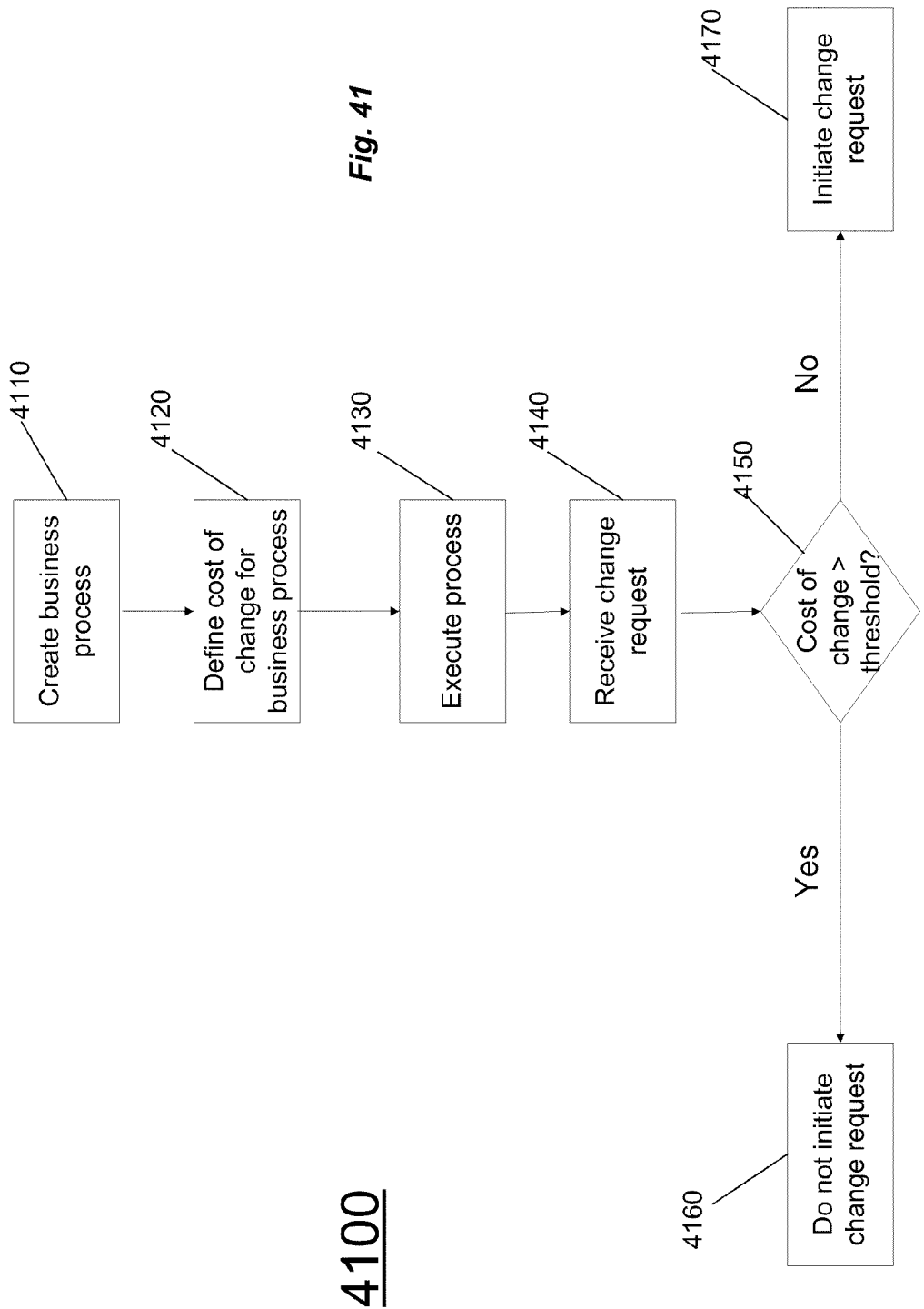
FIG. 41 includes a flowchart of a method for defining and applying a cost of change according to another embodiment.

FIG. 41 includes a flowchart 4100 of a method for defining and applying a cost of change according to another embodiment. At 4110 a business process is created. At 4120, a cost of change is defined for the business process. The cost of change represents a valuation of the cost required to adjust the business process. In an embodiment, a cost of change can be defined by selecting one cost of change value from one or more cost of change values. However, other methods for defining a cost of change may be used. For example, in an alternative embodiment, a cost of change can be defined by selecting and implementing a business rule. At 4130, the executable process generated from the business process is executed. At 4140, a change request is received. Before initiating the change request it is determined at 4150 whether the cost of change value is greater than a pre-defined threshold. If the cost of change value for the executable process is greater than the threshold, then the change request is not initiated, as shown at 4160. If the cost of change value for the executable process is not greater than the threshold, then the change request is initiated, as shown at 4170.

Figure 42:
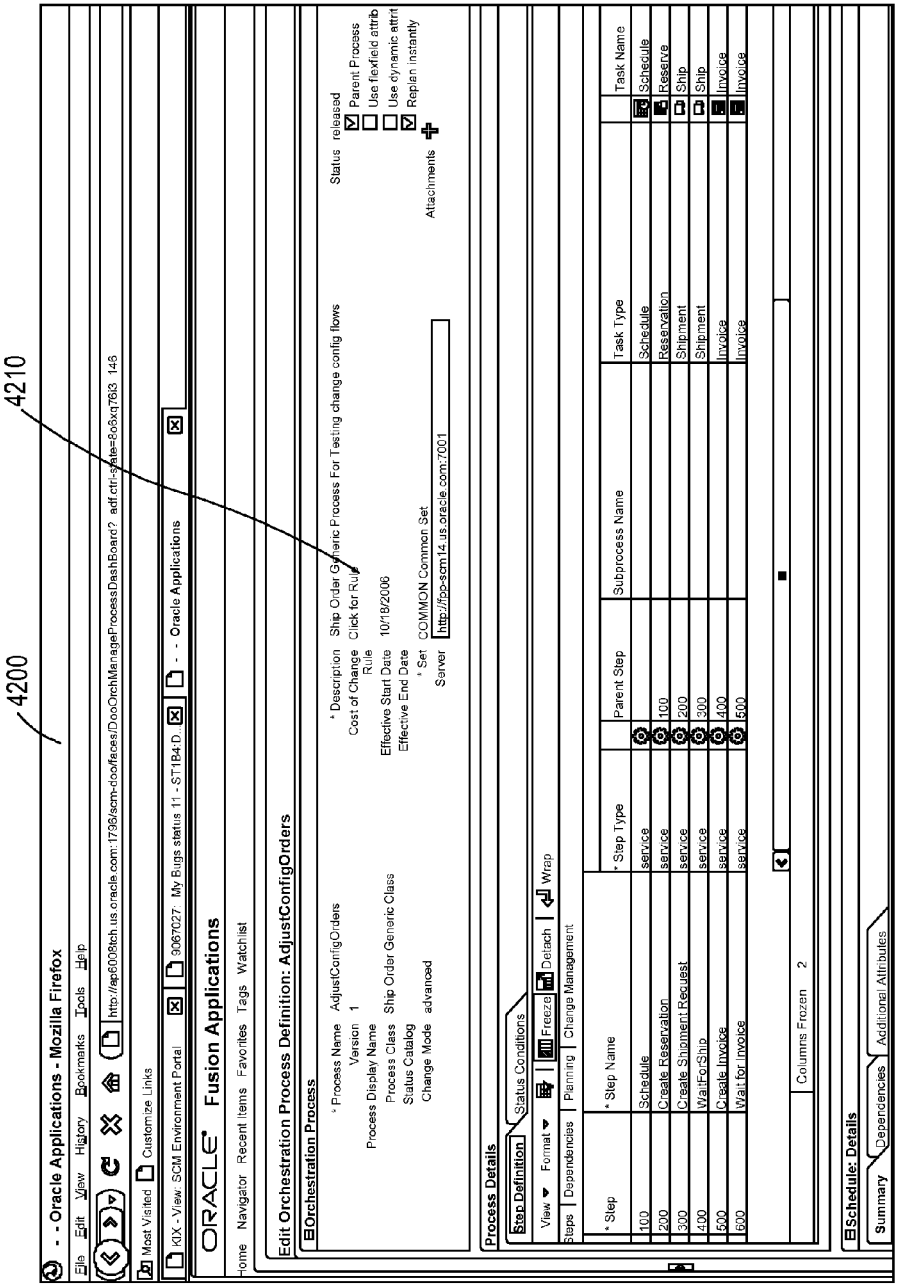
FIG. 42 includes an example of a user interface for defining a cost of change value for a business process according to one embodiment.

FIG. 42 includes an example of a user interface 4200 for defining a cost of change value for a business process according to one embodiment. User interface 4200 provides a field, cost of change rule field 4210, which allows a user to select a business rule to implement. The selected business rule can evaluate the runtime data associated with the business process and calculate a cost of change value for the business process.

Task Layer Service Patterns

As previously described, each step of a business process modeled by a user is associated with a task type (i.e., the type of task being performed by the business step) and a task name. As also previously described, each step of the business process is associated with a service. The service is dynamically invoked by an executable process corresponding to the business process at runtime.

According to an embodiment of the invention, for each task type, task layer service patterns are utilized to support normal orchestration and change request processing. A task layer service pattern is a template for providing a task layer service that can be used in many different situations, as opposed to a finished task layer service that is capable of being executed.

In an embodiment of the invention, the task layer service patterns which are utilized are: (1) Create<TaskTypeName> (i.e., create task layer service pattern); (2) Update<TaskTypeName> (i.e., update task layer service pattern); and (3) Cancel<TaskTypeName> (i.e., cancel task layer service pattern).

The create task layer service pattern is used to perform the regular operation of the task layer service. For example, for the task of shipping, task layer service CreateShipment invokes the fulfillment service to perform the regular operation of shipping a specific item. The update task layer service pattern is used to perform the adjustment of the task layer service that has already been executed. For example, for the shipment task, task layer service UpdateShipment invokes the fulfillment service for adjusting the previous invocation of the fulfillment service for shipping the specific item. The cancel task layer service pattern is used to perform the cancellation of the task layer service that has already been executed. For example, for the shipment task, task layer service CancelShipment invokes the fulfillment service for cancelling the previous invocation of the fulfillment service for shipping the specific item.

In another embodiment of the invention, additional task layer service patterns are also utilized. An example of additional task layer service patterns are: (1) Hold<TaskTypeName> (i.e., hold task layer service pattern); (2) CheckIfChangeIsAllowed(TaskTypeName) (i.e., check task layer service pattern); (3) Redo<TaskTypeName> (i.e., redo task layer service pattern); and (4) NoOp<TaskTypeName> (i.e., no operation task layer service pattern).

In the embodiment, the hold task layer service pattern can be used to put a task on hold if the task includes a wait step when a change request is received. The check task layer service pattern can be used in order to determine whether a task allows for adjustment when a change request is received. The redo task layer service pattern can be used to perform the cancellation of the task layer service that has already been executed, and then re-perform the task layer service. The no operation task layer service pattern can be used when no further processing of the task layer service is required.

As previously discussed, an executable process is capable of performing the steps of the business process in regular mode or change mode. During regular mode, each step of the business process can be performed utilizing a task layer service pattern. For example, during regular mode, a step of the business process can be performed using a create task layer service pattern. However, in other examples, during regular mode, a step of the business process can be performed using another task layer service pattern, such as an update task layer service pattern, or a cancel task layer service pattern. During change mode, each step of the business process can be performed utilizing a task layer service pattern, based on the type of change needed. For example, during change mode, a step of the business process can be performed using an update task layer service pattern. In another example, during change mode, a step of the business process can be performed using a cancel task layer service pattern. Furthermore, in other examples, during change mode, a step of the business process can be performed using another task layer service patterns, such as a hold task layer service pattern, and a check task layer service pattern.

Figure 43:
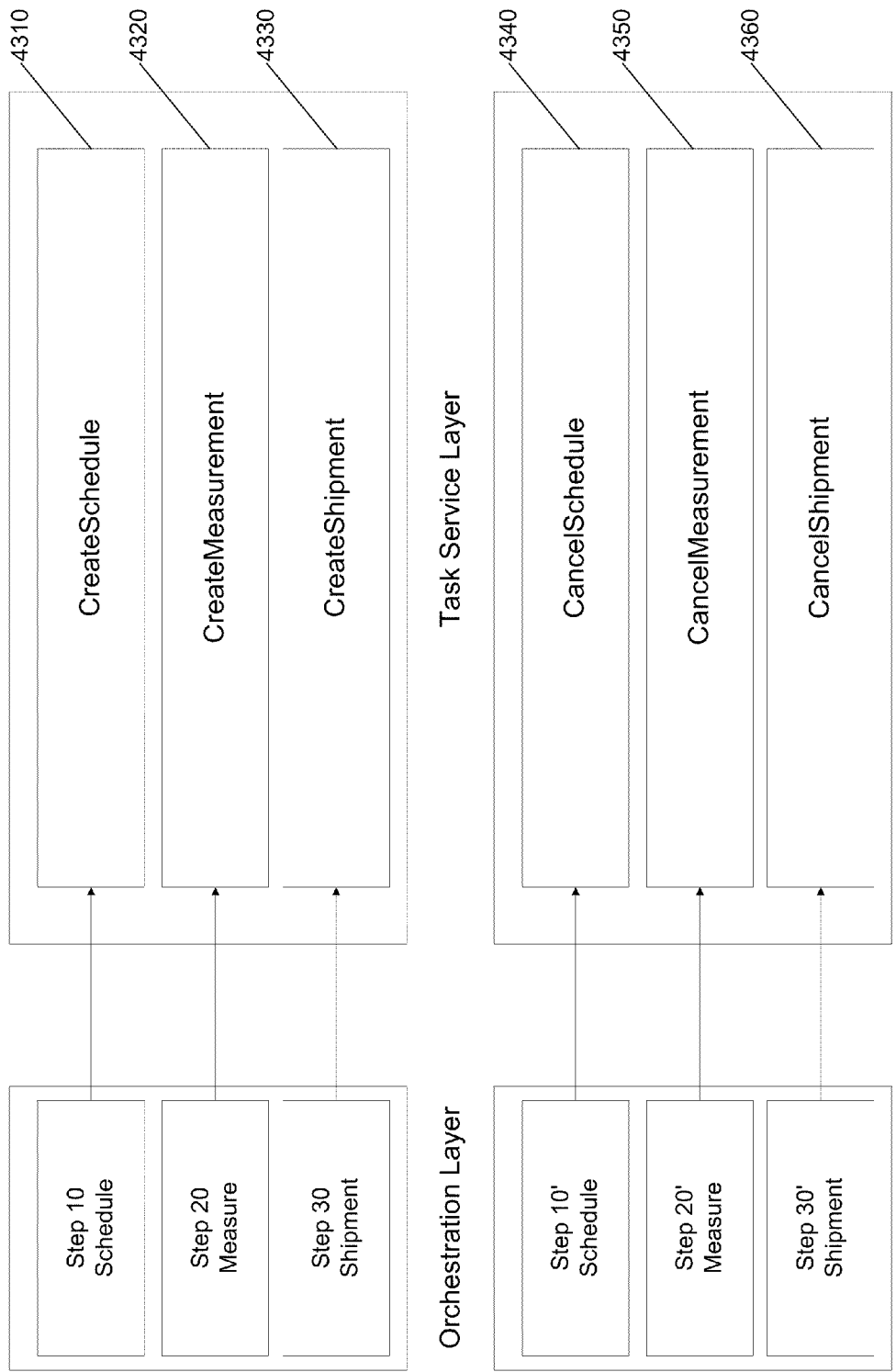
FIG. 43 illustrates an example of a create task layer service pattern and a cancel task layer service pattern according to one embodiment.

FIG. 43 illustrates an example of a create task layer service pattern and a cancel task layer service pattern according to one embodiment. FIG. 43 illustrates an executable process executed in regular mode which includes steps 10, 20, and 30 in an orchestration layer. For each step of the executable process, a corresponding task layer service is invoked at the task layer service layer. In the example illustrated in FIG. 40, step 10, which is a schedule task, invokes task layer service CreateSchedule 4310. Likewise, step 20, which is a measure task, invokes task layer service CreateMeasurement 4320, and step 30, which is a shipment task, invokes task layer service CreateShipment 4330. Task layer services CreateSchedule 4310, CreateMeasurement 4320, and CreateShipment 4330 are all part of the create task layer service pattern, and each task layer service is responsible for invoking the respective service of the respective fulfillment system in order to implement the task.

FIG. 43 also illustrates another executable process executed in change mode in light of a received change request, which includes steps 10', 20', and 30'. In this instance, the required change is the cancellation of steps 10, 20, and 30 of the first executable process. Thus, step 10' invokes task layer service CancelSchedule 4340. Likewise, step 20' invokes task layer service CancelMeasurement 4350, and step 30' invokes task layer service CancelShipment 4360. Task layer services CancelSchedule 4340, CancelMeasurement 4350, and CancelShipment 4360 are all part of the cancel task layer service pattern, and each task layer service is responsible for invoking the respective service of the respective fulfillment system in order to cancel the task previously performed by the service.

Figure 44:
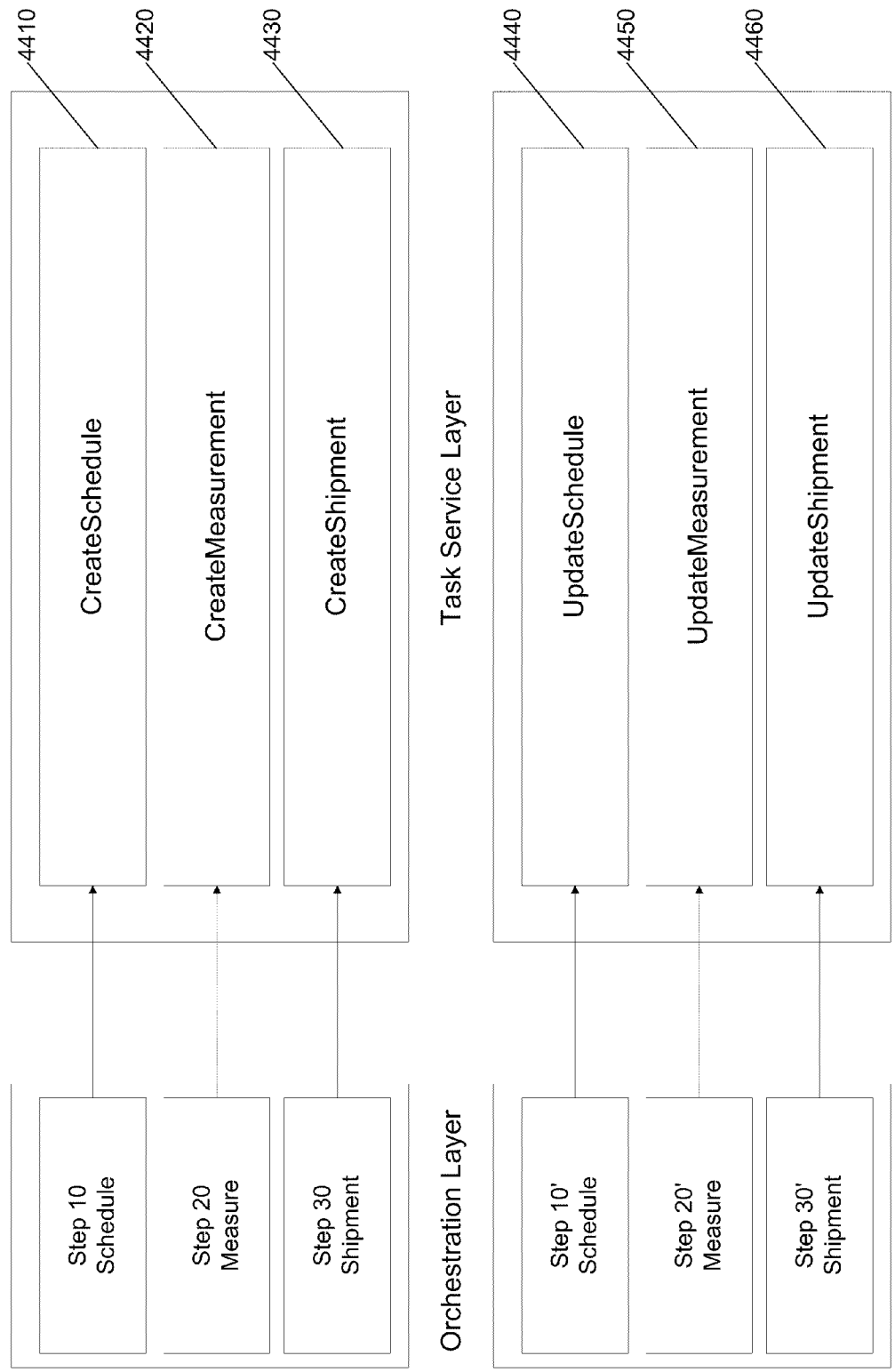
FIG. 44 illustrates an example of a create task layer service pattern and an update task layer service pattern according to one embodiment.

FIG. 44 illustrates an example of a create task layer service pattern and an update task layer service pattern according to one embodiment. FIG. 44 illustrates an executable process executed in regular mode which includes steps 10, 20, and 30 in an orchestration layer. The executable process is identical to the executable process illustrated in FIG. 43 and is not described further.

FIG. 44 also illustrates another executable process executed in change mode in light of a received change request which includes steps 10', 20', and 30'. In this instance, the required change is the adjustment of steps 10, 20, and 30 of the first executable process. Thus, step 10' invokes task layer service UpdateSchedule 4440. Likewise, step 20' invokes task layer service UpdateMeasurement 4450, and step 30' invokes task layer service UpdateShipment 4460. Task layer services UpdateSchedule 4440, UpdateMeasurement 4450, and UpdateShipment 4460 are all part of the update task layer service pattern, and each task layer service is responsible for invoking the respective service of the respective fulfillment system in order to adjust the task previously performed by the service.

Rollback Checkpoints

In an embodiment of the invention, an orchestration system is capable of establishing a rollback checkpoint which identifies a step in an executable process where adjustment activities are no longer required prior to the identified step in the executable process. Thus, when an original executable process is being executed, and an orchestration system receives a change request, the orchestration system need only adjust the most recent steps of the original executable process up to an identified rollback checkpoint. By identifying steps where adjustment activities are no longer required, the orchestration system is able to avoid unnecessary adjustment steps when it adjusts the steps of an original executable process upon receiving a change request.

According to an embodiment, an orchestration system may implement one or more rollback checkpoints along with a cancel compensation pattern which includes a cancel service capable of cancelling an step of an executable process. In the embodiment, one or more steps of an executable process may be identified by the orchestration system as a rollback checkpoint. Then, when the executable process is executed, upon receiving a change request, the orchestration system need only adjust the step that includes the rollback checkpoint and any subsequent steps (i.e., the most recent steps of the executable process). The orchestration system does not adjust any steps of the executable process that come before the designated rollback checkpoint.

According to an embodiment of an invention, the use of rollback checkpoints in an orchestration system means that the orchestration system only supports cancel service patterns, as described in a previous section. Thus, in the embodiment of the invention, if the orchestration system is customized to implement rollback checkpoints, than a user may only customize an adjustment of an executable process to implement a cancel service pattern, and cannot customize an adjustment of an executable process to implement an update service pattern.

When an executable process only has one rollback checkpoint associated with it, then it is straightforward which rollback checkpoint the orchestration system uses. However, when an executable process has more than one rollback checkpoint, the executable process is capable of determining which rollback checkpoint to use. Three options for determining which rollback checkpoint to use are presented. However, one of ordinary skill in the art would readily understand that an alternative option may be used to determine which rollback checkpoint to use, and still be within the scope of the invention.

The first option is to select the most recent rollback checkpoint. Subsequently, all steps up to the most recent rollback checkpoint are adjusted. In an embodiment of the invention, the steps are cancelled and re-performed using a cancel compensation pattern, as described in a previous section. This is identified as the "Most Recent Option." The second option is to allow a user to select a rollback checkpoint. In an embodiment, the user may select the rollback checkpoint from a workbench user interface described in a previous section. Subsequently, all steps up to the user-selected rollback checkpoint are adjusted. In an embodiment, the steps are cancelled and re-performed using the cancel compensation pattern. This is identified as the "User-Selected Option."

The third option is for the orchestration system to implement a deterministic algorithm to identify the most recent rollback checkpoint that does not have business steps with a delta between the rollback checkpoint and an immediate subsequent rollback checkpoint. In other words, a rollback checkpoint i is identified where there are no business steps between rollback checkpoint i and rollback checkpoint i+1 with a delta. Subsequently, all steps up to the rollback checkpoint i are adjusted. In an embodiment of the invention, the steps are cancelled and re-performed using the cancel compensation pattern. This is identified as the "System-Selected Option."

FIG. 45 illustrates a step diagram 4500 where a rollback checkpoint is selected based on a delta according to one embodiment. Step diagram 4500 includes steps of an executable process. The steps include steps T1, T2, T3, T4, T5, T6, T7, and T8. As can be seen in step diagram 4500, each step has a compensation service defined for the step, and the compensation sequence for the executable process is defined as the reverse order of the original steps. Steps T2, T4, T6, and T8 each have a rollback checkpoint designated, rollback checkpoints C1, C2, C3, and C4, respectively. Finally, at runtime, steps T6 and T8 each have a delta associated with them.

In the scenario where a change request is received, the orchestration system is capable of selecting one of the rollback checkpoints C1, C2, C3, and C4 to use as the rollback checkpoint. Thus, the orchestration system can merely adjust the steps that follow the selected rollback checkpoint, rather than all the steps. If the orchestration system is using the "System-Selected Option" to select the rollback checkpoint, the orchestration system executes a deterministic algorithm to determine the most recent rollback checkpoint that does not have steps with a delta between the rollback checkpoint and the following rollback checkpoint. In step diagram 4500, the algorithm identifies C2 as the rollback checkpoint because there is no delta for the steps between rollback checkpoints C2 and C3, yet there are steps with a delta between rollback checkpoints C3 and C4, including the final step T8 which includes rollback checkpoint C4. Thus, C2 is the most recent rollback checkpoint that does not have business steps with a delta between the rollback checkpoint and an immediate subsequent rollback checkpoint.

Figure 46:
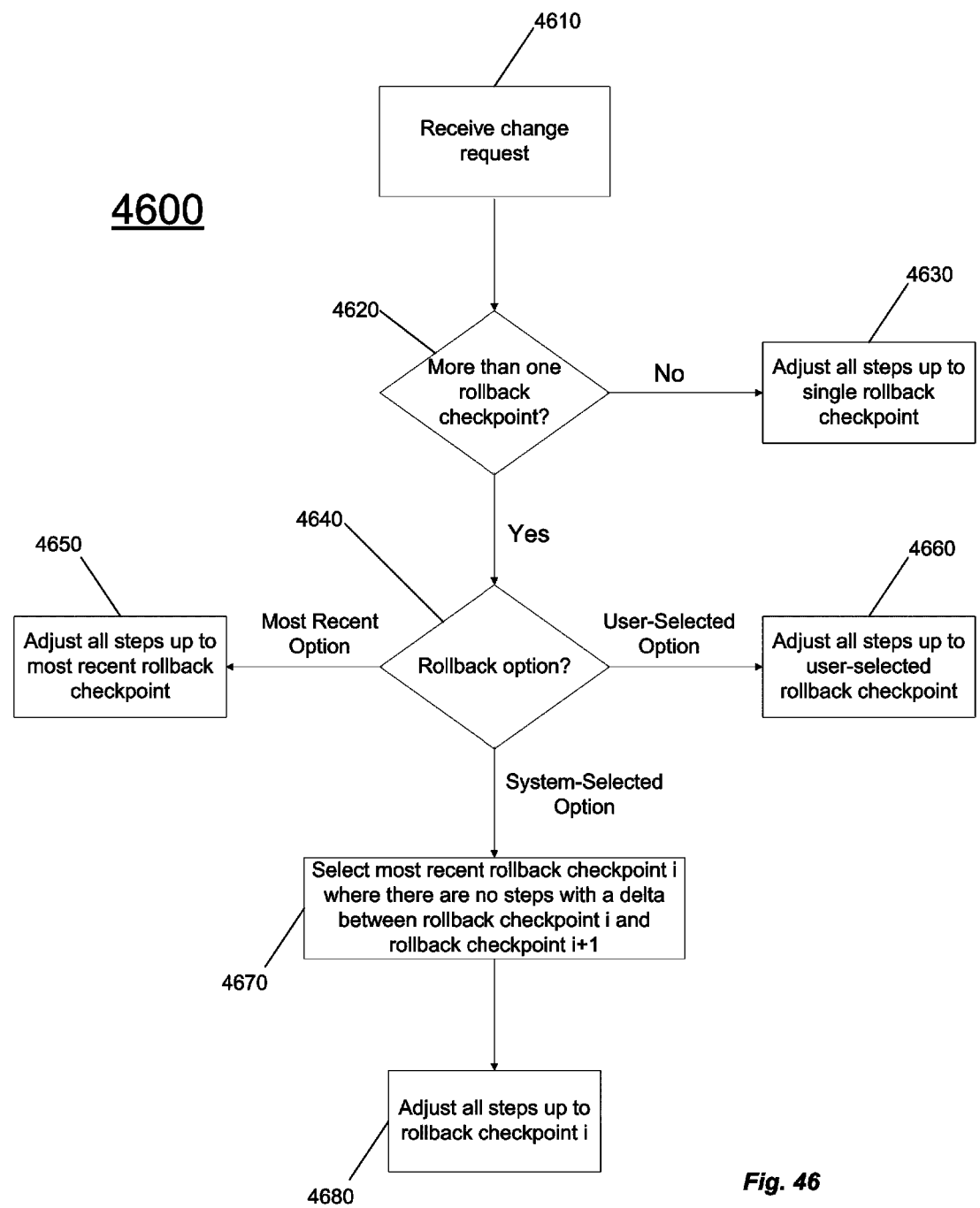
FIG. 46 illustrates a flowchart of a method for utilizing a rollback checkpoint to process a change request according to one embodiment.

FIG. 46 illustrates a flowchart of a method for utilizing a rollback checkpoint to process a change request according to an embodiment of the invention. At 4610, a change request is received. At 4620, it is determined whether the original executable process has more than one rollback checkpoint. If the original executable process only has a single rollback checkpoint, then at 4630, the new executable process adjusts the steps original executable process up to the single rollback checkpoint. In an embodiment, the new executable process adjusts the steps by canceling the steps of the original executable process up to the single rollback checkpoint. However, if it determined that the original executable process has more than one rollback checkpoint, then at 4640, it is determined which rollback option to use in order to select a rollback checkpoint from the multiple rollback checkpoints of the original executable process.

If the "Most Recent Option" is to be used, then at 4650, the new executable process adjusts the original executable process by canceling the steps of the original executable process up to the most recent rollback checkpoint of the original executable process. If the "User-Selected Option" is to be used, then at 4660, the new executable process adjusts the steps of the original executable process up to the rollback checkpoint selected by a user. In an embodiment, the new executable process adjusts the steps by canceling the steps of the original executable process up to the rollback checkpoint selected by a user. In an embodiment of the invention, the user may select the rollback checkpoint of the original executable process via a workbench user interface. If the "System-Selected Option" is to be used, then at 4670, the orchestration system selects a rollback checkpoint. The rollback checkpoint is the most recent rollback checkpoint (i.e., rollback checkpoint i), where there are no steps of the original executable process with a delta between that rollback checkpoint i and the next rollback checkpoint (i.e., rollback checkpoint i+1). In an embodiment of the invention, the selection of the rollback checkpoint is implemented by a deterministic algorithm. Then, at 4680, the new executable process adjusts the steps of the original executable process up to the selected rollback checkpoint i. In an embodiment, the new executable process adjusts the steps by canceling the steps of the original executable process up to the selected rollback checkpoint i.

Rules Engine

A user of an orchestration system may require that the operation of an orchestration process depend on business logic. For example, a user of orchestration system may require that a business process be customizable on a case-by-case basis. For example, the user may require that a business process perform a particular step in light of one set of data values, but may also require that the same business process perform a completely different step in light of another set of data values. As a non-limiting example, for an item shipping business process, the process may need to perform step A if the item is a book, but may also need to perform step B rather than step A if the item is a carpet. Thus, the user will also require that an executable process which corresponds to the customizable business process be adaptable to different business conditions at runtime.

According to an embodiment of the invention, a rules engine may be provided where business logic may be utilized to implement the operation of an orchestration process. Through the utilization of the rule engine, the operation of the orchestration process can be adapted on a case-by-case basis, depending on runtime data.

According to an embodiment of the invention, a rule dictionary for an executable process is provided. The rule dictionary includes a library of one or more rule sets which allow a user to define and store one or more business rules for an executable process in each rule set. A rule set is a logical grouping of one or more business rules. A business rule is a rule that dictates the operation of an executable process based on runtime data. A rule dictionary is provided for each executable process. Therefore, each instance of the executable process can also include the corresponding rule dictionary.

Figure 47:
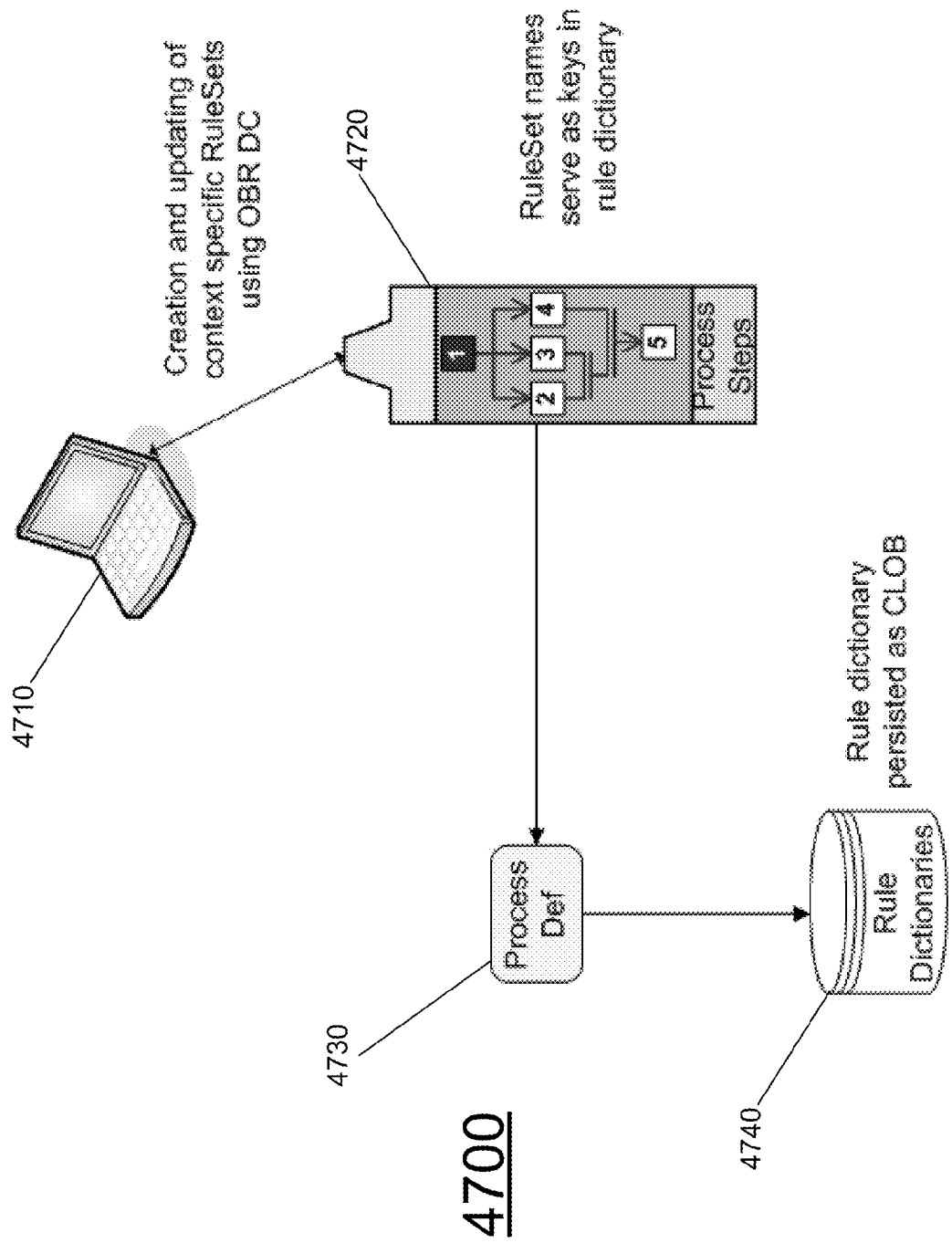
FIG. 47 illustrates an object diagram where a business rule is defined according to one embodiment.

FIG. 47 illustrates an object diagram of an implementation of defining a business rule according to one embodiment. At 4710, an orchestration system user creates a business rule using a client user interface. In an embodiment of the invention, a separate interface is presented on a page of a screen of the client user interface which allows the user to create the business rule. If a rule set does not already exist, the user also creates a rule set, and adds the business rule to the rule set. If a rule set already exists, the user merely adds the business rule to the pre-existing rule set. At 4720, the rule set is added to a rule dictionary 4740 of a process definition 4730, where the rule set name is populated in the appropriate column of rule dictionary 4740. The name of the rule set serves as a key to rule dictionary 4740 of process definition 4730. Once a user is done creating all business rules, rule dictionary 4740 is saved as a character large object ("CLOB") in a database table. As one of ordinary skill in the art would understand, a CLOB is a collection of character data in a database management system.

Figure 48:
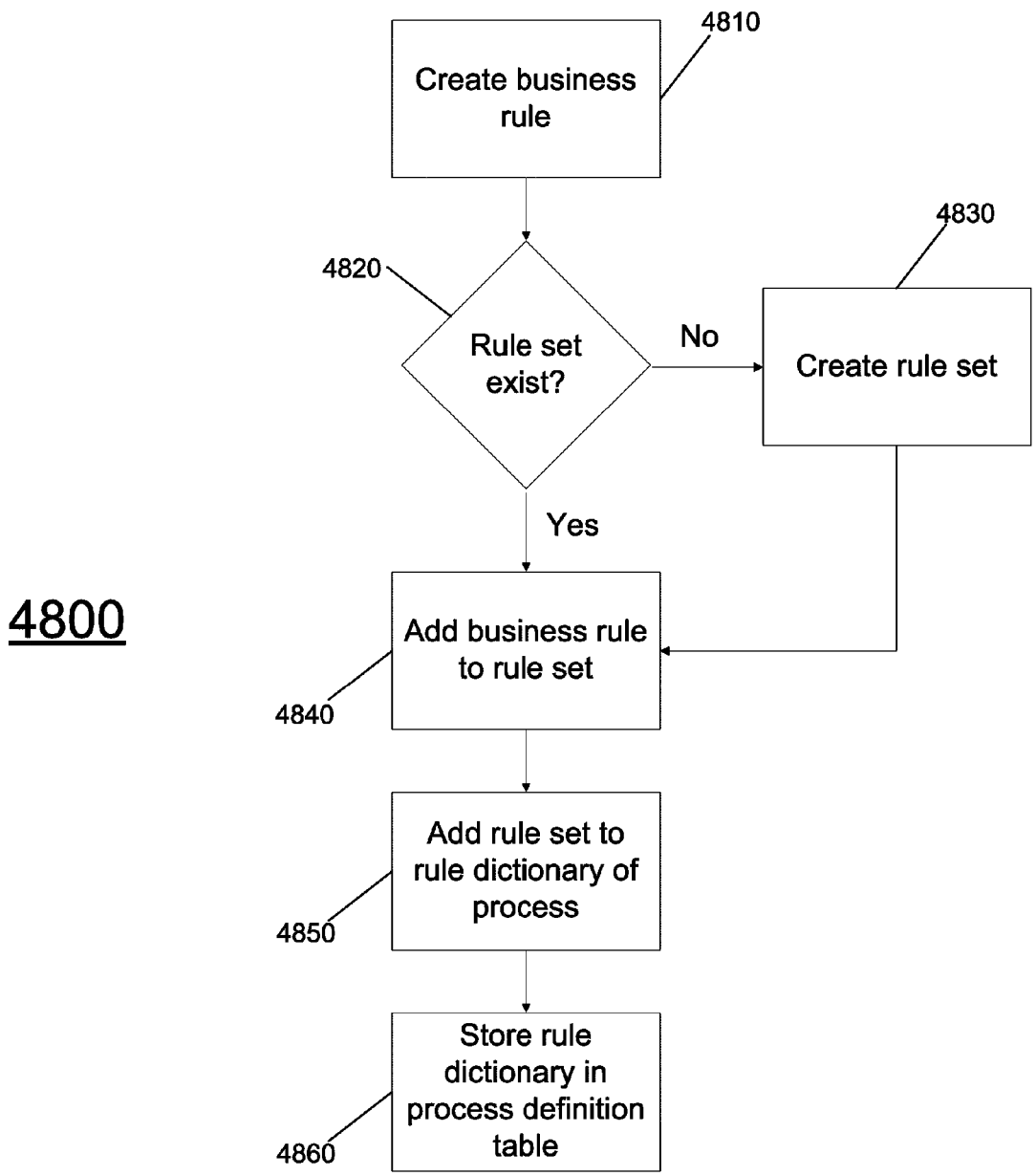
FIG. 48 illustrates a flowchart of a method for defining a business rule according to one embodiment.

FIG. 48 illustrates a flowchart 4800 of a method for defining a business rule according to one embodiment. At 4810, an orchestration system user creates a business rule. In an embodiment of the invention, the user uses a separate interface presented on a page of a screen of a client user interface to create the business rule. At 4820, it is determined whether a rule set to hold the business rule already exists. If a rule set does not exist already exist, then, at 4830, a rule set is created. Whether or not a rule set exists, the flow eventually proceeds to 4840 where the business rule is added to the rule set. At 4850, the rule set is added to a rule dictionary associated with a process definition. At 4860, the rule dictionary is stored in a process definition table.

Figure 49:
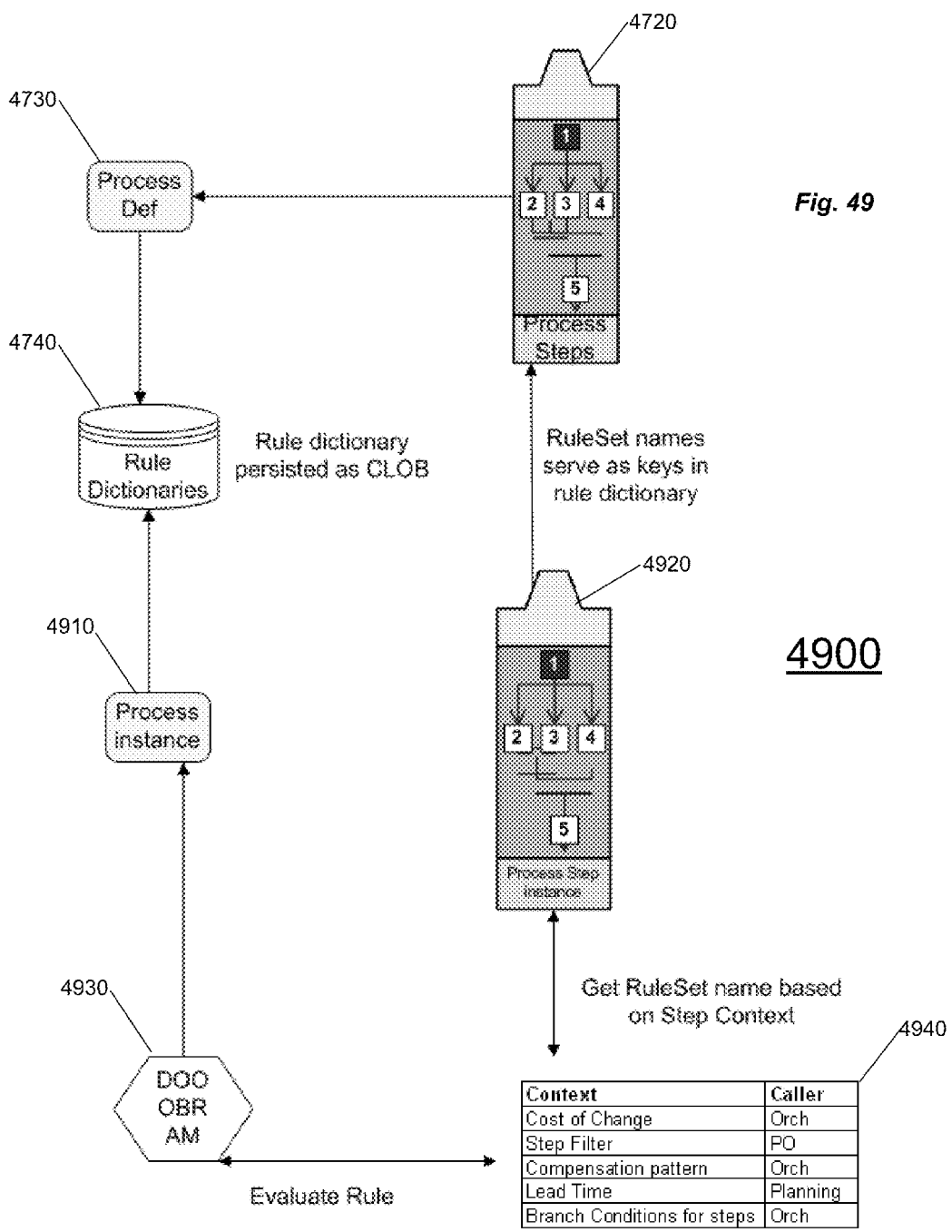
FIG. 49 illustrates an object diagram where a business rule is implemented according to one embodiment.

FIG. 49 illustrates an object diagram of an implementation of implementing a business rule according to one embodiment. During operation of an orchestration system an executable instance 4910 of an executable process definition 4730 is created. Likewise, at 4920, during operation of an orchestration system, an executable process step instance of one of the steps of 4720 is created. When an executable process instance 4910 is created, rule dictionary 4740 (which is persisted as a GLOB) is loaded from the process definition table and a rules session is instantiated. The rules session is a stateful session and can persist for the life of an order which is processed by the orchestration system. When the system needs to evaluate a condition for a particular step, at 4930, the business rule of the rule set of rule dictionary 4740 is applied. Specifically, the appropriate rule set is determined based on the context of the step, as shown at 4940. In this manner, a user-created business rule is applied in order to determine which step the process instance should implement next. In an embodiment of the invention, the business rule is invoked as an inline Java® programming language library and not as a service. According to the embodiment, by invoking the business rule as an inline Java® programming language library, the business rule can include a version number which indicates a version of the business rule. According to the embodiment, each executable process can include a separate version of a business rule. Versioning is described in more detail in U.S. Patent Application No. 61/114,276, entitled "VERSIONING AND EFFECTIVITY DATES FOR ORCHESTRATION BUSINESS PROCESS DESIGN."

Figure 50:
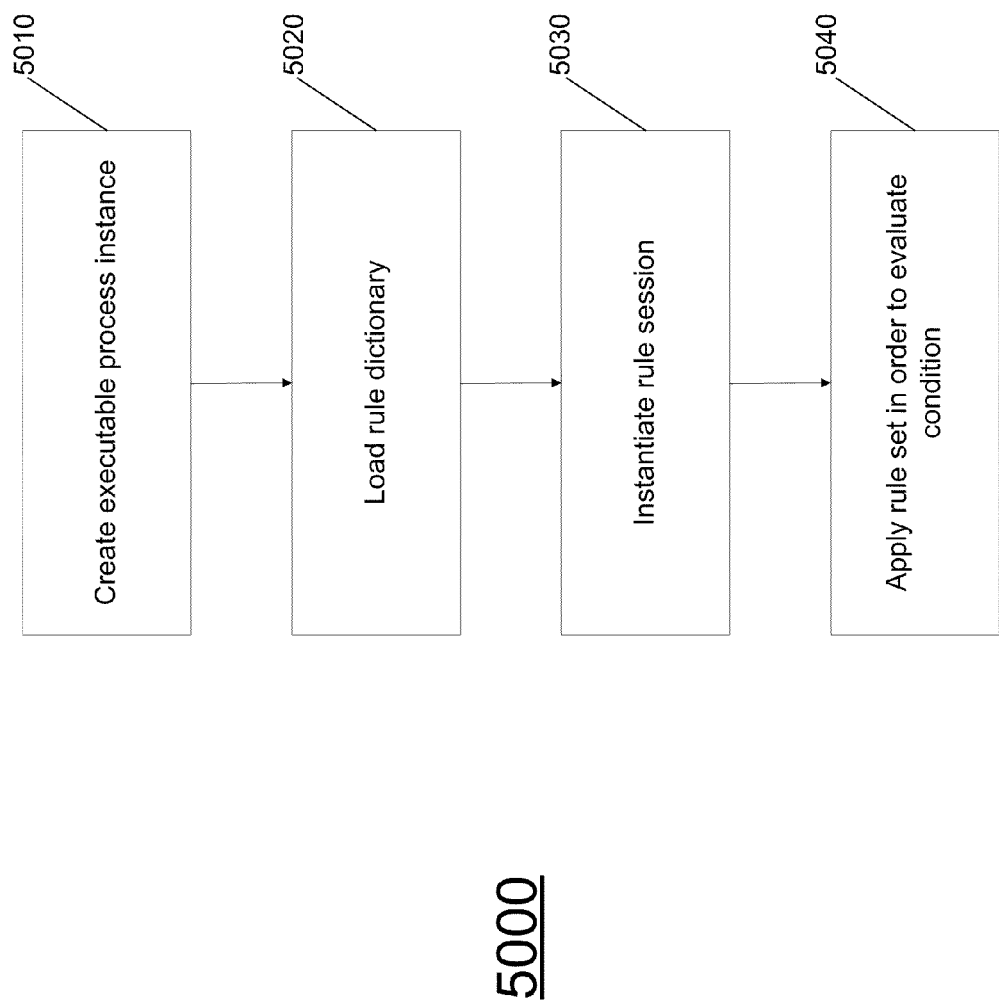
FIG. 50 illustrates a flowchart of a method for implementing a business rule according to one embodiment.

FIG. 50 illustrates a flowchart 5000 of a method for implementing a business rule according to one embodiment. At 5010, an executable process instance, which is an instance of a defined executable process is created. At 5020, a rule dictionary is loaded. In an embodiment of the invention, the rule dictionary is stored in an executable process definition table of a database as a GLOB. At 5030, a rule session is initiated based on the loaded rule dictionary. At 5040, during the execution of the executable process instance, an appropriate rule set of the rule dictionary is applied in order to evaluate a condition for a particular step of the executable process instance.

Exemplary embodiments of the rules engine have been described in the context of orchestration. However, one of ordinary skill in the art would readily appreciate that these are merely exemplary embodiments, and that the rules engine may be implemented in other contexts. For example, a rules engine may be utilized to define and apply a cost of change. Specifically, a business rule may be used to define a cost of change based on runtime data, and to determine whether the cost of change exceeds a threshold based on runtime data, as described in a separate section. As another example, a rules engine may be utilized to select a compensation pattern. Specifically, a business rule may be used to select a compensation from one or more compensation patterns, as described in a separate section. As further described in the separate section, such compensation patterns may include a cancel compensation pattern, an update compensation pattern, a redo compensation pattern, or a no operation compensation pattern.

In another example, a rules engine may be utilized to evaluate a branching condition within an orchestration process. Specifically, a business rule may be used to determine which branching condition to select based on runtime data. As another example, a rules engine may be utilized to allow a user to filter which order lines implement a particular step of a business process. Specifically, a business rule may be used to determine which order lines should be removed from consideration based on runtime data. In another example, a rules engine may be utilized to determine a lead-time with respect to planning a step. Specifically, a business rule may be used to determine an amount of time necessary to perform the step based on runtime data.

Orchestration Process Management

As previously described, change management of an orchestration process utilizes a combination of an automatic adjustment of past steps of an executable process and incorporation of changes to future steps of the executable process. The orchestration process and the change management of the orchestration process will be described below in an exemplary embodiment of the invention.

Figure 51:
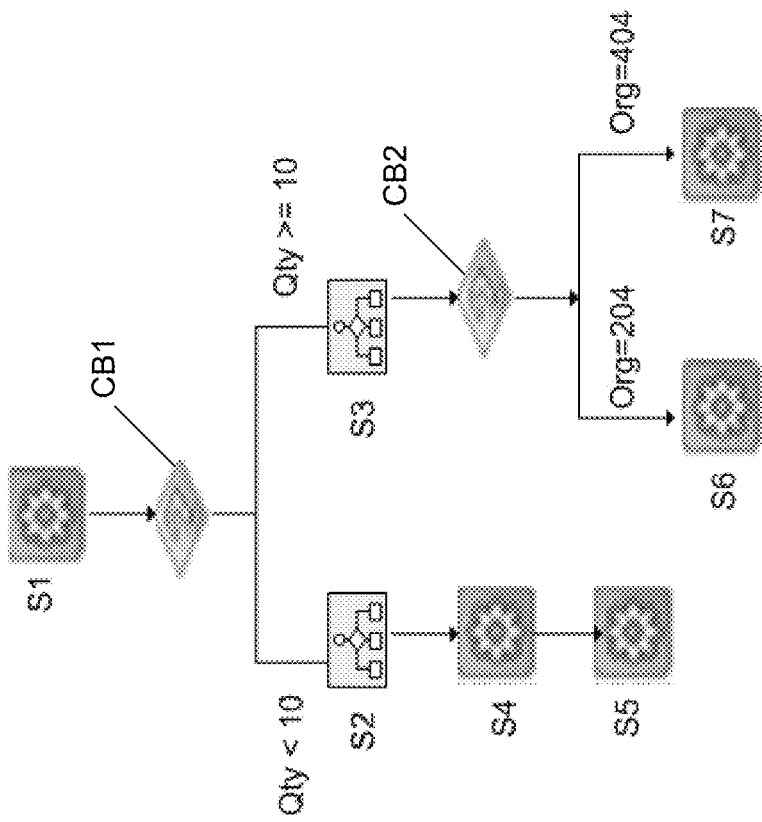
FIG. 51 illustrates an example of an executable process according to one embodiment.

FIG. 51 illustrates an example of an executable process definition according to one embodiment. In the embodiment, FIG. 51 illustrates an executable process definition of an original order. S1, S2, S3, S4, S5, S6, and S7 represent different steps of the executable process. CB1 and CB2 represent conditional branches of the executable process that are evaluated at runtime according to pre-defined business rules. For example, at CB1, the orchestration system evaluates whether or not a line quantity of the original order is less than 10. If the line quantity is less than 10, then the executable process executes step S2, then step S4, then step S5. However, if the line quantity is greater than or equal to 10, then the executable process executes step S3, and then evaluates conditional branch CB2. At CB2, the orchestration system evaluates if the organization of the original order is equal to 204 or 404. If the organization is equal to 204, then the executable process executes step S6. However, if the organization is equal to 404, then the executable process executes step S7.

In the original order, if the line quantity is greater than 10, the executable process executes step S3, and if the organization equals 204 then the executable process executes step S6. If the executable process executes those steps, and a change request is received where the line quantity is reduced to 5, then the new executable process cancels steps S3 and S6, and then executes steps S2, S4, and S5. Because the conditional branches CB1 and CB2 are each evaluated against a pre-defined rule at runtime, it is unknown which path the new executable process will take upon the receipt of a change request.

In the event of a change request, an orchestration system notifies an original executable process to stop. In an embodiment, the orchestration system notifies the original executable process to terminate gracefully (i.e., allow any running steps to complete without executing the next step). In an alternative embodiment, the orchestration system notifies the original executable process to pause itself. Thus, in this embodiment, the original executable process is paused, but is capable of being resumed at a later point in time. Upon resumption, the original executable process will execute the next step. The orchestration system creates a new executable process which refers to the original executable process. More specifically, the new executable process includes new steps which reference the original steps of the original executable process, and includes a new task. For steps that do not require adjustment, the orchestration system copies task completion details and task status from the original executable process. In an embodiment of the invention, the task completion details include start and end dates. For steps that require adjustment, the orchestration system simply copies the task completion details from the original executable process. The orchestration system deactivates all messages associated with the original executable process and starts the new executable process in change mode. Once the new executable process has adjusted all the original steps of the original executable process, the new executable process resumes executing the remaining steps in regular mode.

Figure 52:
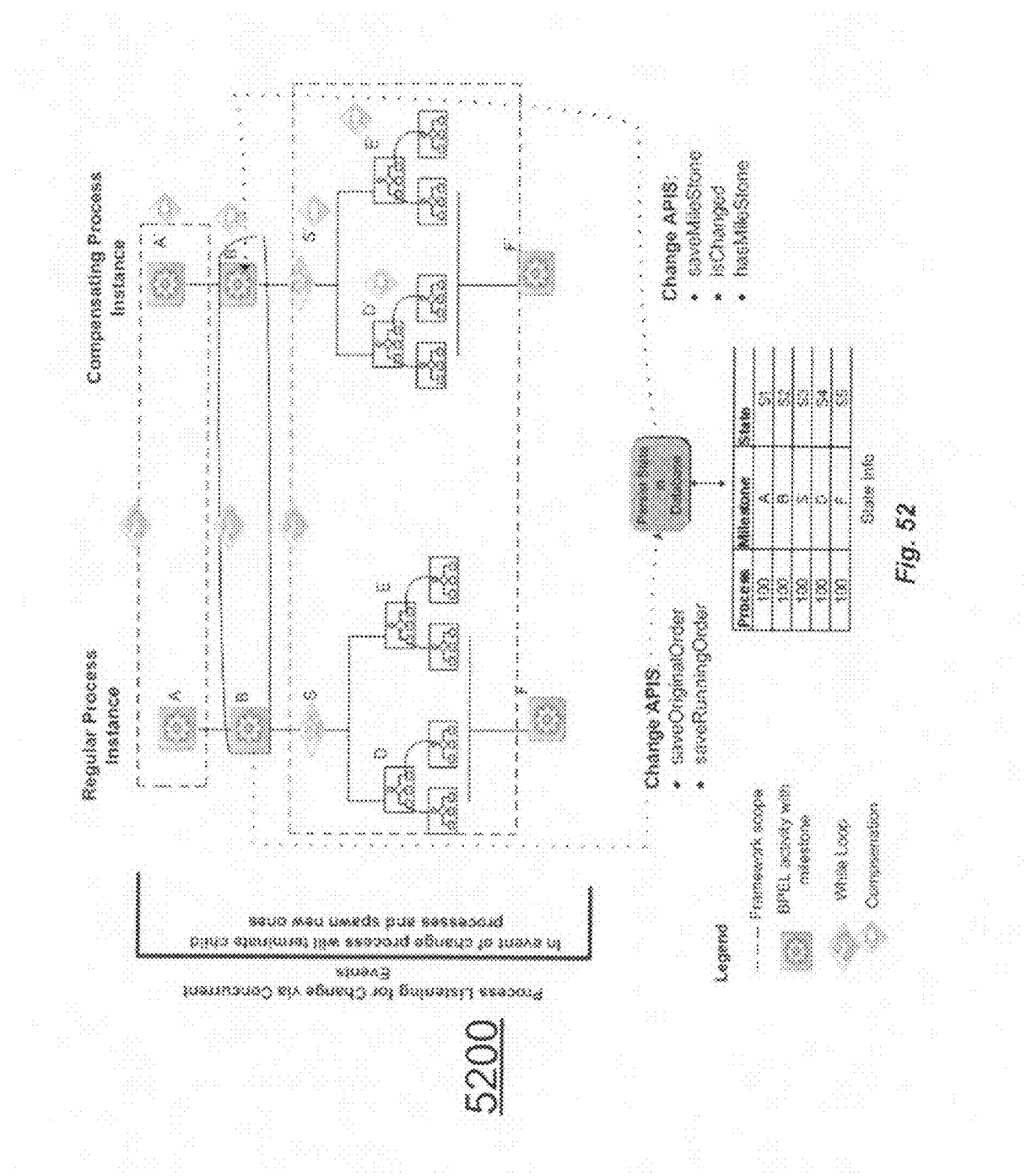
FIG. 52 illustrates an example of a new executable process adjusting the steps of an original executable process according to one embodiment.

FIG. 52 illustrates an example of a new executable process definition where the new executable process adjusts the steps of an original executable process according to one embodiment. In FIG. 52, under the heading "Regular Process Instance" is a flow of an original executable process, including steps A, B, D, E, and F, and conditional branch S. Under the heading "Compensating Process Instance" is a flow of a corresponding new executable process, including steps A', B', D', E', and F', and conditional branch S'. In the event of a change request, an orchestration system is capable of stopping the flow of the original executable process and initiating the flow of the new executable process. Each step and conditional branch of the new executable process (i.e., steps A', B', D', E', and F', and conditional branch S') is capable of automatically adjusting its corresponding step of the original process (i.e., steps A, B, D, E, F, and conditional branch S) if the corresponding step has already been executed.

As can also be seen in FIG. 52, both the original executable process and the new executable process are capable of saving the state of the respective process in a database at each milestone. For example, in FIG. 52, the original executable process saves state S1 at milestone A, state S2, at milestone B, state S3 at milestone S, state S4 at milestone D, and state S5 at milestone F.

Figure 53:
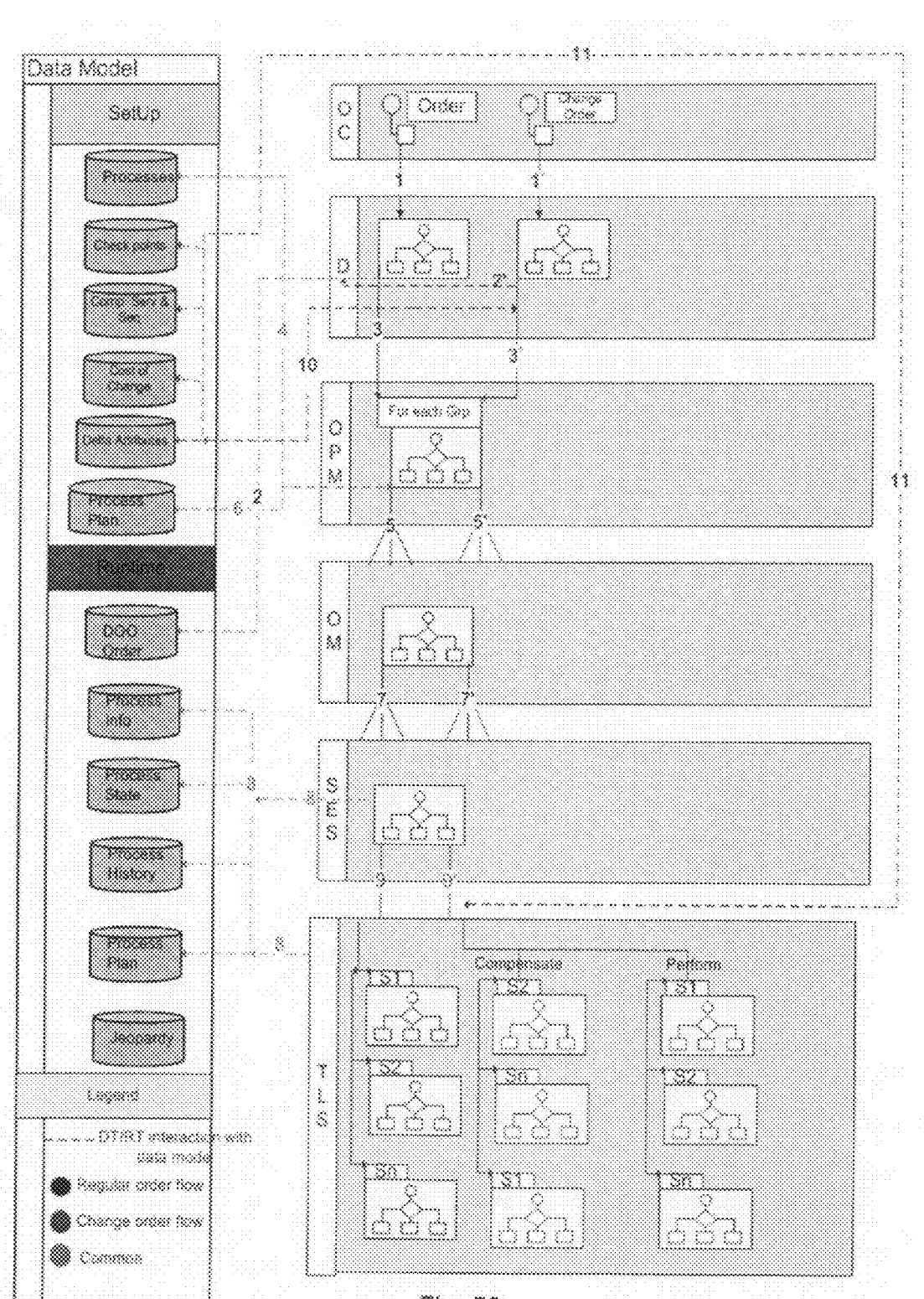
FIG. 53 illustrates a flow chart of both an original executable process, and a new executable process upon the receipt of a change request.

FIG. 53 illustrates a flow chart of both an original executable process, and a new executable process upon the receipt of a change request, according to one embodiment. The flow of the original executable process (i.e., the identified in the legend of FIG. 53 as "regular order flow") includes steps 1-3, 5, 7, and 9. The flow of the new executable process (i.e., the flow identified in the legend of FIG. 50 as "change order flow") includes steps 1'-3', 5', 7', 9', and 10-11. Step 4, 6, and 8 are common to both flows (and are identified in the legend of FIG. 53 as "Common").

The steps of the regular order flow are now described. At step 1, an order capture module submits an order to an orchestration system, and a decomposition module of the orchestration system accepts the order. At step 2, the decomposition module transforms the order and creates an original DOO order. At step 3, the decomposition module assigns separate executable processes for the lines of the original DOO order as necessary. The decomposition module also saves the state of the original DOO order, and passes the original DOO order to an orchestration module by invoking an OPM of the orchestration module.

At step 4, the OPM queries process information based on the identity of a header of the original order. For each process of the original order, the OPM calls the corresponding OAS and planning service. At step 5, for each group of the original order, the OPM invokes an original executable process (i.e., OM). At step 6, the OAS calls the planning service as part of step 4.

At step 7, the original executable process is executed. The original executable process further invokes the SMS in order to execute the steps of the executable process. At step 8, the SMS retrieves the necessary runtime step instance data. At step 9, the SMS invokes task layer services which correspond to the steps of the executable process. In the example illustrated in FIG. 53, the SMS invokes task layer services which correspond to S1, S2, and Sn, respectively.

The steps of the change order flow are now described. At step 1', an order capture module submits a change request which includes a new order that corresponds to an original order, and the decomposition module of the orchestration system accepts the new order. At step 2' the decomposition module transforms the new order, creates a new DOO order, and identifies the new DOO order as corresponding to the original DOO order. The decomposition module also assigns separate executable processes for the lines of the new DOO order as necessary. The decomposition module then calls a group API in change mode. At step 10, the decomposition module invokes a function that maps the new DOO order with the original DOO order and computes the delta between the two DOO orders. At step 3', the decomposition module passes the new DOO order to an orchestration module by invoking an OPM of the orchestration module.

At step 4, the OPM queries process information based on the identity of a header of the new DOO order. For each process of the new DOO order, the OPM calls the corresponding OAS and planning service. At step 5', the OPM invokes an application module API that returns a set of information including the identity of the original executable process, the identity of the executable process which corresponds to the new executable process which will process the new DOO order and adjust the steps of the original executable process, all groups of the original DOO order, all groups of the new DOO order, and all delta types. For each changed group, the OPM notifies external systems of the changes, pauses the original executable process so that the original executable process exits gracefully and terminates all wait steps. The OPM also merges the new DOO order with the original DOO order, saves the current state of the original order, and invokes a new executable process (i.e., OM) in change mode for each changed group. At step 6, the OAS calls the planning service as part of step 4.

At step 7', the new executable process is executed. The new executable process further invokes the SMS in order to execute the steps of the executable process. At step 8, the SMS retrieves the necessary runtime step instance data, determines the appropriate compensation pattern, identifies the computed delta between the original DOO order and the new DOO order, and runs the appropriate compensation services. At steps 9' and 11', the SMS invokes task layer services which correspond to the steps of the executable process. In the example illustrated in FIG. 53, the SMS invokes task layer services which corresponds to S1, S2, and Sn, respectively. Specifically, the SMS performs compensation of S2 first, then compensation of Sn, then compensation of S1. Subsequently, the SMS re-performs 51, S2, and Sn.

Although the description has been described with respect to particular embodiments thereof, these particular embodiments are merely illustrative, and not restrictive. Although BPEL is described, it will be understood that other languages may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable medium having instructions stored thereon that, when executed by a processor, cause the processor to determine a delta attribute in an electronic commerce distributed order orchestration system, the determining comprising:
    defining an attribute of an order object as the delta attribute, wherein the delta attribute is a subset of the attributes of the order object and comprises both pre-defined and dynamic delta attributes;
    determining a new order object which references an original order object;
    determining the original order object referenced by the new order object;
    comparing the new order object with the original order object to determine whether an attribute that has changed is the delta attribute, wherein a change to the delta attribute denotes a change to the order object that triggers an adjustment of a step of an executable orchestration process;
    storing the delta attribute when the attribute that has changed is the delta attribute;
    adjusting the step of the executable orchestration process; and
    fulfilling an electronic commerce order based on the adjusted step of the executable orchestration process.

2. The non-transitory computer-readable medium of claim 1, wherein the comparing of the new order object with the original order object comprises at least one of, determining a line object and a fulfillment line object that have moved to a new group object of the new order object, determining a line object and a fulfillment line object that have been added to the new order object, determining a line object and a fulfillment line object that have been cancelled from the original order object, determining which system-defined attributes have changed in the new order object as compared to the original order object, or determining which user-defined dynamic attributes have changed in the new order object as compared to the original order object.

3. The non-transitory computer-readable medium of claim 1, wherein the attribute is stored on at least one of, a header object of the new order object and the original order object, a line object of the new order object and the original order object, or a fulfillment line object of the new order object and the original order object.

4. The non-transitory computer-readable medium of claim 1, wherein the storing of the delta attribute further comprises storing the attribute in a bit storage.

5. The non-transitory computer-readable medium of claim 4,
    wherein the bit storage comprises seven bits,
    wherein each bit of the seven bits is capable of storing a value of either 0 or 1,
    wherein the first bit represents a group change delta attribute,
    wherein the second bit represents an add line delta attribute,
    wherein the third bit represents a cancel line delta attribute,
    wherein the fourth bit represents an attribute change delta attribute,
    wherein the fifth bit represents a quantity attribute change delta attribute, and
    wherein the sixth bit represents a dynamic attribute change delta attribute.

6. The non-transitory computer-readable medium of claim 4, wherein the storing of the delta attribute in a bit storage further comprises storing an attribute change delta attribute in a Java® programming language class.

7. The non-transitory computer-readable medium of claim 6, wherein the storing of the attribute in a bit storage further comprises storing a dynamic attribute change delta attribute in a storage medium.

8. The non-transitory computer-readable medium of claim 7, wherein the storage medium comprises a database.

9. The non-transitory computer-readable medium of claim 7, wherein the storage medium comprises a cache.

10. The non-transitory computer-readable medium of claim 1, wherein the defining of the attribute as the delta attribute further comprises at least one of, defining the attribute at a process level, at a task level, or at a process-service level.

11. The non-transitory computer-readable medium of claim 1, the determining further comprising determining the delta attribute using a state of the original order object after the creation of the original order.

12. A computer-implemented method for determining a delta attribute in an electronic commerce distributed order orchestration system, the computer-implemented method comprising:
    defining, by a processor, an attribute of an order object as the delta attribute, wherein the delta attribute is a subset of the attributes of the order object and comprises both pre-defined and dynamic delta attributes;
    determining, by the processor, a new order object which references an original order object;
    determining, by the processor, the original order object referenced by the new order object;
    comparing, by the processor, the new order object with the original order object to determine whether an attribute that has changed is the delta attribute, wherein a change to the delta attribute denotes a change to the order object that triggers an adjustment of a step of an executable orchestration process;
    storing, by the processor, the delta attribute when the attribute that has changed is the delta attribute;
    adjusting, by the processor, the step of the executable orchestration process; and
    fulfilling an electronic commerce order based on the adjusted step of the executable orchestration process.

13. The computer-implemented method of claim 12, wherein the comparing of the new order object with the original order object comprises at least one of, determining a line object and a fulfillment line object that have moved to a new group object of the new order object, determining a line object and a fulfillment line object that have been added to the new order object, determining a line object and a fulfillment line object that have been cancelled from the original order object, determining which system-defined attributes have changed in the new order object as compared to the original order object, or determining which user-defined dynamic attributes have changed in the new order object as compared to the original order object.

14. The computer-implemented method of claim 12, wherein the attribute is stored on at least one of, a header object of the new order object and the original order object, a line object of the new order object and the original order object, or a fulfillment line object of the new order object and the original order object.

15. An electronic commerce distributed orchestration system, comprising:
   a processor; and
   a decomposition module configured to define an attribute of an order object as a delta attribute, wherein the attribute is a subset of the attributes of the order object and comprises both pre-defined and dynamic delta attributes,
   wherein the decomposition module is further configured to determine a new order object which references an original order object,
   wherein the decomposition module is further configured to determine the original order object referenced by the new order object,
   wherein the decomposition module is further configured to compare the new order object with the original order object to determine whether an attribute that has changed is the delta attribute, wherein a change to the delta attribute denotes a change to the order object that triggers an adjustment of a step of an executable orchestration process,
   wherein the decomposition module is further configured to store the delta attribute when the attribute that has changed is the delta attribute; and
   wherein the decomposition module is further configured to adjust the step of the executable orchestration process and fulfill an electronic commerce order based on the adjusted step of the executable orchestration process.

16. The orchestration system of claim 15, wherein the decomposition module is further configured to perform at least one of, determining a line object and a fulfillment line object that have moved to a new group object of the new order object, determining a line object and a fulfillment line object that have been added to the new order object, determining a line object and a fulfillment line object that have been cancelled from the original order object, determining which system-defined attributes have changed in the new order object as compared to the original order object, or determining which user-defined dynamic attributes have changed in the new order object as compared to the original order object.

17. The orchestration system of claim 15, wherein the attribute is stored on at least one of, a header object of the new order object and the original order object, a line object of the new order object and the original order object, or a fulfillment line object of the new order object and the original order object.

* * * * *